United States Patent [19]
Arora et al.

[11] Patent Number: 5,845,299
[45] Date of Patent: Dec. 1, 1998

[54] DRAW-BASED EDITOR FOR WEB PAGES

[75] Inventors: Samir Arora, San Jose; Gagan Arora, Santa Clara, both of Calif.; Rajagopal Lakshminarayan, Lafayette, Ga.; Gregory Brown, Sumter, S.C.; Martin Fried-Nielsen, Santa Cruz, Calif.

[73] Assignee: Rae Technology LLC, Redwood City, Calif.

[21] Appl. No.: 687,974

[22] Filed: Jul. 29, 1996

[51] Int. Cl.$^6$ ...................................................... G06F 17/22
[52] U.S. Cl. ........................ 707/513; 707/517; 707/502; 345/352; 345/339
[58] Field of Search ...................................... 395/761, 762, 395/763, 774, 776, 777, 779–783; 707/500–502, 513–515, 517–523, 526; 345/326, 339–340, 352

[56] References Cited

U.S. PATENT DOCUMENTS

| 5,634,062 | 5/1997 | Shimizu et al. |
| 5,634,095 | 5/1997 | Wang et al. |

FOREIGN PATENT DOCUMENTS

WO 94/28480  12/1994  WIPO .

OTHER PUBLICATIONS

"Adobe PageMill 1.0: A powerful Web Authoring Program for the HTML–Challenged", http://www.peimag.com/pagemill.htm, pp. 1–4, 1996.

"Ceneca pioneers easy–to–use authoring and integrated site management tools for world wide web", http://www.ceneca.com/PressReleases/prductAnnonunce.html, pp. 1–3, Aug. 1995.

"Silicon Graphics drives internet innovation with powerful authoring tools for 3D world wide web sites", http://sgline.epfl.ch/announce_WebMagicPro.html, Aug. 1995.

Pogue, "Claris Works 4.0", MacWorld, v12 n12, p. 62, Oct. 1995.

Glass, "Pipeline", InfoWorld, v17 n40, p. 45, Oct. 1995.

Miller et al, "Create your own web page", PC/Computing, v8 n9, pp. 171–176, Sep. 1995.

Vermeer: any server, any time RELease 1.0 v95 n9, pp. 12–13, Sep. 1995.

Gralla, "Browse the Internet and newsgroups, create a Web page, and keep viruses from WIN 95", Computer Shopper, v15 n12, p. 658, Dec. 1995.

"Netscape readies Navigator 2.0", The Seybold Report on Desktop Publishing, v10 n21, p. 7, Nov. 1995.

Harvey, "Working on the web: HTML authoring tools", Computer Shopper, v15 n11, p. 528(8), Nov. 1995.

Mendelson, "Ho TMetal PRO", PC Magazine, v14 n17, p. 205(2), Oct. 1995.

Collins, "HTML's first lesson: shareware and other useful tools", PC Magazine, v14 n17, p 210(2), Oct. 1995.

Hawn, "A preview of Ceneca's hot Web tools", MacWorld, v12 n11, p. 39(2), Nov. 1995.

Article by Malcolm Gladwell, entitled "Just Ask for It, the Real Key to Technological Innovation," The New Yorker, 7 Apr. 1997, vol. 23, No. 7 pp. 45–49.

Article by Jeff Jurvis, entitled "WYSIWYG Web design," Informationweek, 28 Oct. 1996, No. 603, ISSN 8750–6874, pp. 64, 66.

(List continued on next page.)

*Primary Examiner*—Joseph H. Feild
*Attorney, Agent, or Firm*—Graham & James LLP

[57] ABSTRACT

A method and apparatus for a draw-based Web page editor in which the user uses a "drag and drop" interface to add, delete, and move display elements to define the layout of a Web page. The present invention automatically generates an initial layout for each page. This initial layout contains display elements that represent the links between pages of the site. After the user has defined the layout of the Web page, the user "publishes" the page. The publish function automatically generates at least one HTML table for the page in accordance with the display elements of the page, yielding a true WYSIWYG page.

32 Claims, 43 Drawing Sheets

OTHER PUBLICATIONS

Article by Kamini Ramani, entitled "A Smarter Way to Build Web Sites: NetObjects Fusion Software Addresses Critical Need of Website Builders," NetObjects Press Release, 29 Jul. 1996, http://www.netobjects.com, pp. 1–3.

Article by Herb Bethoney, entitled "PageMill helps novice users create Web pages," Ziff–Davis Online Publications, 4 Dec. 1995, http://www.zdnet.com, pp. 1–2.

Article by Crespo et al., entitled "WebWriter: A browser–based editor for constructing Web applications," Computer Networks and ISDN Systems, vol. 28, No. 11, May 1996, pp. 1291–1306.

Article by Nikos Drakos, entitled "From text to hypertext: A post–hoc rationalisation of LaTeX2HTML," Computer Networks and ISDN Systems, vol. 27, No. 2, Nov. 1994, pp. 215–224.

Article by Rex Baldazo, entitled "Battle of the Web site builders," Byte, Jul. 1996, McGraw–Hill, USA, vol. 21, No. 7, ISSN 0360–5280, pp. 157–158.

Article by Dennis Howlett, entitled "How to build your own Web site," PC User, 10–23 Jan. 1996, EMAP Computing, UK, No. 274, ISSN 0263–5720, pp. 41–42, 44.

Article by B. Rousseau, entitled "Publishing on the Web," Cern School of Computing, 25 Oct. 1995, pp. 279–293.

Mag–net FrontPage Lessons entitled "Using Microsoft FrontPage," http://130.194.180.26/multimedia/mag–net_frontpage.htm and http://130.194.180.26/multimedia/frontpage_explorer_outline.htm, last edited on Sep. 26, 1996.

"Microsoft FrontPage Top Ten FAQ," http://www.okonline.com/topten/fpfaq.htm, pp. 1–6 (publication date unknown).

Article by Edward Mendelson entitled "Create High–powered Web Sites Without Writing HTML," published in PC Magazine Online on Sep. 10, 1996, http://search.zdnet.com/pcmag/iu/author/wysiwyg/msfpag11.htm, pp. 1–3.

FrontPage Explorer Link view, http://130.194.180.26/multimedia/frontpage_explorer_link.htm, p. 1 of 1 (publication date unknown).

FrontPage Explorer—Import File command, http://130.194.180.26/multimedia/frontpage_import_file.htm, p. 1 of 1 (publication date unknown).

FrontPage Explorer—Using the FP Editor, http://130.194.180.26/multimedia/frontpage_show_editor.htm, p. 1 of 1 (publication date unknown).

FrontPage Explorer Tools Recalculate Links, http://130.194.180.26/multimedia/frontpage_explorer_recalculate_links.htm, p. 1 of 1 (publication date unknown).

FrontPage—Start the Explorer first, http://130.194.180.26/multimedia/fronpage_start_here.htm, p. 1 of 1 (publication date unknown).

FrontPage Editor—Making Hypertext links, http://130.194.180.26/multimedia/frontpage_making_links.htm, p. 1 of 1 (publication date unknown).

FrontPage—Edit Link Tabs, http://130.194.180.26/multimedia frontpage_edit_tabs.htm, p . 1 of 1 (publication date unknown).

Article by Ben Goodman entitled "Microsoft FrontPage 1.1WYSIWYG Web Authoring," Sep. 1996, http://www5.zdnet.com/schopper/content/9609/cshp0027,html, pp. 1–3.

Article entitled "Microsoft FrontPage 97 Improves HTML Editor, Web Authoring," Dec. 1996 Issue of PC World, http://www.pcworld.com/software/internet_www/articles/dec96/1412p084a.html, pp. 1 and 2.

Adobe Technical Support entitled "HTML Extensions in PageMill 2.0," Copyright ©1998, http://www.adobe.com/supprtservice/custsupport/TECHGUIDE/PMILL/pmill_extens.html, pp. 1–5 (publication date unknown).

Adobe Technical Support entitled "PageMill 2.0 Product Announcement Press Release," listing a date of May 12, 1997 and Copyright ©1998, http:// www.adobe.com/supportservice/custsupport/NOTES/28ba.htm, pp. 1–3.

Adobe Technical Support entitled "PageMill 2.0 Press Release," listing a date of Apr. 12, 1996 and Copyright ©1998, http://www.adobe.com/supportservice/custsupport/NOTES/2102.htm, pp. 1–3.

Article by Steve Rigney, entitled "Microsoft FrontPage (Web Authoring Software)," PC Magazine, Apr. 23, 1996, Ziff–Davis Publishing Company, vol. 15, No. 8, pp. 117(3).

Article by Norman Nie, entitled "Microsoft (The FrontPage 1.1 Web Authoring/Management Software)," Computer Reseller News, Jun. 24, 1996, CMP Publications, Inc., No. 689, p. 134(2).

Laura Lemay, "Teach Yourself Web Publishing With HTML 3.0 In A Week," HTML Assistants; Editors & Convertors, 1996, pp. 150–159.

Joan E. Rigdon, "Testing How Easy 'Easy' Really Is, What Marketers Mean When They Say Mom Can Do It,"The Wall Street Journal, May 10, 1996.

E–Mail Dated Jul. 22, 1996, "CNET Selling Prism, Web Content Management System, To Web Content Management System, To Vignette For Commercial Development And Marketing," 1996.

Tood Woody, "Construction Site Building A Home On The Web," The Recorder, Jul. 25, 1996, p. 4.

Business Wire, THISoftware Co., Inc. Begins Delivery Of Its Internet Web Site Building And Management Software, "Business Editors/Computers & Electronics Writers," available on or before Jul. 4, 1996.

"IBM Netscape, Sun And The Rockefellers Share On Enthusiasm," The Wall Street Journal, Jul. 26, 1996, p. B3.

Initial Draw Objects

Draw objects before moving text display element

Draw objects after moving text display element

Banner

Navigator Button

Navigator Button

Text Navigator
Button

Publish
(Build HTML for Page)

Build a
Normal Page

Build a
Stacked Page

Create initial HTML

Build an HTML Table

Generation of HTML for an HTML table in accordance with matrix

2502

```
<P> <A HREF = netobjects homepge URL>
    <IMG SRC=link image\ BORDER=0>
    </A>
</P>
</BODY>
</HTML>
```

Generate final
HTML
Fig. 25

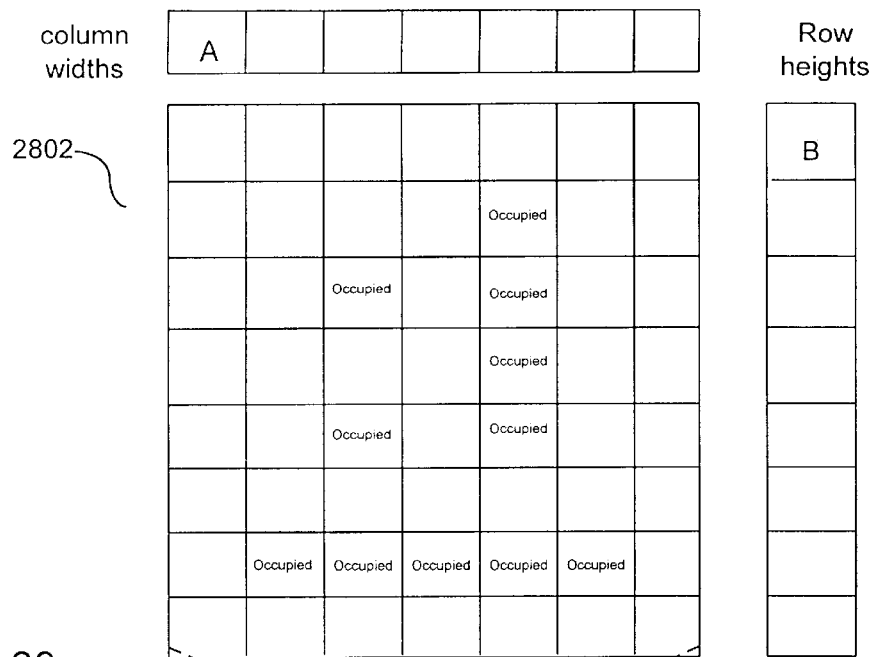
Fig. 29
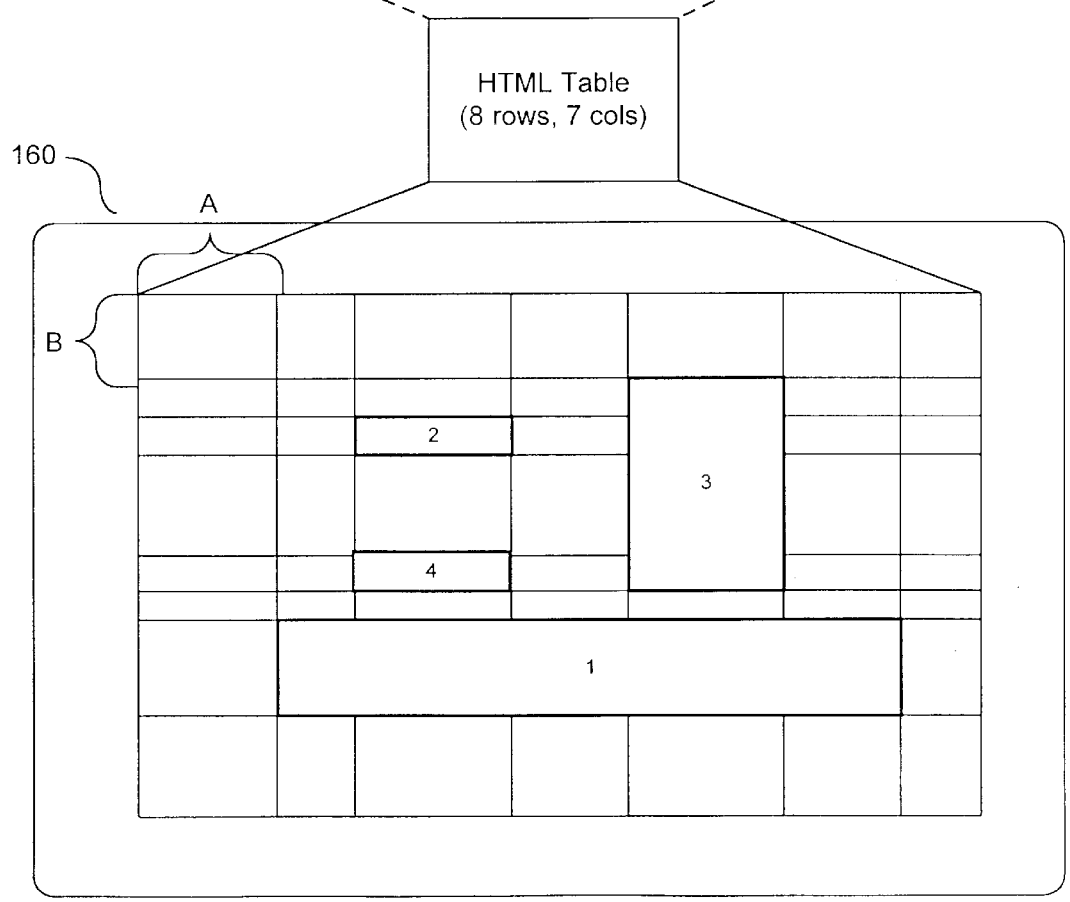

The Object Definition Dialog Box

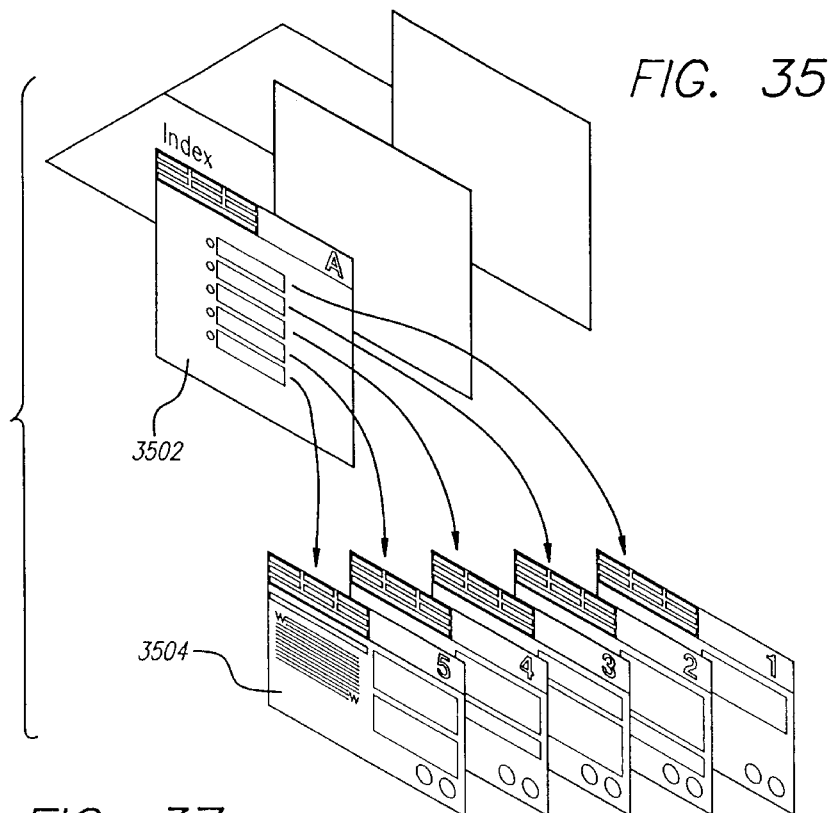
FIG. 35
FIG. 37
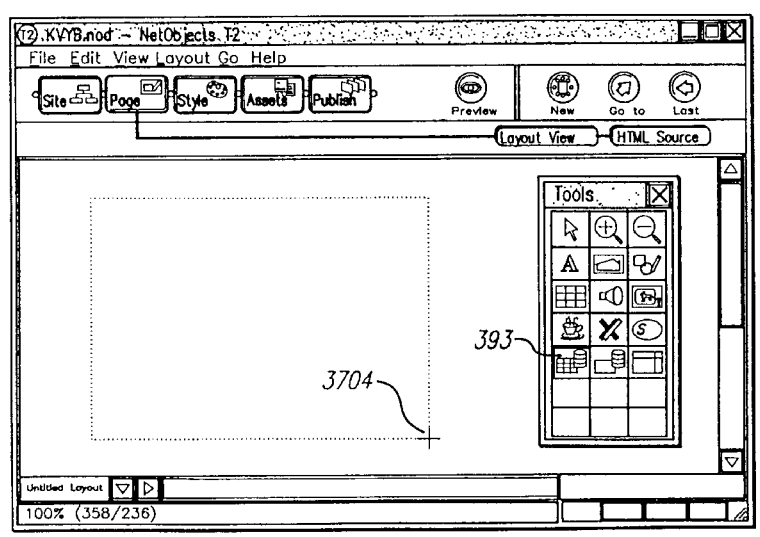

DRAW-BASED EDITOR FOR WEB PAGES

RELATED APPLICATION

The following application is related to the subject application and is herein incorporated by reference: U.S. application Ser. No. 08/687,971 of Samir Arora et al., filed concurrently herewith, and entitled "Hierarchical Structure Editor for Web Sites."

APPENDIX

Appendix A provides an example of computer code for a draw object for text and a draw object for an image. This Appendix forms a part of the specification and is herein incorporated by reference.

FIELD OF THE INVENTION

This application relates to the World Wide Web and, in particular, to a method and apparatus for easily generating web pages on a "What You See is What You Get" (WYSIWYG) basis.

BACKGROUND OF THE INVENTION

The past several years have seen an explosive growth of the World Wide Web ("the Web"). The Web is built around a network of "server" computers, which exchange requests and data with each other using the hypertext transfer protocol ("http"). A human designer designs the layout of a Web page, which is then specified using HTML ("Hypertext Markup Language"). Several versions of HTML are currently in existence. Examples include HTML versions 2.0 and 3.0, as specified by the WWW Consortium of MIT. Netscape Communications Corp. has specified additional HTML features that extend HTML forms and tables.

A user views a Web page using one of a number of commercially available "browser" programs. The browser submits an appropriate http request to establish a communications link with a Web server of the network. A typical http request references a Web page by its unique Uniform Resource Locator ("URL"). A URL identifies the Web server hosting that Web page, so that an http request for access to the Web page can be routed to the appropriate Web server for handling. Web pages can also be linked graphically to each other.

The HTML to describe a Web page is often created by hand by a human being. If the design of the page changes, the corresponding HTML must be rewritten, which is an exacting process. Although several conventional HTML editors exist, these editors only allow the user to specify certain elements of a page and frequently still require the user to physically enter HTML code. Conventional HTML editors allow the user to specify the page content and general layout, but do not provide the user with "What You See Is What You Get" (WYSIWYG) capability. Thus, the pages generated by conventional HTML editors look different when viewed by different browsers.

A Web "site" consists of a "homepage" and several other related pages. Each page has corresponding HTML that describes the appearance and function of the page. For example, the HTML for the homepage usually contains links to one or more of the other pages and the other pages often contain respective links back to the homepage. When the user clicks on a link of the displayed homepage, the browser requests and displays the linked-to page. Each link must be designed and coded into the HTML for the page. Thus, for example, when a human designer decides to remove a link between the homepage and another page, the HTML for the homepage must be changed to reflect the removed link. This process is exacting and requires that the user manually change the link. Moreover, if the linked-to page has another link back to the homepage, that link may also need to be changed.

It is a common problem that not all browsers interpret HTML code in the same way. For example, some browsers will automatically center a page title, while others may left justify a page title. Similarly, horizontal and vertical spacing may vary between browsers made by different companies.

It is usually desirable to have a consistent style for all pages of a site. When the user hand codes the HTML for each page of a site, it is difficult for the user to remember to use a consistent style. In addition, if the user decides to change the style of a site, each page must be changed individually.

SUMMARY OF THE INVENTION

The present invention overcomes the problems and disadvantages of the prior art by using a drag and drop interface to allow a user to easily design a Web page. The user moves display elements to define the appearance of a web page. When the user clicks/selects a "publish" button, HTML code is automatically generated. A preferred embodiment of the invention generates an HTML table in accordance with the display elements. The number and size of cells in the HTML table reflects the number and placement of display elements on the page, yielding a true WYSIWYG Web page. Because the generated HTML code is in the form of a table, the HTML will cause most browsers to display a page that has substantially the same layout, proportionality, coloring, and spacing as the layout of the page displayed by the page draw editor software.

Initially, the present invention automatically generates a layout that is used for each page unless overridden by the user. Each page is initially generated in accordance with "style" parameters chosen by the user.

In accordance with the purpose of the invention, as embodied and broadly described herein the invention is a method of allowing a user to define a World Wide Web page comprising the steps, performed by a data processing system, of: displaying a plurality of page display elements on a display device, the display elements forming a page layout on the display device; receiving an indication that the user wants to add a new display element to the page at a first position on the page; adding a new draw data structure in a memory of the data processing system for the new display element to a plurality of other draw data structures, the draw data structures corresponding to the plurality of page display elements, where the new draw data structure includes data representing the first position; and generating HTML that substantially reflects the displayed page layout on a pixel by pixel basis in accordance with the draw data structures.

Advantages of the invention will be set forth in part in the description which follows and in part will be obvious from the description or may be learned by practice of the invention. The advantages of the invention will be realized and attained by means of the elements and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 25 is an example of steps performed by the page editor to generate final HTML for a page.

FIG. 29 is a block diagram of how the matrix of FIG. 28 is used to generate an HTML table, which a browser uses to display a portion of a page.

FIG. 35 shows a block diagram of an example of a stacked page and a series of data pages.

FIG. 37 shows an example in which a user has opened the Tool window and selected the DataList tool.

DETAILED DESCRIPTION OF PREFERRED EMBODIMENTS

Reference will now be made in detail to a preferred embodiment of the invention, an example of which is illustrated in the accompanying drawings. Wherever possible, the same reference numbers will be used throughout the drawings to refer to the same or like parts.

I. System Overview

Figure 1:
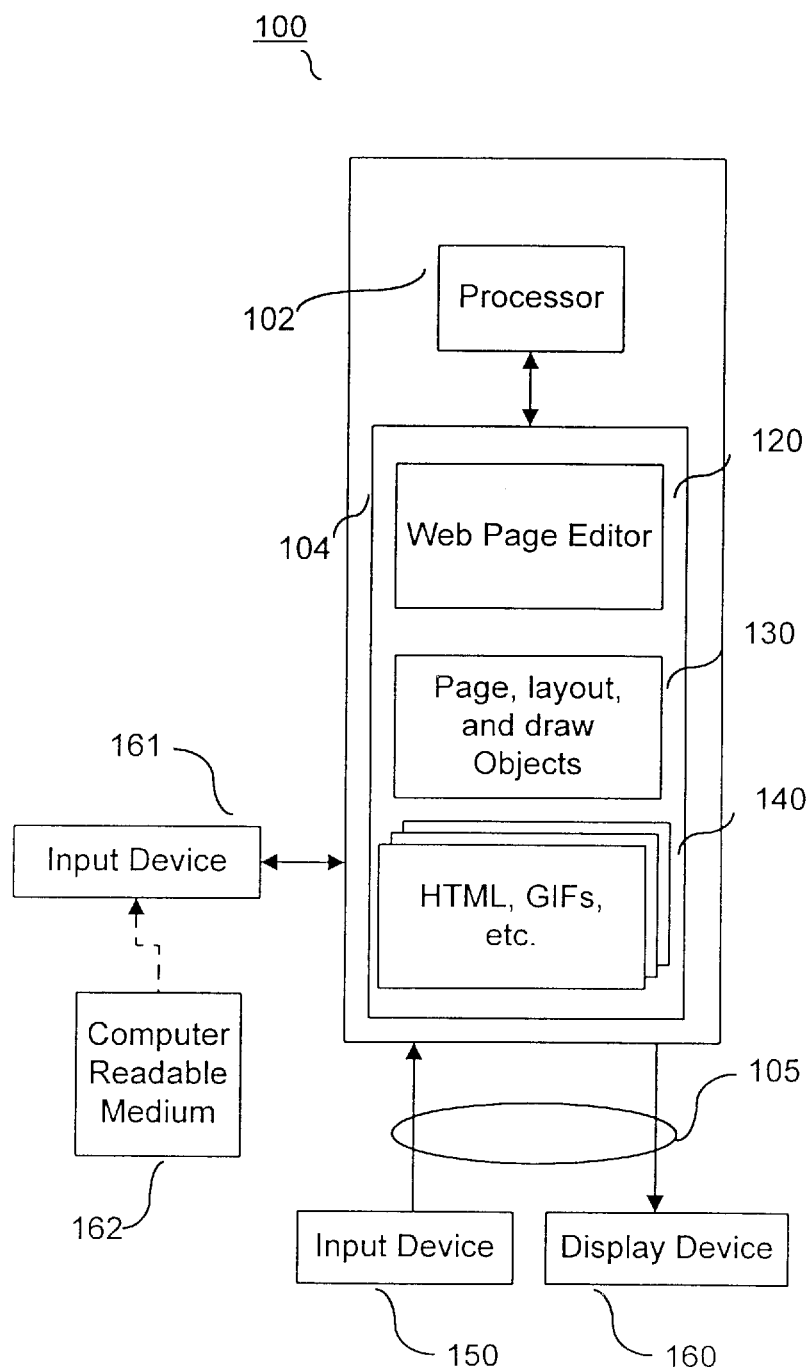
FIG. 1 is a block diagram of a computer system in accordance with a preferred embodiment of the present invention.

FIG. 1 is a block diagram of a computer system 100 in accordance with a preferred embodiment of the present invention. Computer system 100 includes a CPU 102; a memory 104; input/output lines 105; an input device 150, such as a keyboard or mouse; and a display device 160, such as a display terminal. Computer 100 also includes an input device 161, such as a floppy disk drive or CD ROM reader, that reads computer instructions stored on computer readable medium 162, such as a floppy disk or a CD ROM. These computer instructions are the instructions of e.g., page draw editor software 120. Memory 104 includes page draw editor software 120, draw objects 130, HTML 140, and image files 140, etc., as described in further detail below.

A person of ordinary skill in the art will understand that memory 104 also contains additional information, such as application programs, operating systems, data, etc., which are not shown in the figure for the sake of clarity. It also will be understood that computer system 100 can also include numerous elements not shown in the Figure for the sake of clarity, such as disk drives, keyboards, display devices, network connections, additional memory, additional CPUs, LANs, internet connections, input/output lines, etc.

In the following discussion, it will be understood that the steps of methods and flow charts discussed preferably are performed by processor 102 executing instructions stored in memory, such as instructions of editor software 120. Editor software 120 can be initially loaded into memory from computer readable medium 162. It will also be understood that, although the following paragraphs describe an implementation of the present invention using object-oriented programming techniques, the invention is not limited to any such techniques and may be implemented using any appropriate techniques for implementing the functionality described herein. The described embodiment is written in the C++ programming language and runs under the Windows 95 operating system, but the invention is not limited to any particular programming language or operating system. ("Windows 95" is a trademark of Microsoft Corporation.)

II. Creation and Manipulation of a Web Page Layout

Figure 2:
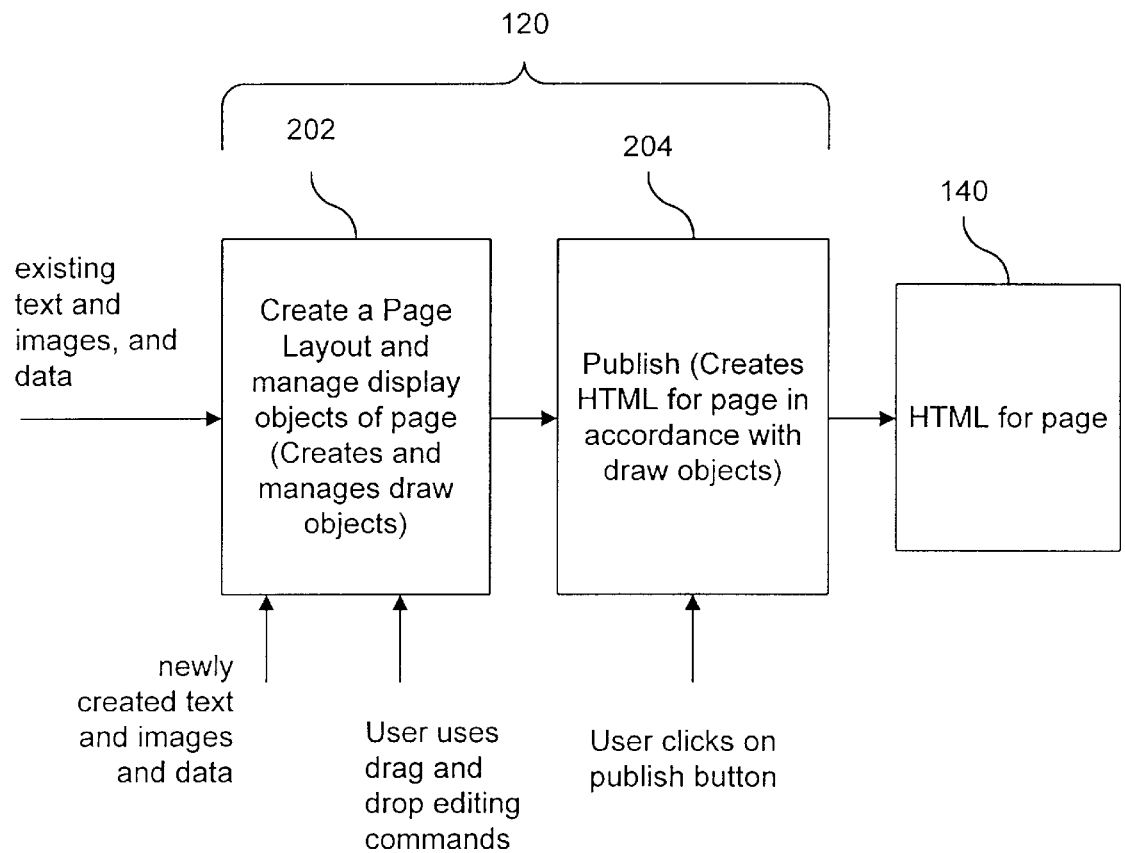
FIG. 2 is a block diagram showing input and output to and from page draw editor software of FIG. 1.

FIG. 2 is a block diagram showing input and output to page draw editor software 120 of FIG. 1. Page draw editor 120 includes a portion 202 that creates and manages a page layout and a portion 204 that publishes the page. The user uses a drag and drop interface to define the page layout. Pages can include new text and images or preexisting text and images. The user initiates publish portion 204 by clicking on a "publish" button displayed by the editor 120, as described below. Publish portion 204 generates HTML for the page, as also described below. The page is translated into an HTML table that yields a WYSIWYG Web page when displayed by a browser.

A. Creating and Modifying Display Elements of a Page Layout

Figure 3:
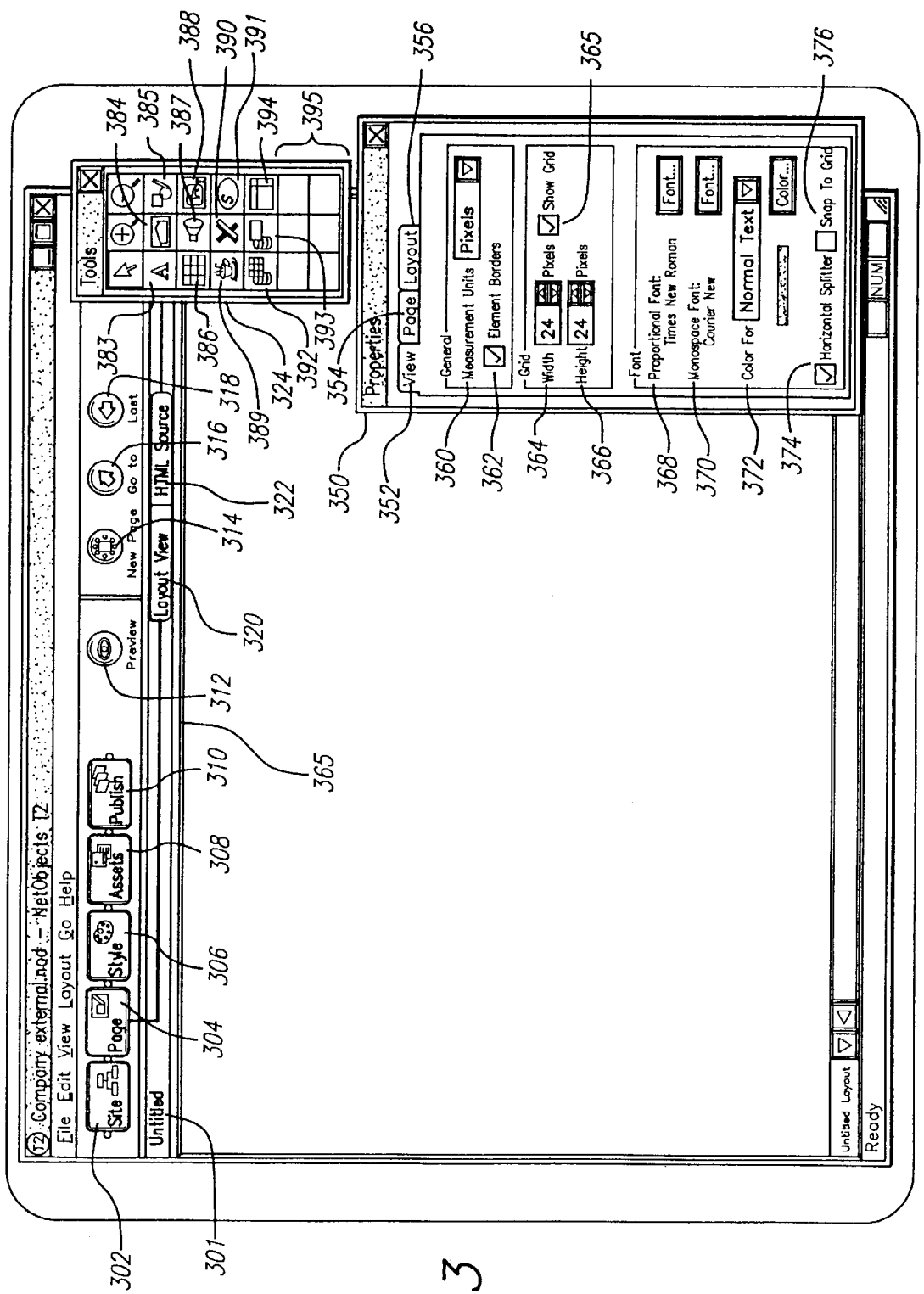
FIG. 3 shows an example of display view before the user has created any display elements on the page.

FIG. 3 shows an example of a page view displayed on display device 160 before the user has created any display elements on the page. The display of FIG. 3 is opened when the user indicates (using a pull-down menu or the like) that he wishes to create a new page. In the described embodiment, the user clicks on a "Page" button 304 in the navigator bar. The page draw editor allows the user to design a page just as it will appear when viewed with a browser. The user uses the page draw editor to add text graphics, and other display elements to the page. The user can then rearrange display elements by dragging and dropping them to a new location, placing the display elements exactly where they will eventually appear with pixel level accuracy.

A title 301 of the page defaults to "Untitled" if the user has not yet named the page. FIG. 3 includes a grid of lines. These lines are shown as dotted lines, but can also be solid lines. In the described embodiment, the grid also can be turned off so that no grid is displayed. The grid preferably is not included in the generated HTML. In FIG. 3, the grid has a granularity of 24×24 pixels in accordance with a default width as shown in a Properties window 350, as discussed below.

The display of FIG. 3 includes a plurality of buttons: a "Site" button 302, "Page" button 304, a "Style" button 306, an "Assets" button 308, and a "Publish" button 310. The display also includes a "Preview" button 312, a "New Page" button 314, a "Goto" button 316, and a "Last" button 318. Site button 302 causes execution of a "site editor" as described in U.S. application Ser. No. 08/687,971 of Samir Arora et al., filed concurrently herewith, and entitled "Hierarchical Structure Editor for Web Sites." Style button 306 and Assets button 308 are discussed below. New Page button 314 causes a page such as the page of FIG. 3 to be displayed.

Goto and Last buttons 316, 318 transfer control to a most recent display or a user-selected previous display, in a manner known to persons of ordinary skill in the art. The described embodiment keeps a "history" of execution of page draw editor 120 in order to implement the Goto and Last buttons.

The display of FIG. 3 further includes a Secondary navigator bar 365, including a "Layout View" button 320 and an "HTML Source" button 322. When the user clicks on Layout View button 320, a display having a format such as that of FIGS. 3–8 is displayed. When the user clicks on HTML Source button 322, a display (not shown) shows the HTML that is generated for the current page layout. Button 322 is omitted in an alternate embodiment. Other views have other buttons and toggle switches on the secondary navigator bar, as required by the particular view. Secondary navigator bar 365 contains a dotted line extending vertically downward from a currently clicked button (e.g., Page button 304) to a selected one of the buttons on secondary navigator bar 365. As the user selects different buttons on the primary and secondary navigator bars, the dotted line is redrawn to connect the currently selected buttons. This feature makes it easy for a user to see which buttons are currently selected and to mentally connect the functions of the primary and secondary navigator bars.

FIG. 3 also shows "Properties" window 350 in which a "View" tab is selected. Properties window 350 includes three tabs: a "View" tab 352, a "Page" tab 354, and a "Layout" tab 356. The values shown in Properties window 350 are values for the current page. Properties window 350 currently shows view properties because View tab 352 is selected. FIGS. 10(*a*) and 10(*b*) show examples of the Page and Layout tabs, respectively. A fourth tab (see, e.g., FIG. 10(*c*)) is a context sensitive tab and represents various properties, depending on the tool being used. Other tabs may appear in other implementations.

The values shown in Properties window 350 of FIG. 3 are the default values for viewing a newly created page. Properties window 350 includes a "Measurement Unit" area 360, a "Element border" flag area 362, "Grid Width" and "Grid Height" areas" 364, 366, a "Show Grid" flag 365, font size areas 368, 370, a "Color" area 372, a "Horizontal Splitter" flag area 374, and a "Snap to Grid" flag area 376.

Thus, in the example, the grid is measured in units of pixels. Element borders are drawn around each display element on the display device. A grid of 24×24 pixels is displayed. The specified fonts are used. The page uses the colors described in the colors area 372. Horizontal splitters such as 380 and 382 are displayed. The "Snap to Grid" property is turned off. It will be understood by persons of ordinary skill in the art that page draw editor software 120 stores values corresponding to this Property window and each Property window discussed herein in memory 104. All values in Properties window 350 may be changed by the user. Values in memory 104 will be changed accordingly.

Figure 9A:
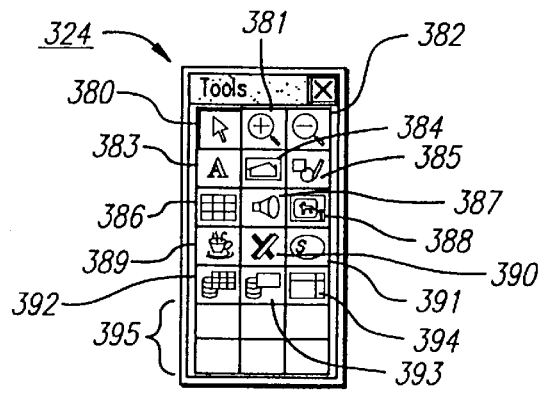
FIG. 9(a) shows a detail of a tool window of FIG. 3.

The display of FIG. 3 further includes a "Tools" window 324. As shown in FIG. 9(a), Tools window 324 includes a "cursor" tool 380, a "zoom in" tool 381, and a "zoom out" tool 382. These three tools have an outward operation similar to "cursor," "zoom in," and "zoom out" tools known in the art. The "cursor," "zoom in," and "zoom out" tools are collectively known as "control tools."

Tools window 324 also contains a "Text" tool 383, an "Image" tool 384, a "Draw" tool 385, a "Table" tool 386, an "Audio" tool 387, a "Video" tool 388, a "Java" tool 389, an "ActiveX" tool 390, a Shockwave tool 391, a "Form" tool 392, a "DataList" tool 393, and a "DataField" tool 394. The Text, Image, Draw, Table, Audio, Video, Java, ActiveX, Shockwave, Form, DataList, and DataField tools are collectively known as "content tools." (Java is a trademark of Sun Microsystems, Inc. Shockwave is a trademark of Shock-Wave Corp. ActiveX is a trademark of Microsoft Corporation.) Tools window 324 also includes a plurality of buttons 395 that contain various buttons at various time, as discussed below in connection with various ones of the tools.

It will be understood that the empty page of FIG. 3 can be edited in the same manner described below for an existing page.

Figure 4:
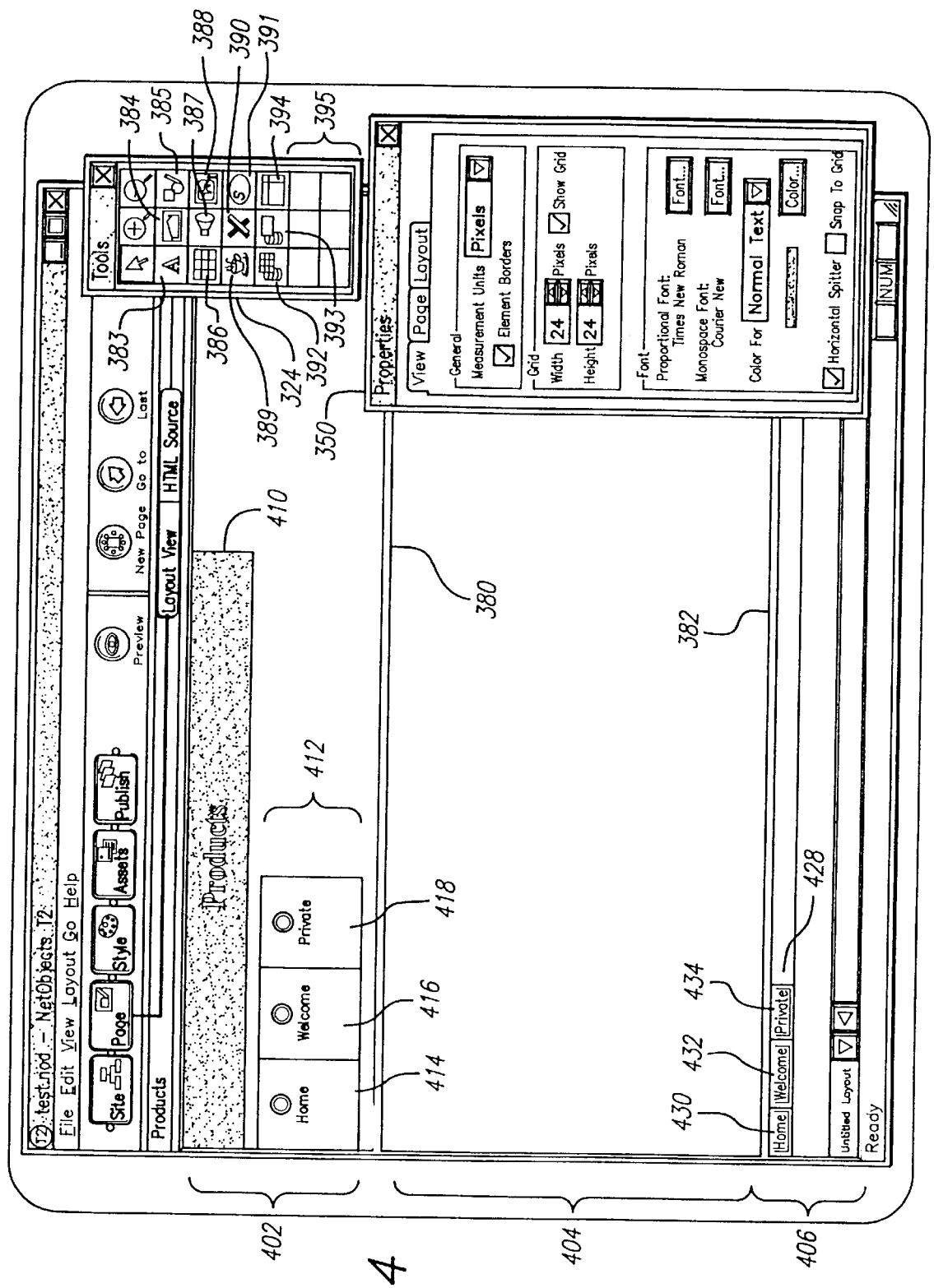
FIG. 4 shows the display of FIG. 3, including a banner, navigator buttons, and text buttons automatically created by a preferred embodiment of the present invention.

FIG. 4 shows the display of FIG. 3, including a banner, navigator buttons, and text buttons automatically created by a preferred embodiment of the present invention. The example of FIG. 4 is displayed after the user indicates that he wants to edit an existing page by preferably: 1) double clicking on an icon for the page (not shown) or 2) selecting a page icon and clicking "Page" button 304 of FIG. 3 (not shown). The described embodiment of the present invention automatically creates certain draw objects in memory for the page. The automatically created draw objects reflect links between pages of the site, as described below in the copending application. The user can easily create and move display elements on the page, which causes changes to corresponding draw objects in memory 104.

The display of FIG. 4 creates a page having three parts: a header 402, a body 404, and a footer 406. The user can move the dividers 380, 382 between the header, body and footer as is known in the art. Moving the dividers adjusts the size of the header, body or footers on the finished page. The header, body and footers can also be scrolled. Page draw editor 120 allows individual scrolling in each of these parts. In the described embodiment, the page of FIG. 4 is entered from the site view, and automatically creates display elements of header 402 and footer 406 reflecting the logical connection of the current page to other pages.

Header 402 automatically contains a banner 410 and a plurality of navigator buttons 412. In the example, the banner contains the name of the selected page ("Products"). Navigator buttons 412 include buttons for a homepage ("Home button 4), a "Welcome" page ("Welcome" button 416), and a "Private" page ("Private" button 418). Navigator buttons 412 preferably include an image, such as the 3D button image shown in FIG. 4. This image may be pre-defined or defined by the user through use of a pop-up window.

Thus, in FIG. 4, the navigator buttons 412 automatically include buttons corresponding to the home page and to the previous hierarchical level of the page. Alternate implementations of the present invention automatically display navigator buttons for one or more of the home page, the parent page, sibling pages, and children pages. In some embodiments, the user chooses which navigator buttons are generated automatically by way of a pop-up site window. The user may add or delete additional buttons and may move buttons, as described below.

Footer 406 automatically contains a plurality of text buttons 428. These text buttons preferably correspond to the navigator buttons 412. Thus, text buttons 428 include buttons for the homepage ("Home text button 430), the Welcome page 452 ("Welcome" text button 432), and the "Private" page 454 ("Private" text button 434). The user may add or delete additional buttons and may move buttons, as described below. The internal memory representation of banner 410 and of buttons 412 and 430 are discussed in detail below.

Figure 5:
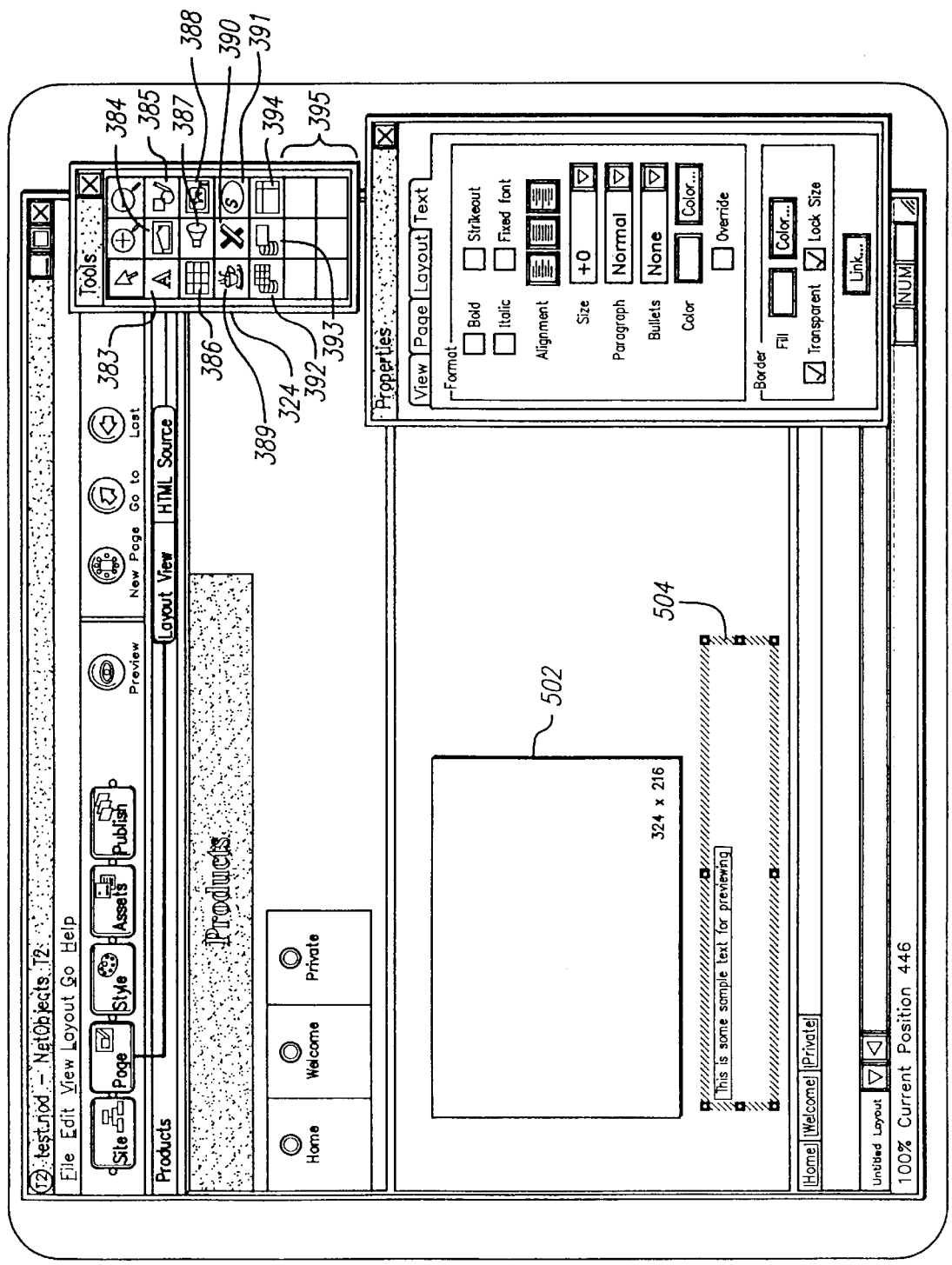
FIG. 5 shows the display of FIG. 4 after the user has dragged and dropped an image and some text into the layout.

FIGS. 5–8 show an example of creation of display element in a page layout and also show an example of a modification to the page layout using a drag and drop interface in accordance with the described embodiment of the preferred invention. FIG. 5 shows the display of FIG. 4 after the user has dragged and dropped an image 502 and some text 504 into the layout. Specifically, as discussed in detail below, the user creates image 502 using Image tool 382 and creates text 504 using Text tool 383. In the example, image 502 is a 324×216 pixel image originally stored in memory or on a storage device attached to computer system 100.

Figure 6:
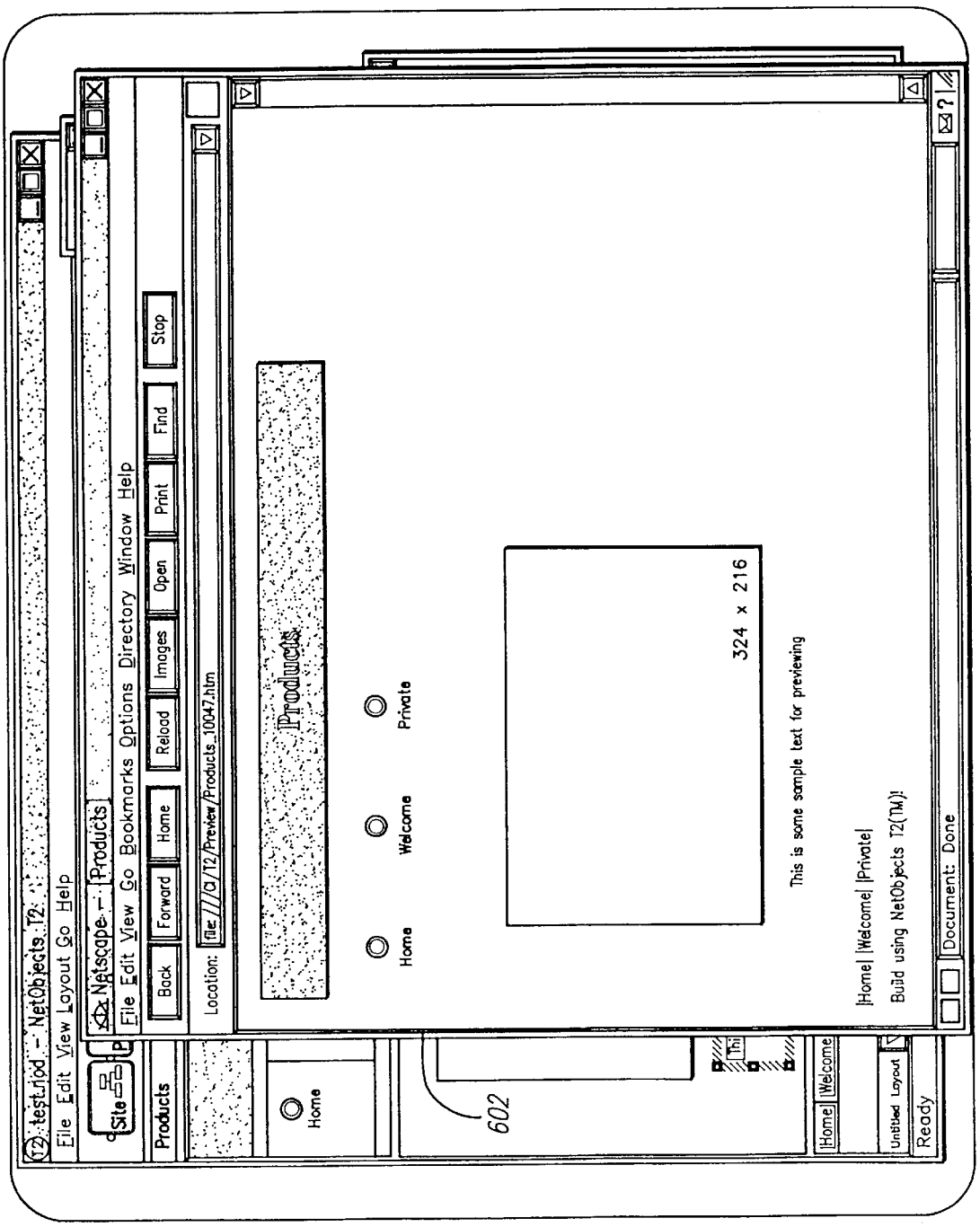
FIG. 6 shows a preview display of the layout of FIG. 5.

FIG. 6 shows a preview display of the layout of FIG. 5. FIG. 5 is displayed when the user clicks on Preview button 312 of FIG. 3 (or selects "Preview" from a pull-down menu). In order to preview a site, page draw editor 120 actually generates HTML for the current layout of the page and stores it at a predetermined (or user-defined) location. The editor then invokes a browser program (such as the Netscape Navigator browser, version 3.x, manufactured by Netscape Communications Corp. of Mountain View, Calif.). The browser displays a Web page 602 described by the generated HTML. Note that no HTML is generated for dividers 380, 382 and that no HTML is generated for the outlines around the text and image.

Figure 7:
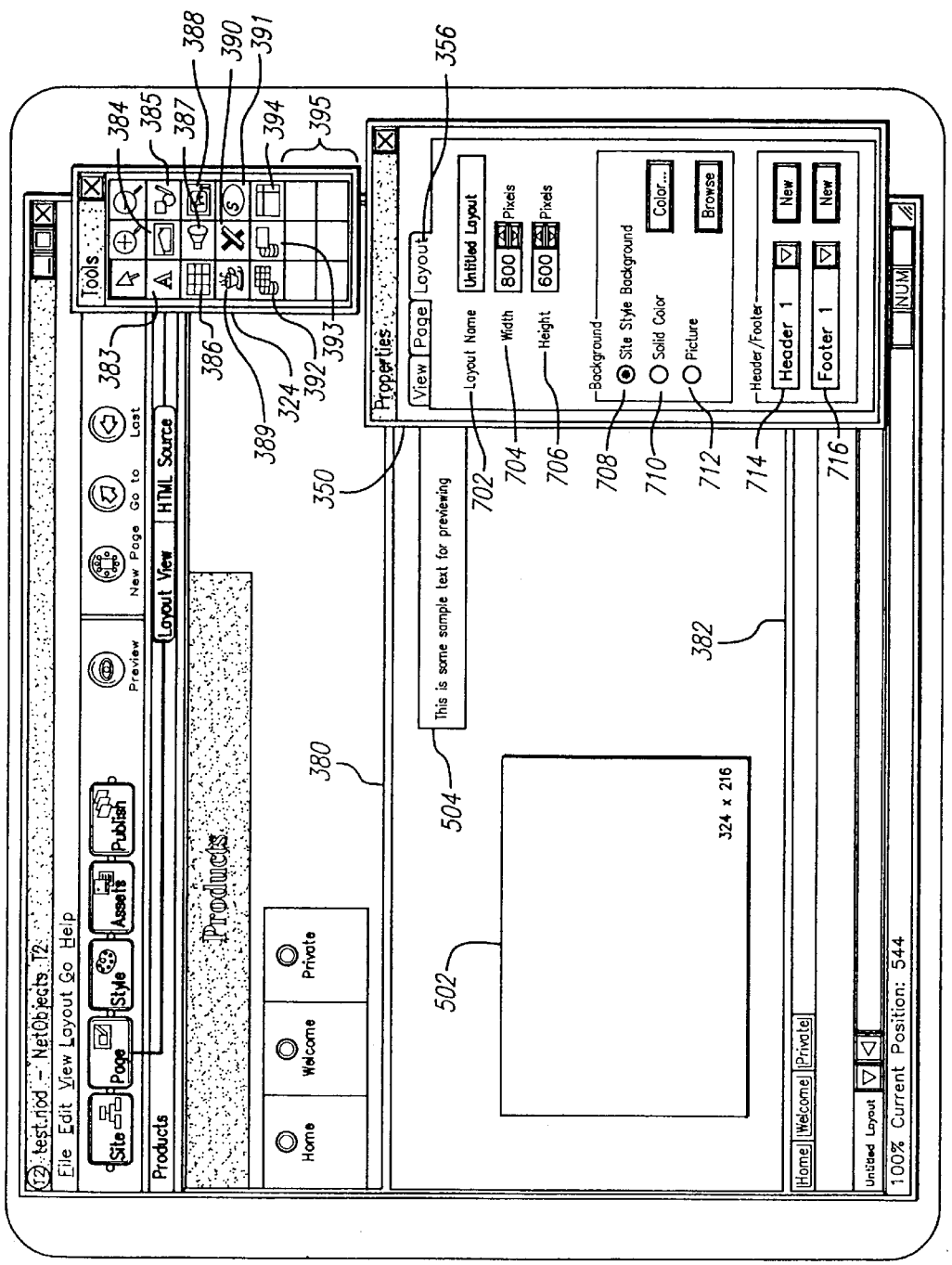
FIG. 7 shows the display of FIG. 5 after the user has dragged and dropped the text to a different location on the page.

FIG. 7 shows the display of FIG. 5 after the user has dragged and dropped the text to a different location on the page. Specifically, as discussed in detail below, the user places a cursor on text 504 using input device 150 (such as a mouse) and drags the text to a new position using input device 150. Movement of a display element on a display device in accordance with cursor input is known in the art and will not be described herein. The draw object associated with text 504 is changed to reflect this movement as described below.

FIG. 7 also shows Properties window 350 in which "Layout" tab is selected. The values shown in Properties window 350 are values for the current page. Properties window 350 (with a Layout tab) includes a "Layout Name" area 702, a "Width" area 704, a "Height" area" 706, a "Site Style Background" 708, a "Solid Color" area 710, a "Picture" area 712, a "Head Name" area 7, and a "Footer Name" area 716.

Thus, in the example, Layout of FIG. 7 is currently untitled. The layout is of the specified height and width. The page uses the type of background described in areas 708–712 (i.e., a predetermined "Site style background", such as a picture of a marbled surface) instead of a solid background or a image background provided by the user. It will be understood by persons of ordinary skill in the art that page draw editor software 120 stores values corresponding to this Property window and each Property window discussed herein in memory 104. All values in the Properties window 350 of FIG. 7 may be changed by the user. Values in memory 104 will be changed accordingly.

Figure 8:
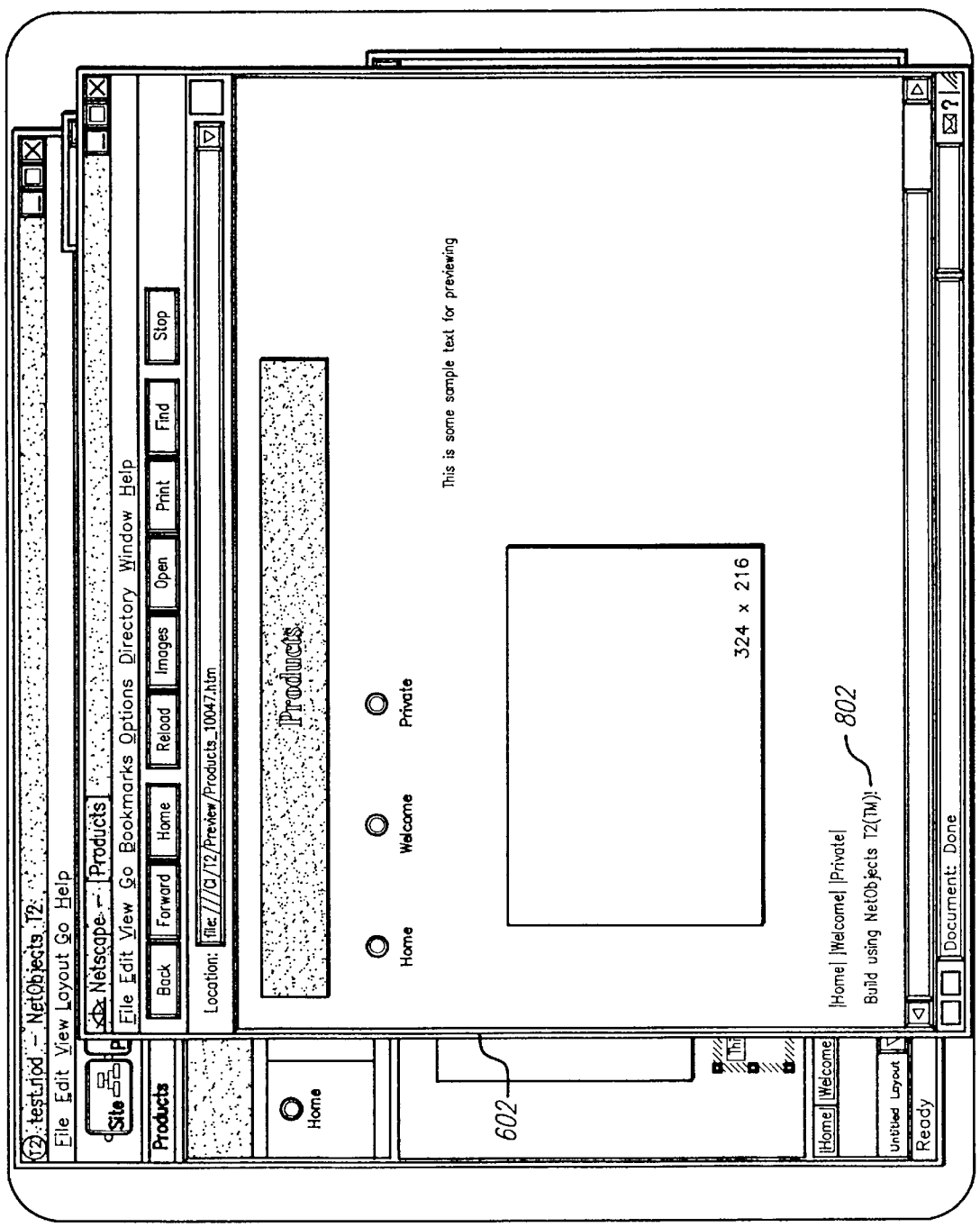
FIG. 8 shows a preview display of the layout of FIG. 7.

FIG. 8 shows a preview display of the layout of FIG. 7. As shown in FIG. 7, the user has dragged and dropped text 504 to a new location, thus changing the page layout. The Preview function causes new HTML for the changed page layout to be generated and the new HTML to be displayed by the browser in window 602. It will be understood that, in the Preview views of both FIGS. 6 and 8, the HTML generated for the page causes a browser to display a page that is pixel-per-pixel the same as the display elements on the display screen, assuming that the browser supports Netscape version 3.X. Thus, the user can design a page layout and expect the page to look exactly as it was designed when the page is displayed by a browser. Tag 802 is an optional line resulting from HTML generated in the described embodiment of the present invention.

1. The Pull Down Menus

Figure 11A:
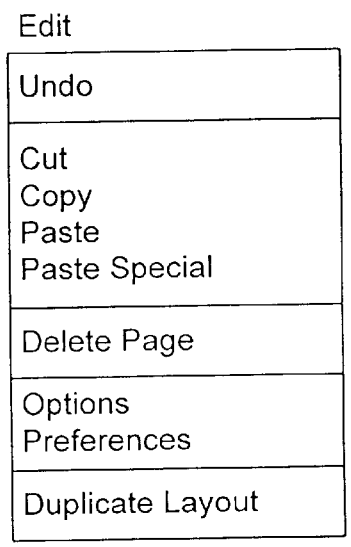
FIG. 11(a) shows a first pull-down menu.
Figure 11B:
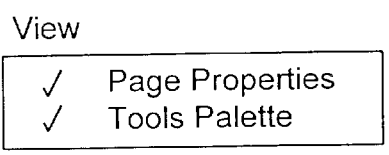
FIG. 11(b) shows a second pull-down menu.
Figure 11C:
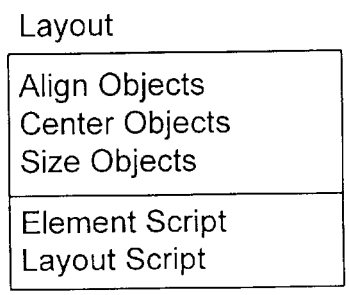
FIG. 11(c) shows a third pull-down menu.

FIGS. 11(a) through 11(c) show examples of pull-down menus for the described embodiment of draw page editor 120. FIG. 11(a) shows an Edit menu having an Undo function, a Cut function, a Copy function, a Paste function, a Paste Special function, a Delete Page function (A delete display element function is not shown), an Options function, a Preferences section, and a Duplicate Layout function, which duplicates a current page layout (and its associated draw object data structures) for a new page.

FIG. 11(b) shows a View pull-down menu, which includes a Page Properties function that opens, e.g., Properties window 350 with a page tab selected, and Tools Palette function that opens, e.g., Tools window 324.

FIG. 11(c) shows a Layout pull-down menu, which includes an Align Objects function that horizontally, vertically, or centrally aligns display elements, a Center Objects function that centers display elements, a Size Objects function that sizes display elements, an Element Script function, and a Layout script function.

2. The Tools Window

FIGS. 9(a) through 9(d) show examples of Tool window 324 and show various icons that are displayed in area 395, depending on which tool is being used. Some of the tools of the described embodiment can be thought of as a Swiss army knife; when you select one, a secondary group of tools appears in area 395, each secondary tool performing a different function on the same kind of display element.

3. The Text Tool

Figure 10A:
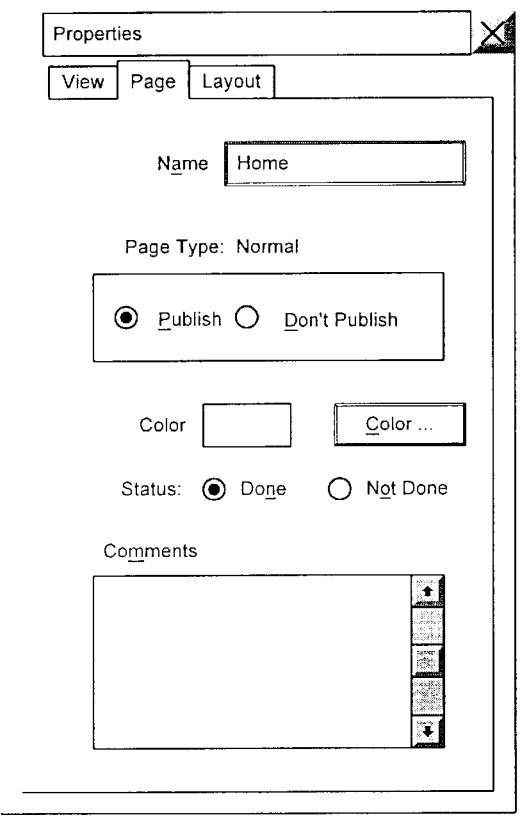
FIG. 10(a) shows a Page tab in a Properties window of FIG. 3.
Figure 10B:
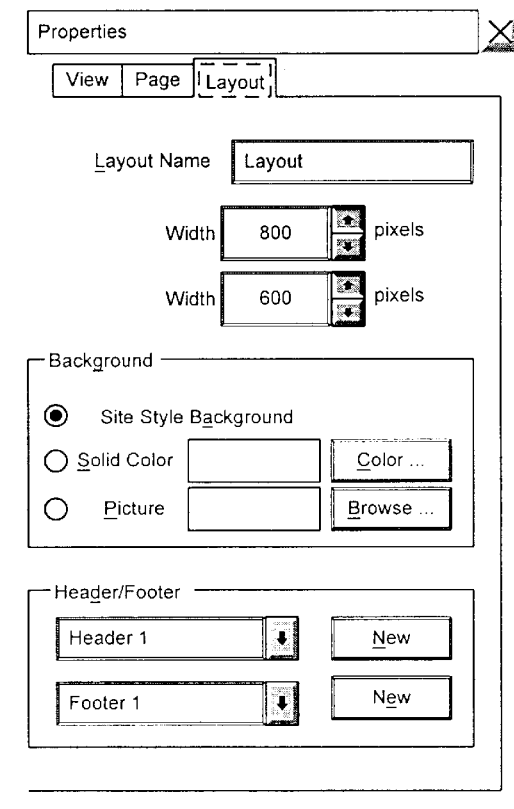
FIG. 10(b) shows a Layout tab in the Properties window of FIG. 3.
Figure 10C:
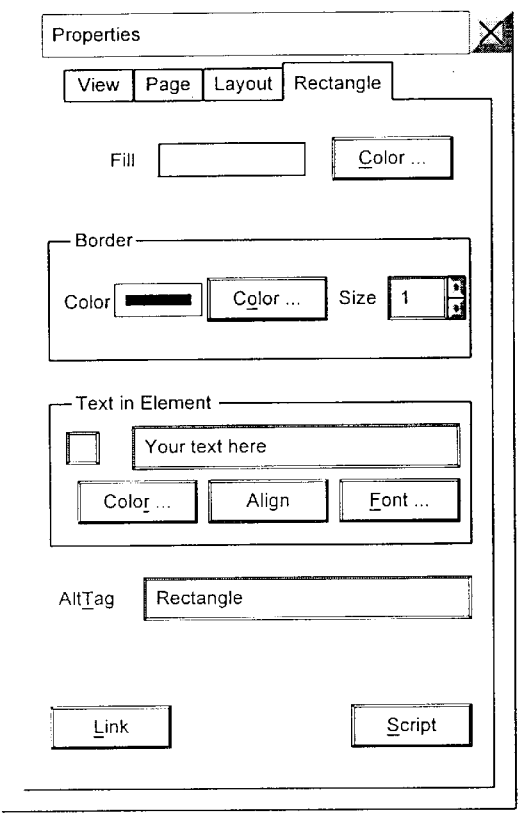
FIG. 10(c) shows a Rectangle tab in the Properties window of FIG. 3.
Figure 10D:
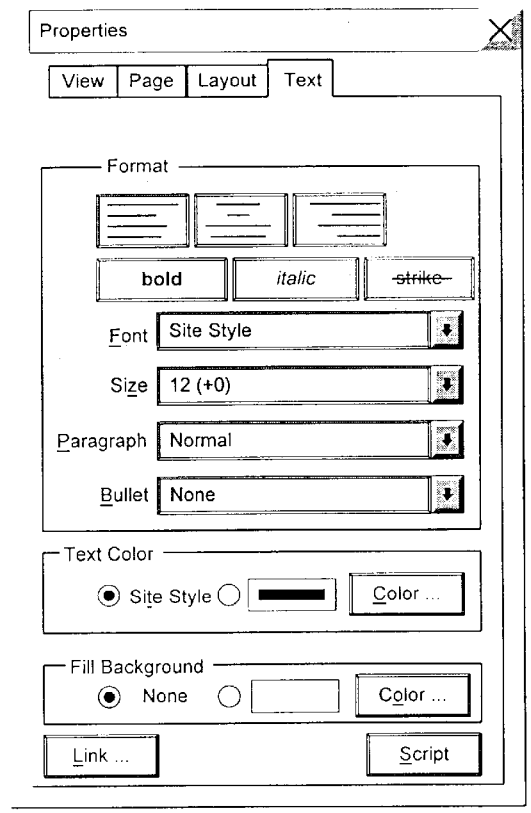
FIG. 10(d) shows a Text tab in the Properties window of FIG. 3.
Figure 10E:
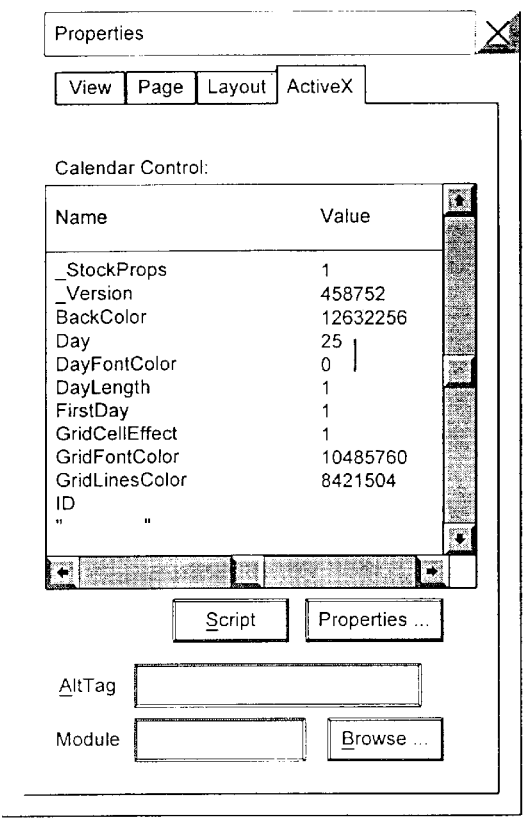
FIG. 10(e) shows an ActiveX tab in the Properties window of FIG. 3.
Figure 10F:
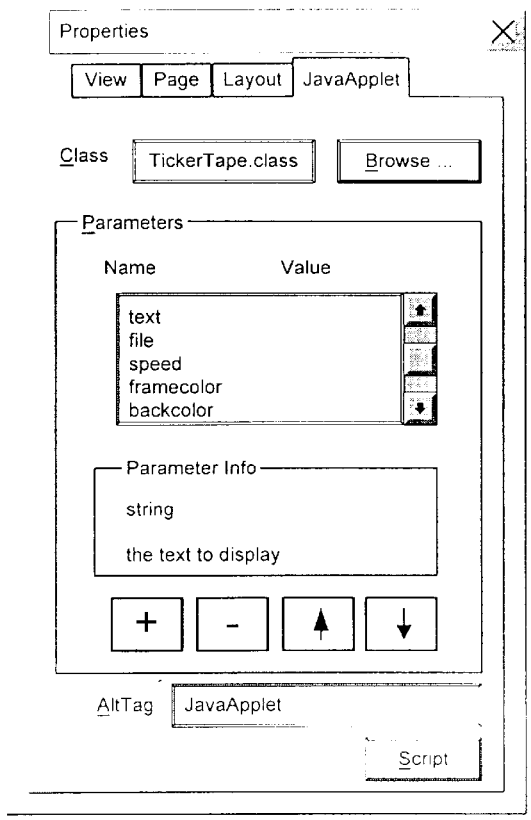
FIG. 10(f) shows a Java tab in the Properties window of FIG. 3.
Figure 10G:
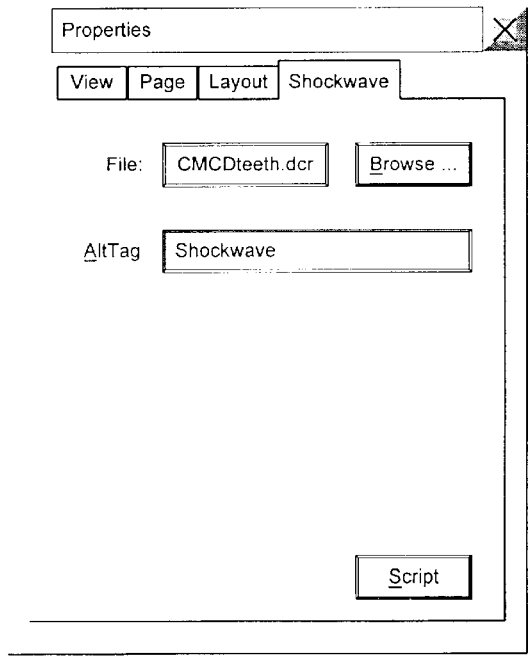
FIG. 10(g) shows a Shockwave tab in the Properties window of FIG. 3.
Figure 10H:
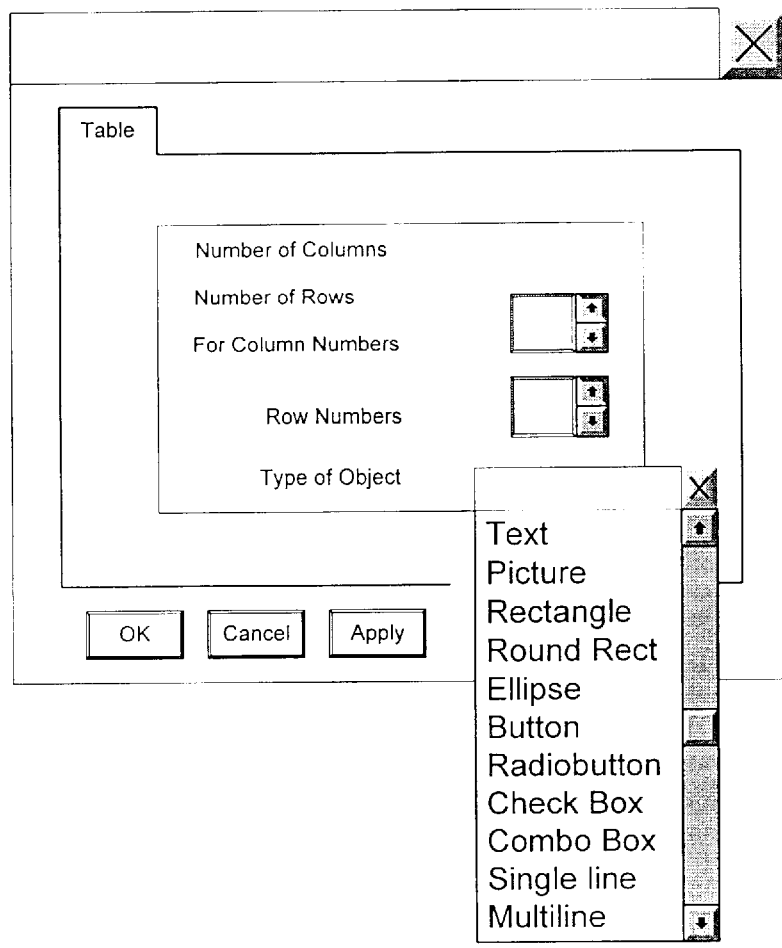
FIG. 10(h) shows a Table tab in the Properties window of FIG. 3.

When the user clicks on Text tool 383, page draw editor 120 allows the user to enter a text display element. The user uses the cursor to create and size a text box on the display and then types text inside it. When text is created, a Text tab shown in FIG. 10(d) is displayed in the Properties window 350. This Properties window allows the user to enter properties of the text display element. These properties include whether the text is bold, italic, or has a strike-out bar, the font, the font size, paragraph alignment, and whether to use a bullet. The properties further include whether to use a predetermined "site style" for the text (i.e., a predetermined font, color, size, etc. stored in memory 104 under a "site style name") or whether to use a user-specified text color. The user may also specify a fill color for the text box. If the user indicates that the text box is also a link, he may also fill in the name of an associated script (e.g., a CGI script). Once the link is created, the location of the link is added to a list of hotspot locations stored in memory and values are stored in the text draw object to indicate that the text contains a hot spot and its URL. Once the user has specified the text, a text draw object is added to the list of draw objects. Currently, not all browsers support custom fonts. Netscape Navigator 3.0, however, supports such custom fonts and other browsers are expected to do so in the future.

4. The Image Tool

When the user clicks on Image tool 384, page draw editor 120 allows the user to specify an image display element. Unlike the text boundary, the image boundary resizes to fit a user-specified image. Once the image has been added to the display, the user can create a link on all or part of the image or select one color in the image as transparent. The user can also change the size of the image using the cursor.

Figure 9B:
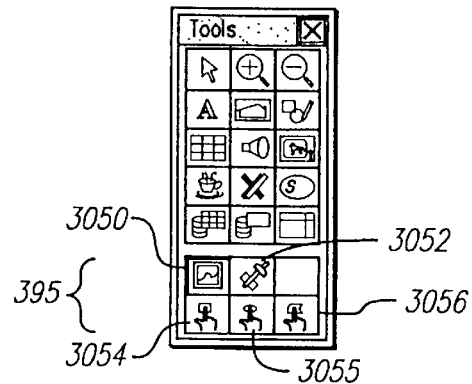
FIG. 9(b) shows a portion of the tool window displayed in connection with an Image tool.
Figure 9C:
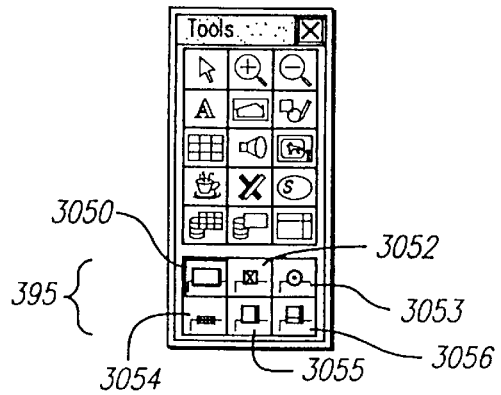
FIG. 9(c) shows a portion of the tool window displayed in connection with a Forms tool.
Figure 9D:
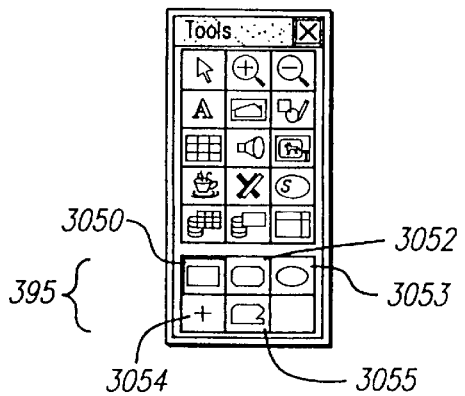
FIG. 9(d) shows a portion of the tool window displayed in connection with a Draw tool.

When the user clicks on Image tool 384, page draw editor 120 displays a Draw tab (not shown) in properties window 350 in addition to the tabs shown in FIG. 3 and alters the Tool Window 324 as shown in FIG. 9(b). This Properties window allows the user to enter a name of an existing image and various properties of the image, such as whether the image is transparent, whether a fill background should be added to the image, and whether the image contains a link (e.g., a URL).The image tool has five secondary tools, shown in FIG. 9(b). Tool 3050 allows the user to draw a boundary in which to place the image file. Tool 3052 allows the user to click on a color of the image that he wants to be transparent. When the image is displayed, pixels of that color in the image will be suppressed so that the background will show through. (This means that a new image with a transparent color must be generated when the HTML is generated). A flag in the Image draw object is set to indicate transparency.

Tools 3054–3056 allow the user to specify a "hotspot" on the image having different shapes. The user can create a rectangular, circular, or polygon hotspot. The user draws and sizes the hotspot on the display using the cursor and identifies the link/URL for the hotspot using a pop-up window (not shown). Once the hotspot is created, it is represented in the display by slightly distorting the image in the hotspot area. The hotspot is added to a list of hotspot locations stored in memory and values are stored in the object to indicate that the image contains a hot spot and its URL. Once the user has specified the image, the image is displayed (e.g., image 502 of FIG. 5) and an image draw object is added to the list of draw objects.

5. The Draw Tool

When the user clicks on Draw tool 385, page draw editor 120 allows the user to enter a Draw display element. The Draw tool has five secondary tools 395, shown in FIG. 9(d): rectangle 1950, round rectangle 1952, ellipse 1953, line 1954, and polygon 1955. When the user clicks on Draw tool 385, the page draw editor displays the secondary draw tools 395 of FIG. 9(d). The user can then choose a secondary draw tool. If, for example, the user selects rectangle 1950, a rectangle Draw tab (see FIG. 10(c)) appears in Properties window 350 in addition to the tabs shown in FIG. 3. Similar tabs appear when the other secondary draw tools are selected. The Polygon tool allows the user to draw a polygon using the cursor, as is known.

In the example, Properties window 350 allows the user to enter properties of the rectangle, such as the color of the rectangle, the border color and size of the rectangle, any text inside the rectangle (and its properties), whether a fill background should be added to the image, and whether the image contains a link (e.g., a URL). Once the user has specified the shape, the shape is displayed on the screen and an image draw object is added to the list of draw objects. In the described embodiment, each type of draw element has a different type of draw object.

6. The Table Tool

When the user clicks on Table tool 386, the page editor 120 allows the user to enter a table in the display. The Table tool causes a table window to be opened (see FIG. 10(*h*)). When the user clicks on Table tool 386, the page draw editor displays a "table" tab in Properties window 350 of FIG. 10(*h*). The user can then specify the dimensions of the table. For example, the user can specify the number of columns, the number of rows, and the type of object that goes in each cell of the table. Once the user has specified the table, the table is displayed on the screen and a table draw object is added to the list of draw objects. A table layout element cause a table to be generated inside a table when HTML is generated for the page.

7. The Sound Tool

When the user clicks on Sound tool 387, page draw editor 120 allows the user to draw a boundary in which to place an icon as a visual placeholder for an audio file. The audio file is specified through a Properties tab (not shown). In the final published Web page, users can click the icon to hear the audio. Once the user has specified the audio icon and an associated sound file, the audio icon is displayed on the screen and a sound draw object is added to the list of draw objects.

8. The Video Tool

When the user clicks on Video tool 388, page draw editor 120 allows the user to draw a boundary in which to place an icon as a visual placeholder for a video file. The video file is specified through a Properties tab (not shown). In the final published Web page, users can click the icon to see the video. Once the user has specified the video icon and an associated video file, the video icon is displayed on the screen and a sound draw object is added to the list of draw objects.

9. The Java Tool

When the user clicks on Java tool 389, page draw editor 120 allows the user to specify a Java applet and an address for the applet. The Java tool, the ActiveX tool, and the Shockwave tool all specify display elements that are exemplary of a type of display element called a "plug-in." Java applets are small programs that can be downloaded over the web and run on most computer platforms. The described embodiment allows the user to specify an icon for a Java applet and the location of the Java applet similarly to how the user specifies a sound or video icon and file. When page is displayed by a browser and the user clicks on the Java applet icon, the Java applet will be downloaded and executed.

The user specifies a Java applet and icon through use of a Java tab in Properties window 350 (see FIG. 10(*f*). This Properties window allows the user to specify a class of applet, to browse through a plurality of predefined applet names, to review parameter information for the selected applet name, to specify an alternate tag for the Java icon, and to specify a script. Once the user has specified the Java icon and an associated address, the Java icon is displayed on the screen and a Java draw object is added to the list of draw objects.

10. The ActiveX Tool

When the user clicks on ActiveX tool 390, page draw editor 120 allows the user to specify an ActiveX file and an address for the file. ActiveX files are small programs that can be downloaded over the web and run on most computer platforms. The described embodiment allows the user to specify an icon for an ActiveX file and the location of the ActiveX file similarly to how the user specifies a sound or video icon and file. When page is displayed by a browser and the user clicks on the ActiveX file icon, the ActiveX file will be downloaded and executed.

The user specifies an ActiveX applet. The user has specified the ActiveX icon and an associated address, the ActiveX icon is displayed on the screen and an ActiveX draw object is added to the list of draw objects.

11. The Shockwave Tool

The user specifies a Shockwave video file through use of a Shockwave tab in Properties window 350 (see FIG. 10(*g*)). This Properties window allows the user to browse a plurality of file names, to specify an alternate tag. Once the user has specified the Shockwave file, a predetermined Shockwave icon is displayed on the screen and a Shockwave draw object is added to the list of draw objects.

12. The Forms Tool

When the user clicks on Forms tool 392, page draw editor 120 allows the user to specify elements of an HTML form. As is known, forms are an interactive Web component. They allow a user to send data to a server, either as request for more data or as a submission of information to the server. As is known, forms are controlled by CGI scripts.

The Forms tool has six secondary tools 395, shown in FIG. 9(*c*): button 1950, checkbox 1952, radio button 1953, single line text 1954, multi-line text 1955, and list box 1956 (also called a "pull-down menu"). When the user clicks on Forms tool 392, the page draw editor displays the secondary draw tools 395 of FIG. 9(*c*). The user can then choose a secondary draw tool. If, for example, the user selects button 1950 and clicks in the display window for the page, a button display element is added to the page. In addition, a button tab (not shown) appears in Properties window 350 in addition to the tabs shown in FIG. 3. Similar tabs appear when the other secondary draw tools are selected.

Using the example of a forms button, Properties window 350 allows the user to enter properties of the button, such as the color, any text inside the button (and its properties), and whether a fill background should be added to the button. In addition, the user decided whether the button is Submit button or a reset button. During display, a submit button sends the contents of all the form objects to a server. A reset button allows the user to clear the form and start over.

The following paragraph describes, without limitation, other examples of the various forms elements that can be specified by the user. Each of the forms elements described below is an element of a type that is currently included in conventional hand-coded HTML forms. Other embodiments may include still other form elements not described herein. A check box is used to let users select one or more items from a group. (Editor 120 allows the user to specify what these elements are.) A radio button behaves just like a check box, except that only one radio button in a group an be checked at once. A single-line text provides an area where the user can enter a single line of text. A multi-line text provides an area where the user can enter a more than one line of text. A list box takes the form of a pop-up menu or a box with a scroll bar. Editor 120 allows the user to specify the form of a list box. Once the user has specified a form element, the video icon is displayed on the screen and a form element draw object is added to the list of draw objects. In the described embodiment, each type of form element has a different type of draw object. The described embodiment allows one form in the header, one form in the body, and one form in the footer. This is because the form layout elements do not contain an identifier as to which form they belong to. Other implementations may contain such an identifier and may allow multiple forms in the header, body, or footer.

13. Managing Assets (Files, Links, and Data Objects)

Figure 31:
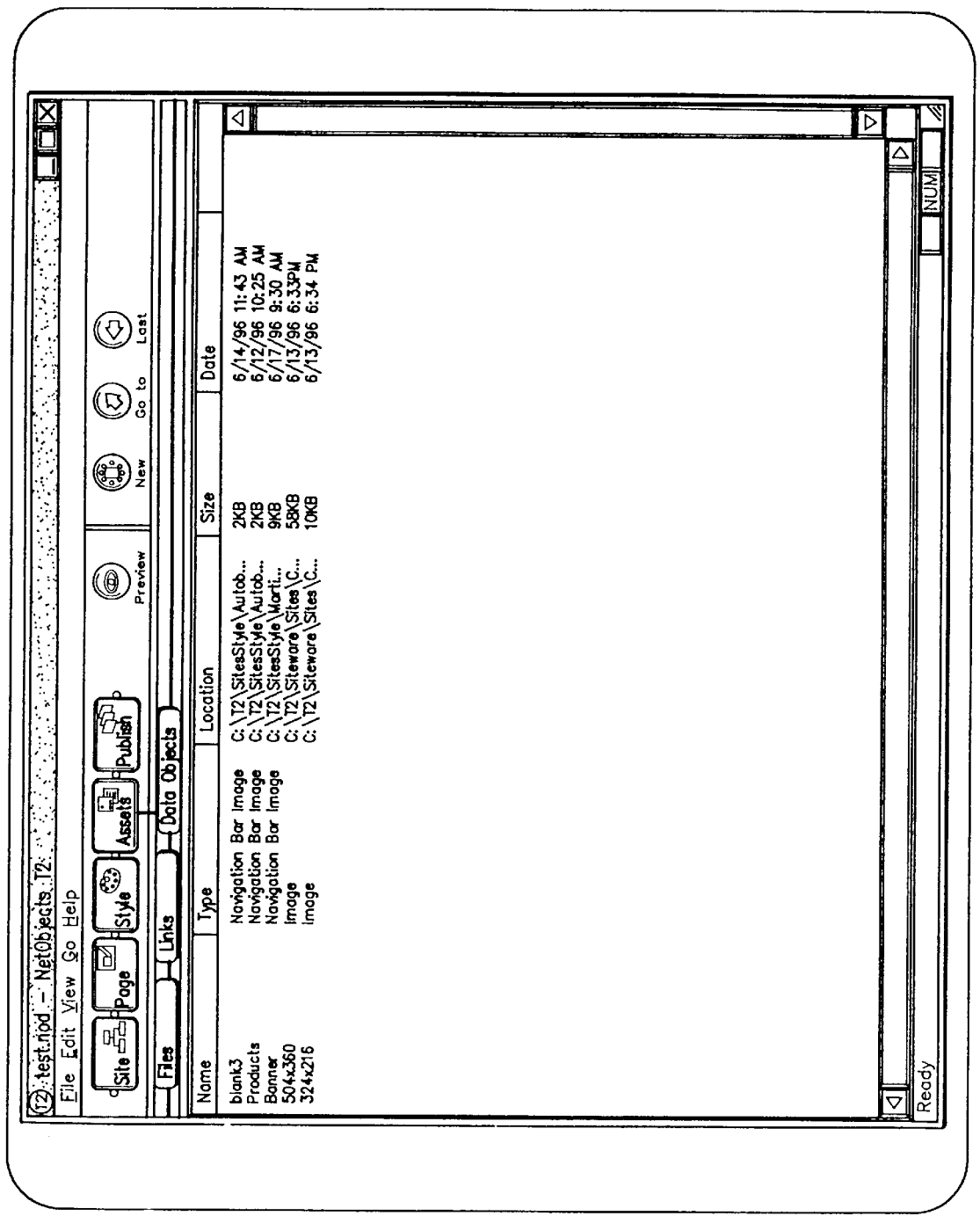
FIG. 31 shows an example of an Assets Display.

FIG. 31 shows an example of an Assets display 3100 that displays all current files, links, and data objects for a data processing system. The display 3100 is generated when the user clicks on Assets button 308 of FIG. 3. (Note that a dotted line extends from the Assets button to the Secondary navigator bar 365.) The Assets view shows all files, hyperlinks, or data objects associated with the current system, depending on whether the user clicks secondary button 3102, 3104, or 3106. FIG. 31 shows an example of all data objects for the page of FIG. 5. It will be understood that the Assets view reflects files, links, and data objects stored in memory 104. Newly created files, links, and data objects are stored in memory 104 as well.

The File view shows information about all files in the site, such as: whether the file has a type of navigation bar images, pictures, sound, video, Java applets and other plug-ins. The user can change, e.g., the name and location of files and can add and delete files through user of a dialog box (not shown).

The Links view shows information about all links in the site, such as: whether a link is internal, external, or structural. A structural link reflects a hierarchical link shown in the site view. In a preferred embodiment changing a structural link in the Assets view changes the link in the site view and between page objects in the memory. The user can change links and can add and delete links through use of a dialog box (not shown).

The Data Objects shows information about all DataObjects in the system. Data objects can be internal data objects or can be ODBC (Object Data Binding Convention) objects implementing Microsoft's standard for web page/database binding. Before creating a stacked page, as discussed below, the user should first create an internal object or ODBC object for the data that is to be included in the stacked page.

Figure 34:
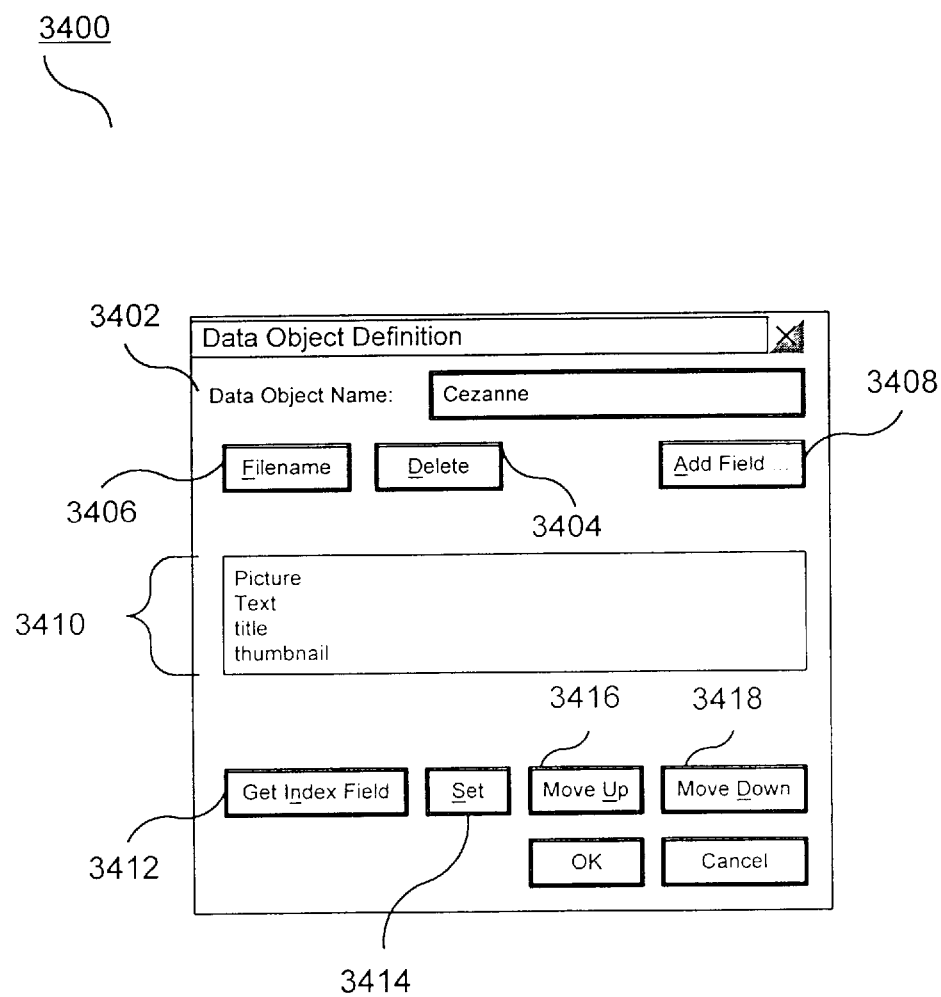
FIG. 34 shows an example of a dialog box used to create a data object.

FIG. 34 shows an example of a dialog box 3400 used to create a data object. Dialog box 3400 is displayed when the user clicks on a "new object" button (not shown) or clicks on a "new object" pull-down menu (not shown). Box 3400 includes a data object name area 3402, a data object delete button 3404, an add field button 3408, an area 3410 listing the current fields of the data object, a "get index field" button 3412, a set button 3414, and move up/down buttons 3416, 3418. To create a data object in memory 104, the user enters information in dialog box 3400.

14. Creation of Stacked Pages

The described embodiment allows the user to create a special type of page called a "stacked page," which is made up of "data pages." A stacked page causes the described embodiment to generate a plurality of HTML pages displaying a series of information, such as a the values in a series of records from a database. FIG. 35 shows a block diagram of an example of a stacked page 3502 and a series of pages 3504 displayed when a browser views the HTML pages created from the stacked page. To create a stacked page, the user first creates a data object, such as a data base object (as described above). The user then creates a DataList draw object and a DataField draw object for the stacked page.

To create a DataList draw object, the user clicks on DataList tool 393 of FIG. 3. Page draw editor 120 allows the user to specify a list of fields to be displayed on a stacked page. When the user clicks on DataField tool 394, page draw editor 120 allows the user to specify the layout of the fields in the data list. Once the user has specified a DataList and a DataField, an appropriate display element is displayed on the screen and a DataList draw object or a DataField draw object, respectively, is added to the list of draw objects for the page.

Figure 36:
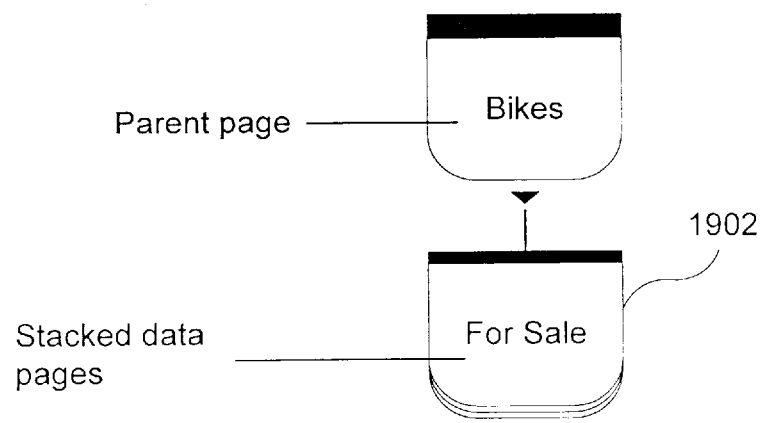
FIG. 36 shows an example of an icon for a stacked page.

The following paragraphs describe an example of creation of a stacked page. FIG. 36 shows an example of an icon for a stacked page that is displayed by the site level editor described in the co-pending application of Arora et al. Once a page includes a DataList and a DataField object, it is classified as a stacked page. When a page is a stacked page, it is displayed at the site level as overlapping pages icon 3602. Stacked pages are moved at the site level in substantially the same manner as normal pages. However, multiple HTML pages are generated for each stacked page.

FIG. 37 shows an example in which a user has opened Tool window 324 and selected DataList tool 393. The user has then specified a rectangle 3704.

Figure 38:
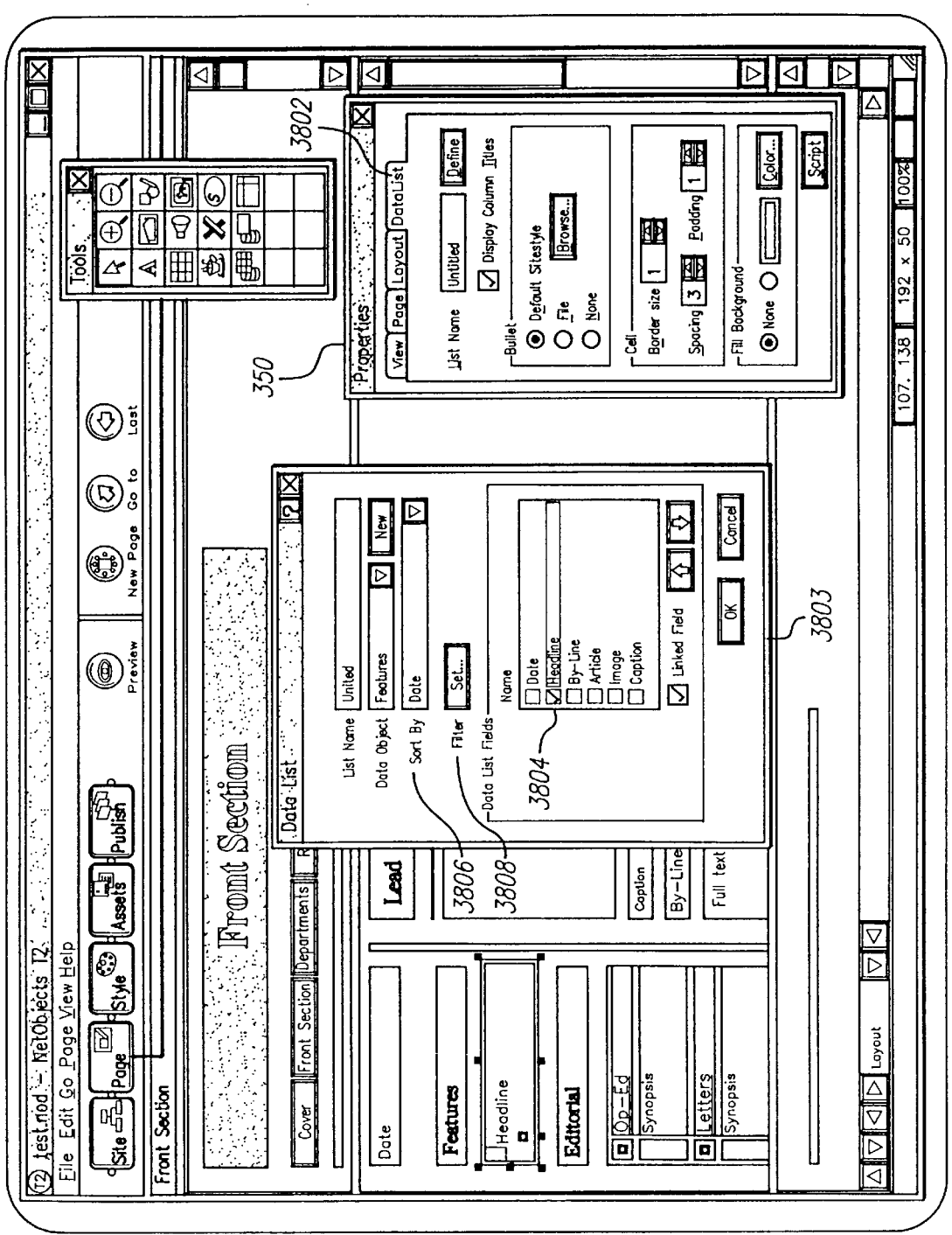
FIG. 38 shows a Properties window with a DataList tab opened for the DataList tool and the DataList window.
Figure 39:
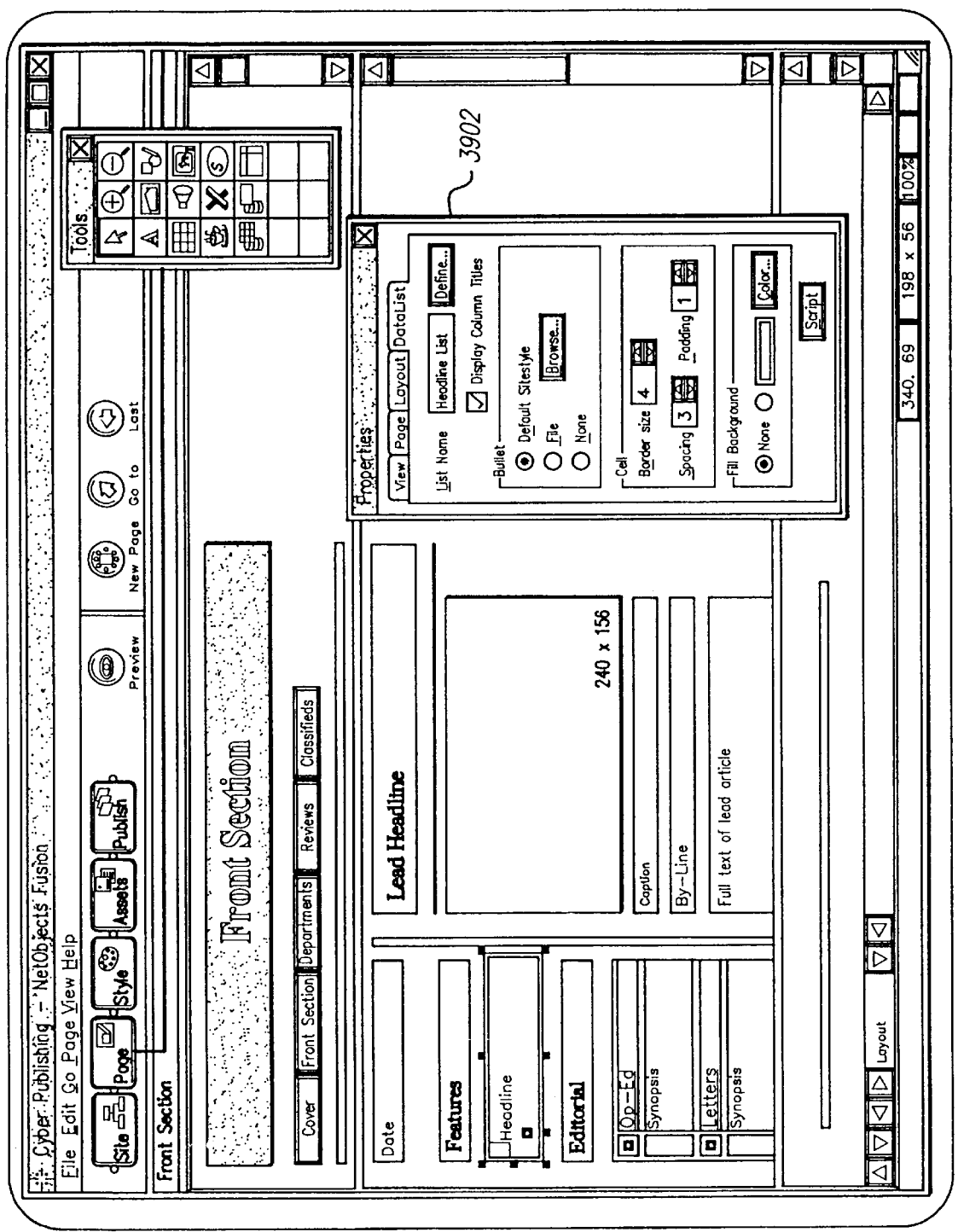
FIG. 39 shows a further example of a Properties window with a DataList tab.

FIG. 38 shows a Properties window 350 with a DataList tab 3802 opened for DataList tool 393. FIG. 38 also shows a DataList window 3802. The user specifies, in the DataList window 3803, fields of the list that can be displayed on the stacked page (for example, "Headline List"). The user then clicks on the listed DataList fields to select which fields of the data object will be included in the stacked page. The properties of the DataList are displayed in Properties window 350.

Figure 40:
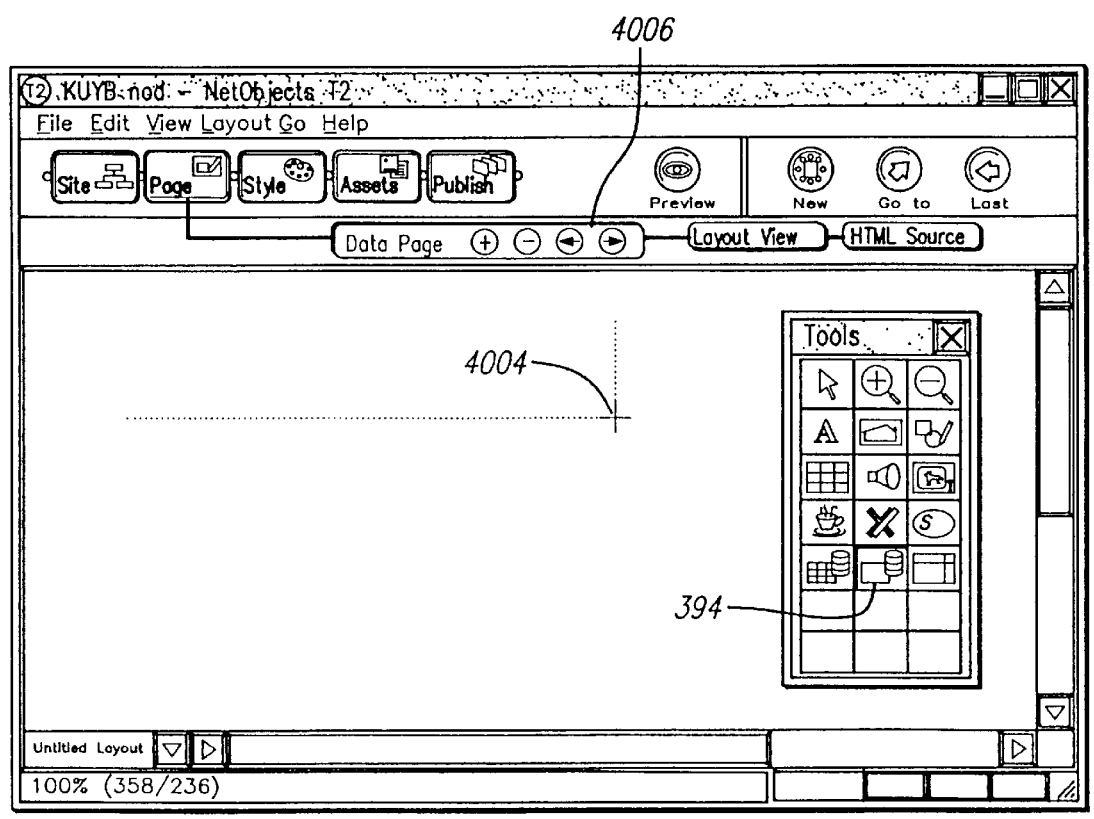
FIG. 40 shows an example in which a user has opened the Tool window and selected the DataField tool.
Figure 41:
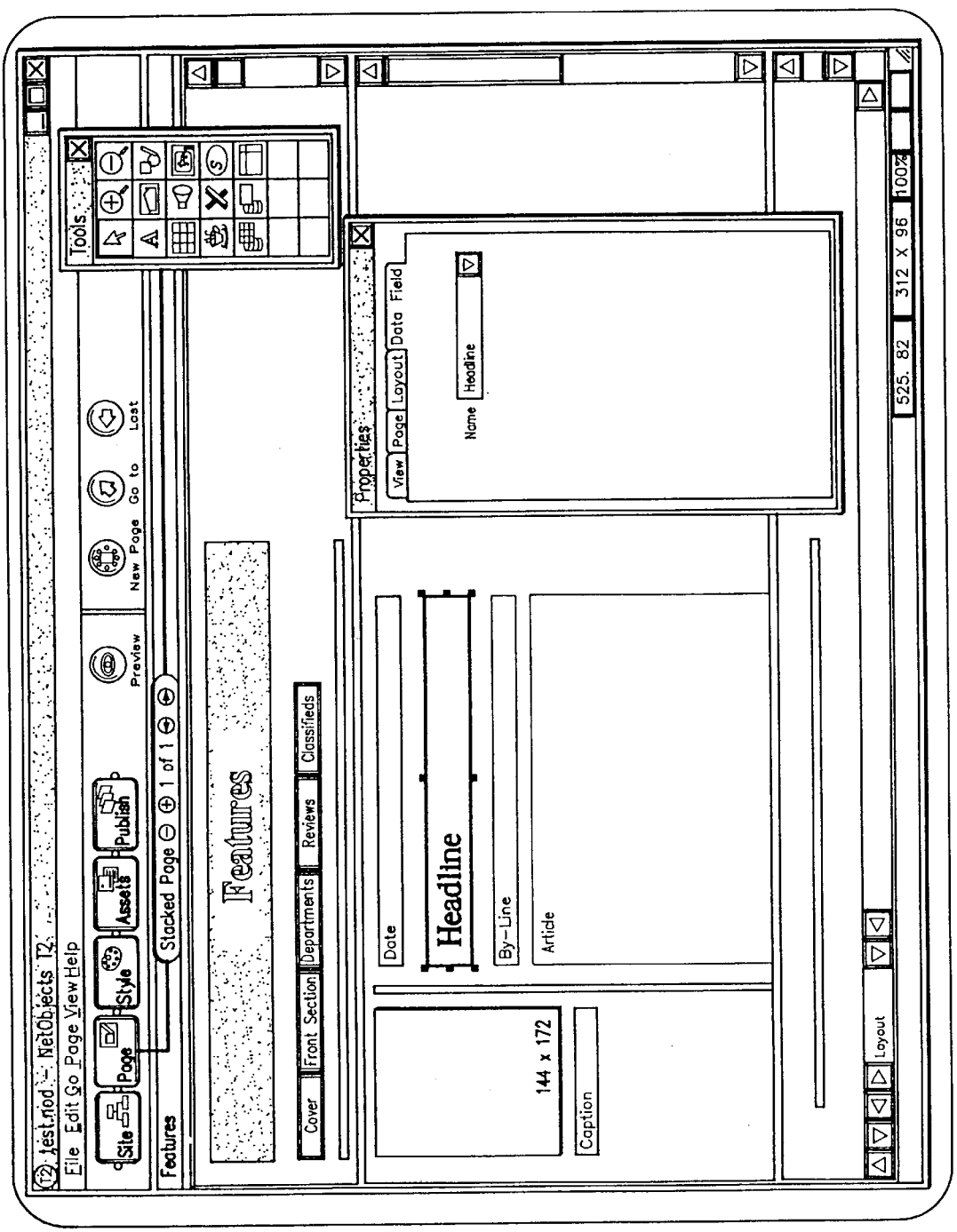
FIG. 41 shows a Properties window with a DataField tab opened for the DataList tool.

In DataList window 3803, the user optionally specifies a sort field 3806 in the data object, and optionally sets a filter 3808 (e.g., product="xxx," not shown). Only values in the specified fields having the filtered value will be part of the stacked page. The user may also specify whether any of the fields will be linked to other pages. FIG. 40 shows "Data List Tab" in Properties window 350.

FIG. 40 shows an example in which a user has opened Tool window 324 and selected DataField tool 394. The user has then specified a rectangle 4004. The user names the data list ("Headline List") and defines an appearance of the fields selected in FIG. 38. An area for each field can be sized and dragged to define the layout of each data page in the stacked page.

Secondary navigator bar 365 includes a button bar 4006 that has four buttons for managing data pages within a stacked page. These four buttons include: a "+" button, which creates a new data page, a "−" button, which deletes the current data page, a "back" button which displays the contents of a previous data page, and a "forward" button, which displays the contents of a next data page. In, for example, a data base, the user can create as many data pages as there are records in the data base. Each data page will automatically contain display elements to a first, next, and previous data page. Thus, a stacked page has a list of draw elements. An example of such as draw element may have a structural link to the "next" or "previous" data page. If the page is a stacked page, a flag in memory is set to indicate this fact, since multiple HTML pages can be generated for a single stacked page (i.e., one HTML page for each data page).

B. Creation of Draw Objects for the Display Elements

Figure 12:
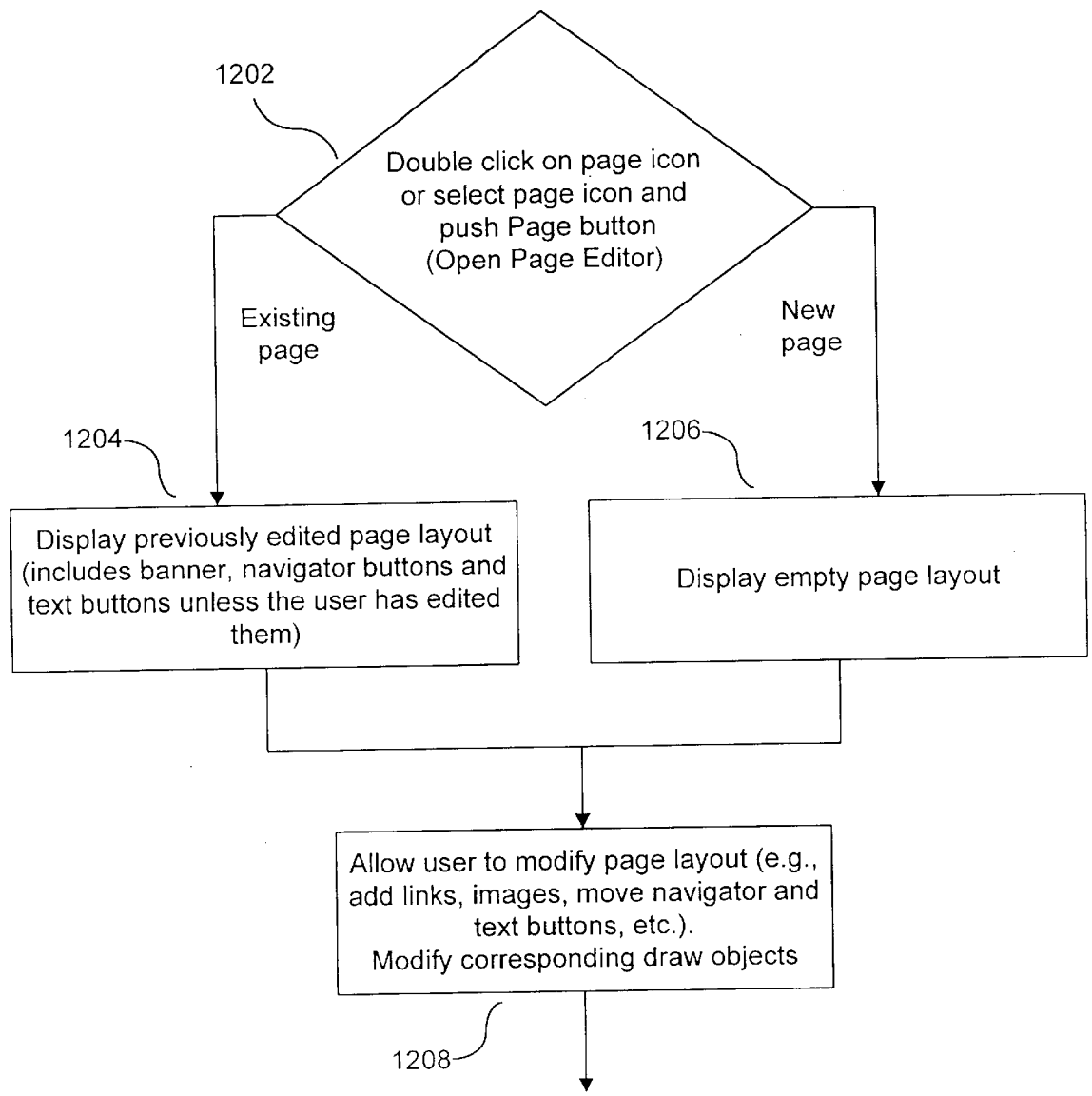
FIG. 12 is a flow chart showing steps performed by the page draw editor software to define a page layout.

FIG. 12 is a flow chart showing steps performed by page draw editor software 120 to edit a page layout during execution of the page draw editor. In step 1202, the page draw editor determines whether the page is a new page. If it is an existing page, in step 1204, the current page layout for the page is displayed in accordance with the already existing draw objects for the page. The page layout will include the automatically generated banner, navigator buttons, and text buttons, unless the user has previously deleted them.

If the page is a new page, in step 1206, the editor displays the default page layout in accordance with the draw objects for the page. The user exits the page draw editor by, e.g., clicking on Site button 302, Style button 306, Assets button 308, or Publish button 310 (or by selecting "exit" from a pull-down menu). After the user has edited a page, he can still move the page around in the site hierarchy by using the structure/site editor, as described in the co-pending application of Arora et al.

Figure 13:
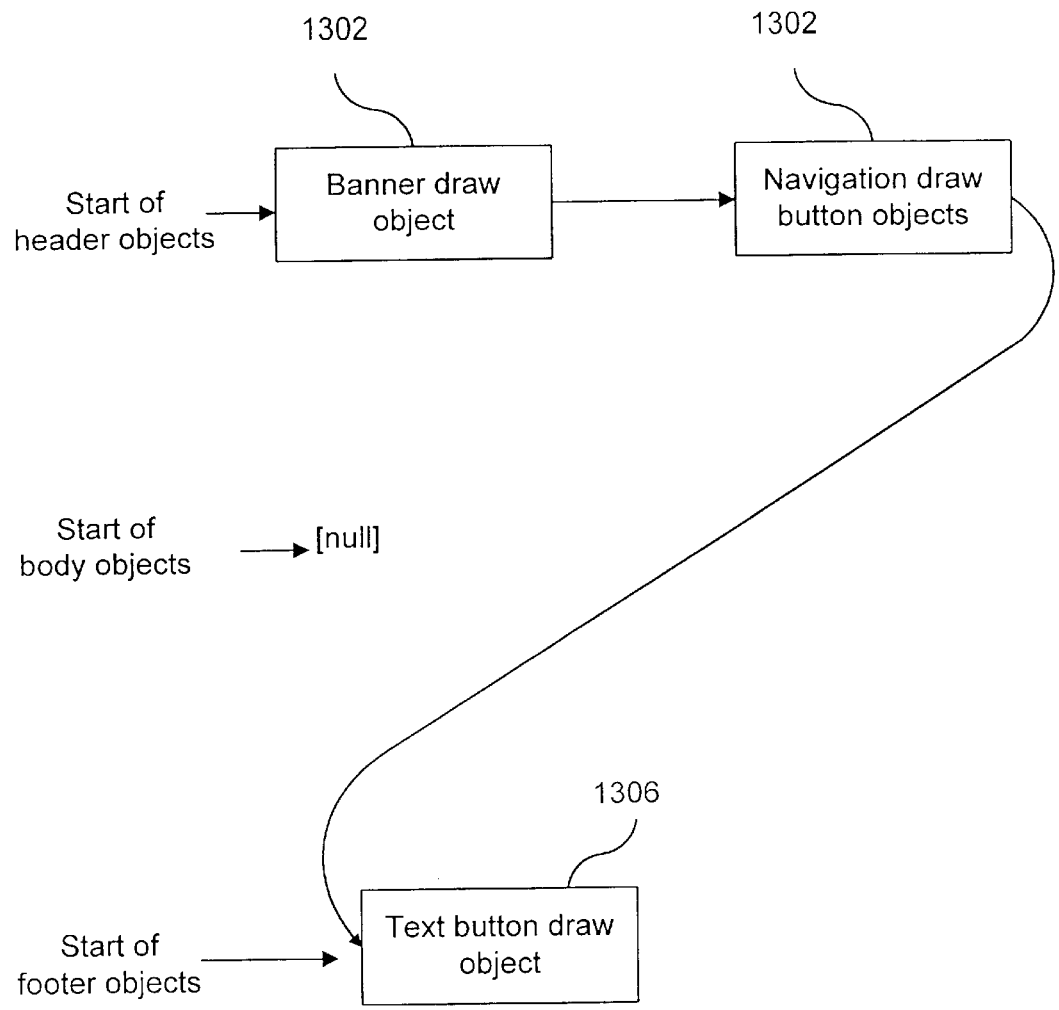
FIG. 13 is an example showing an initial internal representation stored in a memory of objects automatically generated on the page by the page draw editor software for the layout of FIG. 4.

FIG. 13 is an example showing an internal memory representation of draw objects automatically generated by page draw editor software 120. The draw objects are generated when a page is created and are modified when the page is modified. The internal representation includes a list of draw objects, representing each display element of the page of FIG. 4. Thus, the list of draw objects includes a banner draw object 1302 (corresponding to banner 410), a navigator buttons draw object 1304 (corresponding to navigator buttons 412), and a text buttons draw object 1306 (corresponding to text buttons 428). In the described embodiment, all draw objects of the header 402 are stored together and a pointer points to the beginning of this list. Similarly, all objects of the footer 406 are stored together and a pointer points to the beginning of this list. In the described embodiment, the user has not entered any elements into the body 404 and a pointer to body elements points to a null list. There are other elements in the layout elements list (such as border elements) that are not shown for the sake of ease of explanation.

Figure 14:
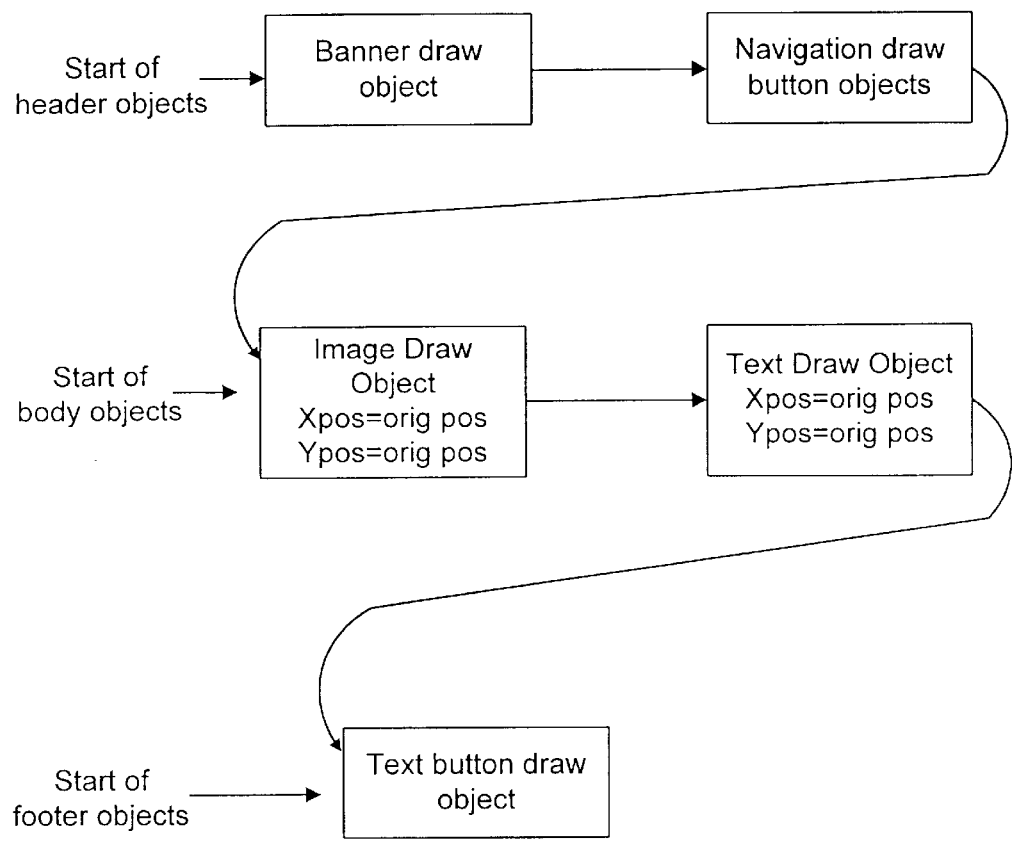
FIG. 14 is an example showing the internal representation after some display element have been added by the user.

FIG. 14 is an example showing the internal representation of FIG. 13 after some display elements have been added by the user. The list now contains an image draw object for image 502 and a text draw object for text 504 (see FIG. 5). Each draw object contains data specifying its location on the page as shown in FIG. 5. If the image or text is also a hotspot, information identifying the URL of the link is also contained in the object.

Figure 15:
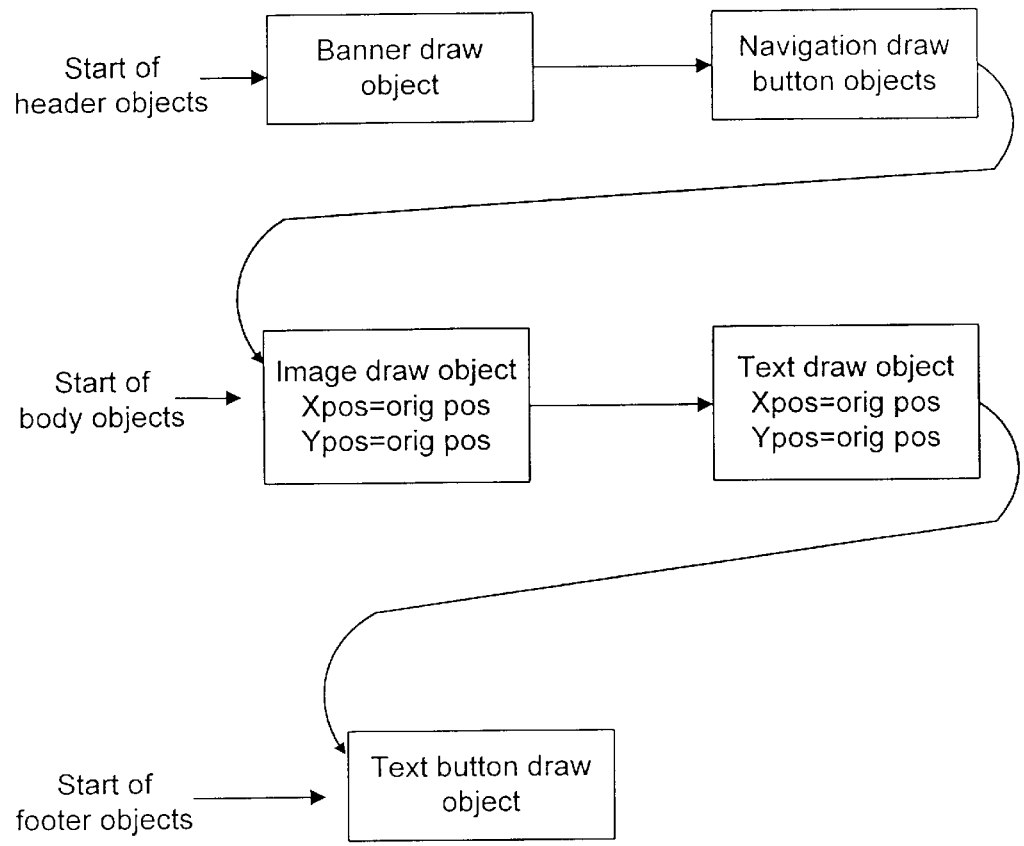
FIG. 15 is an example showing the internal representation after a display element has been moved by the user.

FIG. 15 is an example showing the internal representation after text display element 504 has been moved by the user. Note that the position of the text draw object does not change in the list of draw objects. However, the position data in the text object does change to reflect the object's new position in the page layout. Similar changes are made to other page objects whenever the user alters the position, appearance, or function of the corresponding display element with the page editor 120.

It will be understood that all draw objects discussed in the following paragraphs include a screen position field (indicating the X and Y coordinates of the objects' current position on the screen), the height and width of each draw object on the screen, and various flags associated with display of the object. Flags include whether the object has a frame drawn around it, whether the object may be resized to zero width or height, whether the object itself handles mouse commands internally, whether the object is currently selected, the color of the object, whether the object is transparent, whether the object contains text, etc. It will be understood that the specific flags stored in an object may vary from implementation to implementation. The position, height, width and flag values are not shown for the sake of clarity. It will also be understood that each type of draw object contains the data required to describe the appearance and function of the corresponding display element.

Draw objects can be of a variety of types or classes. It will be understood that the present invention does not necessarily include any specific types of draw objects and may include more or fewer types of draw objects than are discussed herein. The draw objects in a preferred embodiment include, without limitation:

rectangle,
round rectangle,
line,
ellipse,
text,
picture/image,
polygon,
OLEobject,
JavaScript,
database list,
database field,
form button,
form radio button,
form checkbox,
form edit,
form combobox,
form clear button,
zoomin,
zoomout,
grid,
graphic,
hotspot rectangle,
hotspot polygon,
hotspot ellipse,
background picker,
Shockwave object,
Sound,
Video,
ActiveX,
Form Multi edit, and
MAX SHAPE In the described embodiment, each type of draw object has associated information that, in general, allows the draw object to be displayed on display device 150 in accordance with user draw commands. This information is also used to generate HTML for the object (including links and anchors). The following paragraphs describe some examples of draw objects.

Figure 16A:
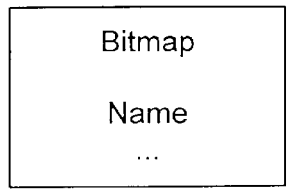
FIG. 16(a) is an example of a draw object for a page banner.
Figure 16B:
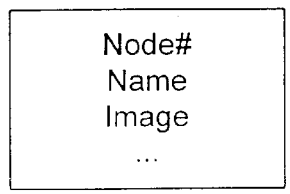
FIG. 16(b) is an example of a first draw object for a navigator button.
Figure 16C:
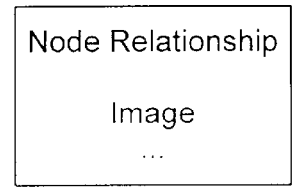
FIG. 16(c) is an example of a first draw object for a navigator button.
Figure 16D:
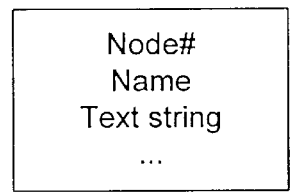
FIG. 16(d) is an example of a draw object for a text button.

FIG. 16(a) is an example of information associated with a draw object for a page banner. It includes a bitmap of the banner and the name of the page (e.g., "Products"). FIG. 16(b) is a first example of information associated with a draw object for a navigator button object. It includes a node number to which it will link when displayed by a browser, a name of the linked to page, and an image of the navigator button (e.g., an image using the GIF, JPEG, BMP, TIFF, EPS, or PCX file formats). FIG. 16(c) is a second example of information associated with a draw object for a navigator button. The link in the second example is a structural link, i.e., it represents a link according to relationships between the pages/nodes. FIG. 16(c) includes a smart link to another node, which is specified by relationship, and an image. The identity of the link is determined (updated) when the page is displayed, previewed, or published. FIG. 16(d) is an example of a draw object for a text object. It includes a node number to which it will link when displayed by a browser, a name of the linked to page, and a string displayed in the text button. In the described embodiment, each draw object contains its type, its X position, Y position, width, and height. Appendix A shows an example of a draw object of text and a draw object for an image. It will be understood that each type of display element in a page (e.g., text, image, button, etc.) has a corresponding type of draw object.

In the described embodiment, each draw object contains its type, its X position, Y position, width, and height and display flags. In general, each draw object contains information associated with its corresponding dialog box in which the user views properties of the display element on the page.

III. Publishing a Page

Figure 17:
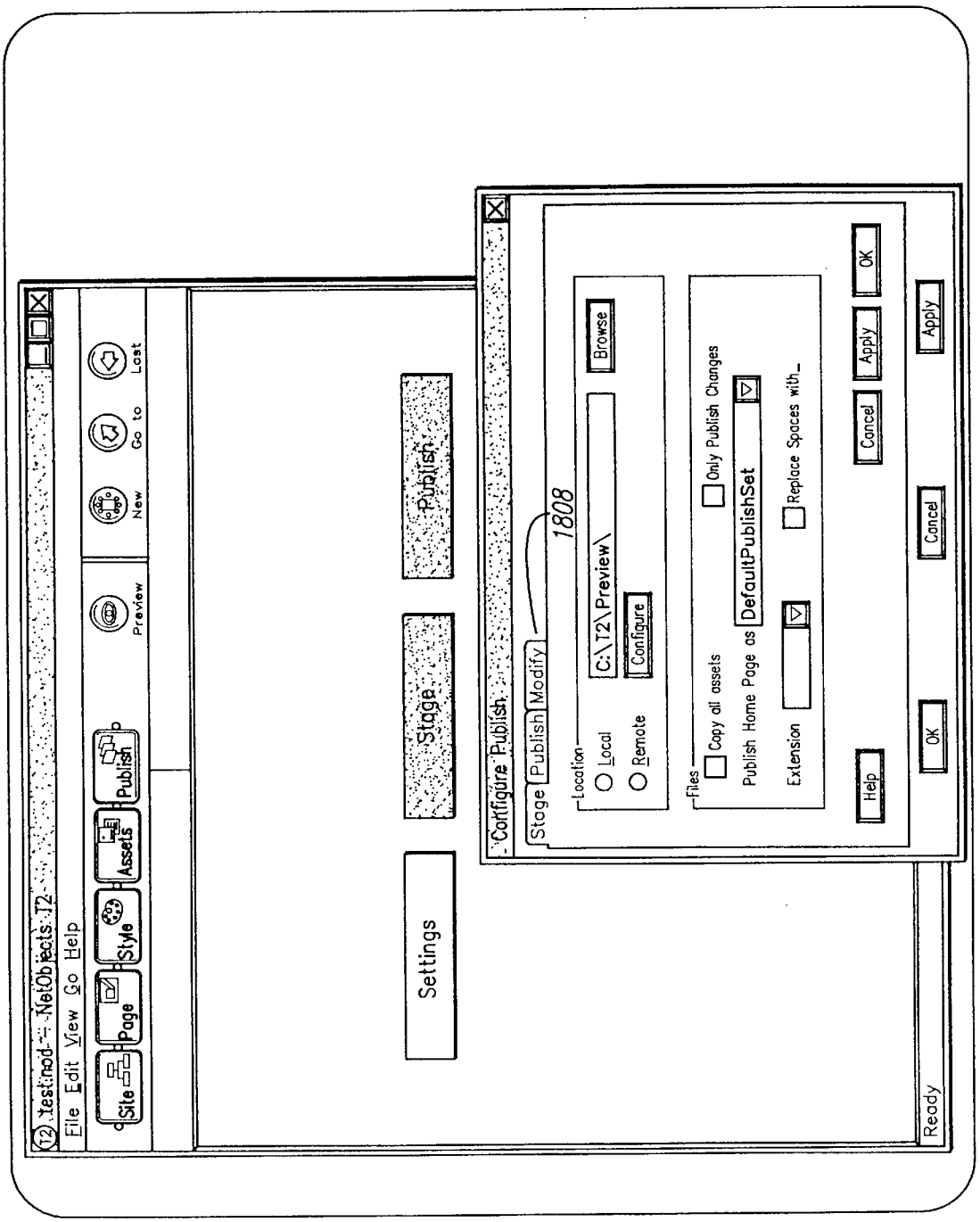
FIG. 17 shows an example of a display used to allow the user to publish the pages of a site.

Once the user has created a layout for a Web page as described above, the user needs to be able to create HTML for the page in accordance with the draw objects of the page. FIG. 17 shows an example of a display used to allow the user to publish one or more pages. In the described embodiment, this display actually allows the user to publish all pages in a Web site, as described in the co-pending U.S. application Ser. No. 08/687,971 of Samir Arora et al., filed concurrently herewith, and entitled "Hierarchical Structure Editor for Web Sites.

FIG. 17 shows a screen displayed when the user clicks on "Publish" button 310 of FIG. 3. The screen includes three buttons "Settings" 1702, "Stage" 1704, and "Publish" 1706. Once the display of FIG. 17 is displayed, the user can either "stage" or "publish" his site. Generally, staging is performed first and publishing is performed once the site is debugged. Staging and publishing are substantially the same, differing in when they are performed during the site development process. The user can also set configuration parameters to control the publishing or staging process. Clicking on either "publish" button 2802 or "Stage" button 2804 causes the described embodiment to generate HTML code for each page in the site (or only for pages indicated by the publish flag or by the user). This process is described below.

Figure 18:
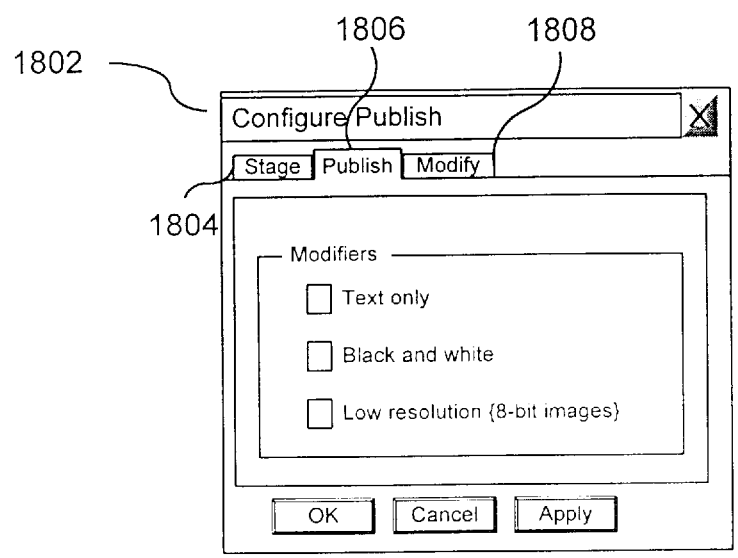
FIG. 18 shows an example of a display used to allow the user to specify details of how to publish a site.

Clicking on "Settings" button 1702 causes a pop-up window 1708 to be displayed. Clicking on "Stage" tab 1710 or "Publish" tab 1712 will display a window, which allows the user to specify a storage location for the staged or published site. Clicking on a "Modify" tab 1808 causes the pop-up window 1802 of FIG. 18 to be displayed. Window 1802 allows the user to indicate certain attributes of the HTML to be generated for the site (e.g., text only, black and white (grey scale), or low-res).

Figure 19:
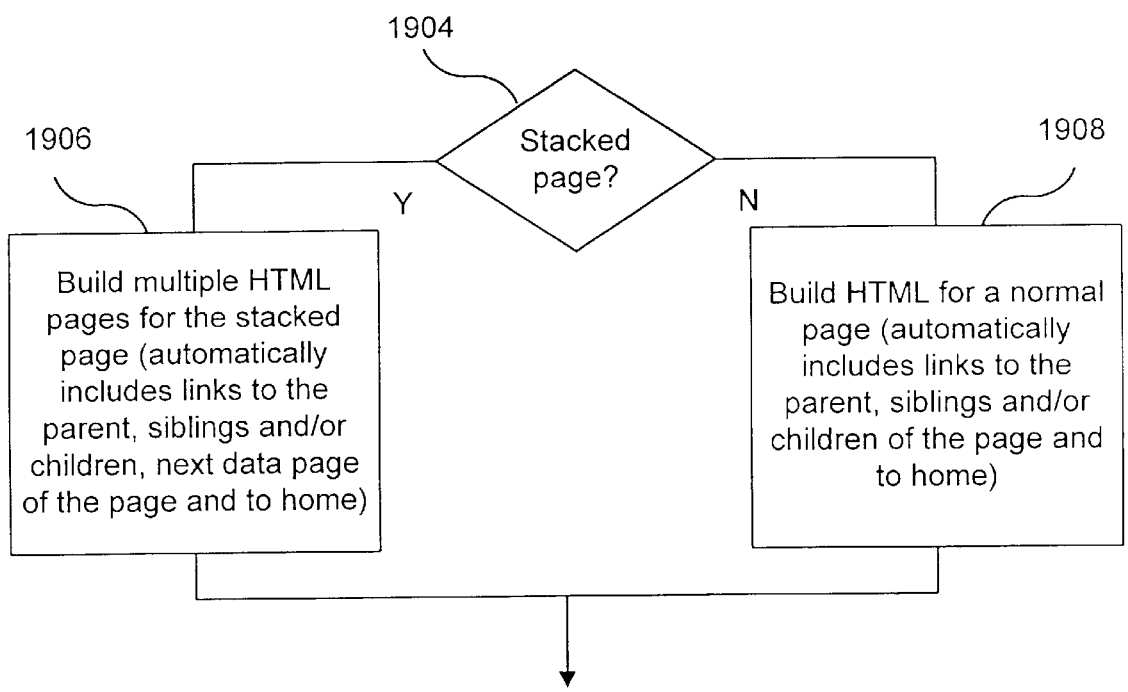
FIG. 19 is a flow chart showing steps performed by the page editor software to publish a page.

FIG. 19 is a flow chart showing steps performed by page draw editor software 120 to publish a page of a site. It will be understood that the steps of FIG. 19 are performed by processor 102 executing instructions in page draw editor software 120. In step 1904, if the stacked flag of the current page object indicates that the current page is a stacked page, then processor 102 creates HTML for a plurality of pages. If the current page is not a stacked page then, in step 1908, processor 102 builds HTML for a "normal" page. In either case, the HTML for the page is then written to a storage medium of the system.

It will be understood that, generally, each page object has a corresponding list of draw objects describing the elements of the page layout, and that processor 102 generates HTML in accordance with the lists of draw objects. As described above, each list of draw objects automatically includes draw objects representing automatically generated banners and links (e.g., to the home, parent, sibling, and/or children pages of that page). These automatic links may be structural links. The draw objects of a page may also represent other, additional links added by the user that are not a part of the site hierarchy. Moreover, the user can use the page draw editor to remove some of the automatically generated draw objects links if he so desires. Unless the user explicitly removes them, however, these automatically generated links are present in each page layout. Thus, the generated HTML for each page will contain links to the home, parents, siblings, and/or children pages for each page of the site view.

IV. HTML Generation for a Page

Figure 20:
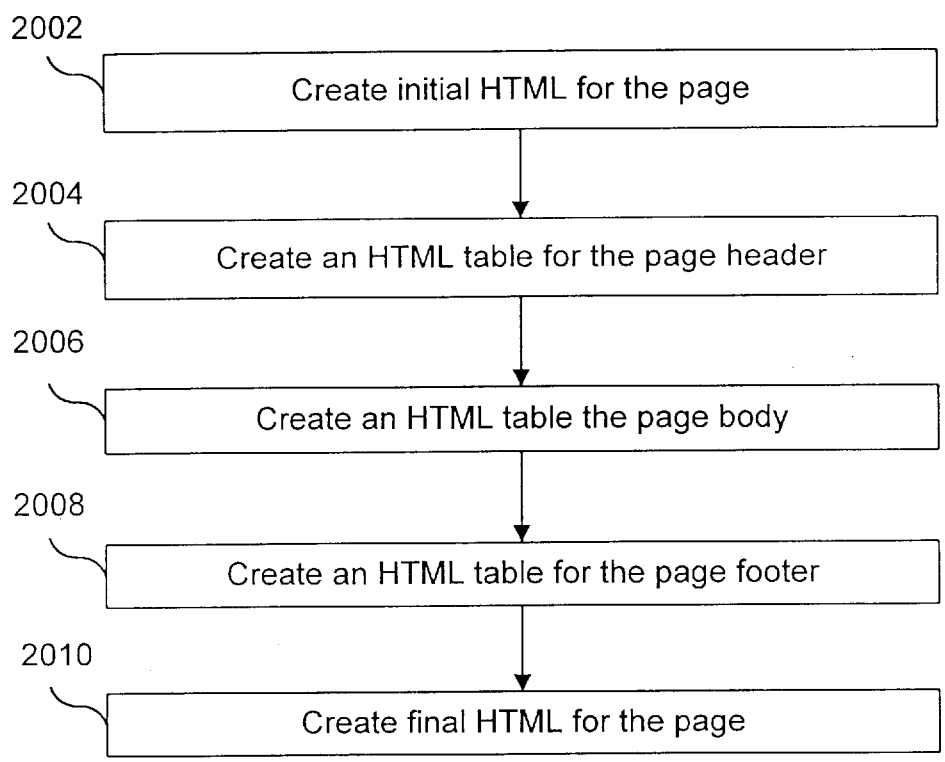
FIG. 20 a flow chart showing steps performed by the page editor software to publish a normal page.
Figure 21:
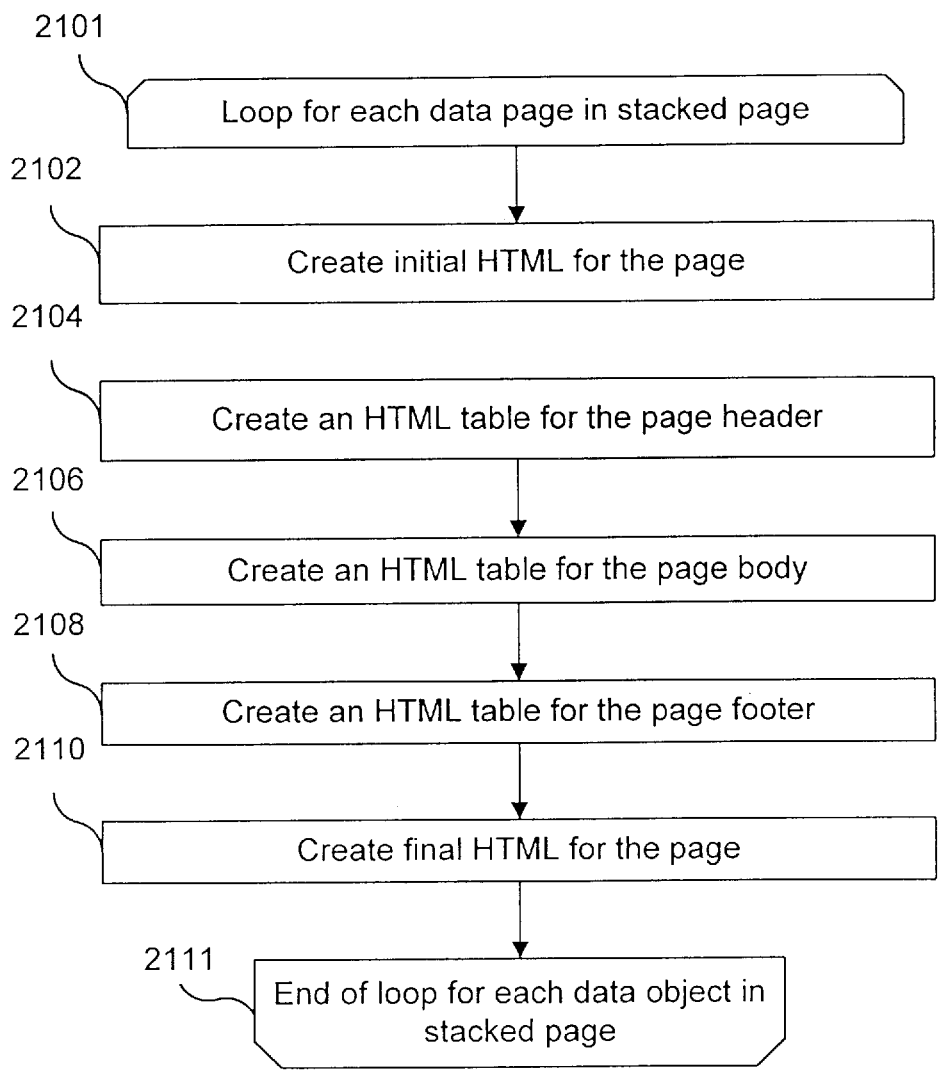
FIG. 21 is a flow chart showing steps performed by the page editor software to publish a stacked page.
Figure 22:
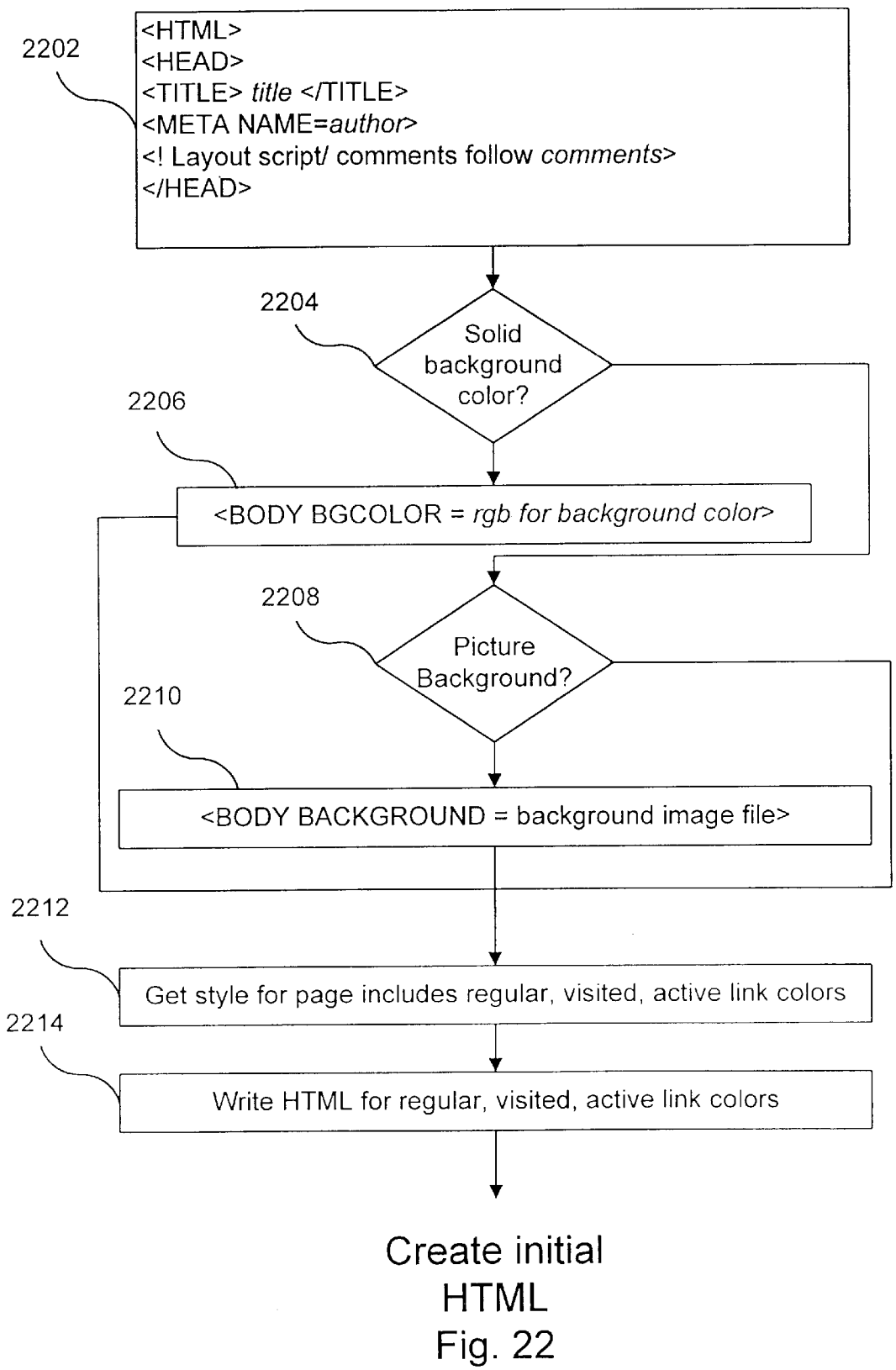
FIG. 22 is a flow chart showing steps performed by the page editor software to generate initial HTML for a page.
Figure 23:
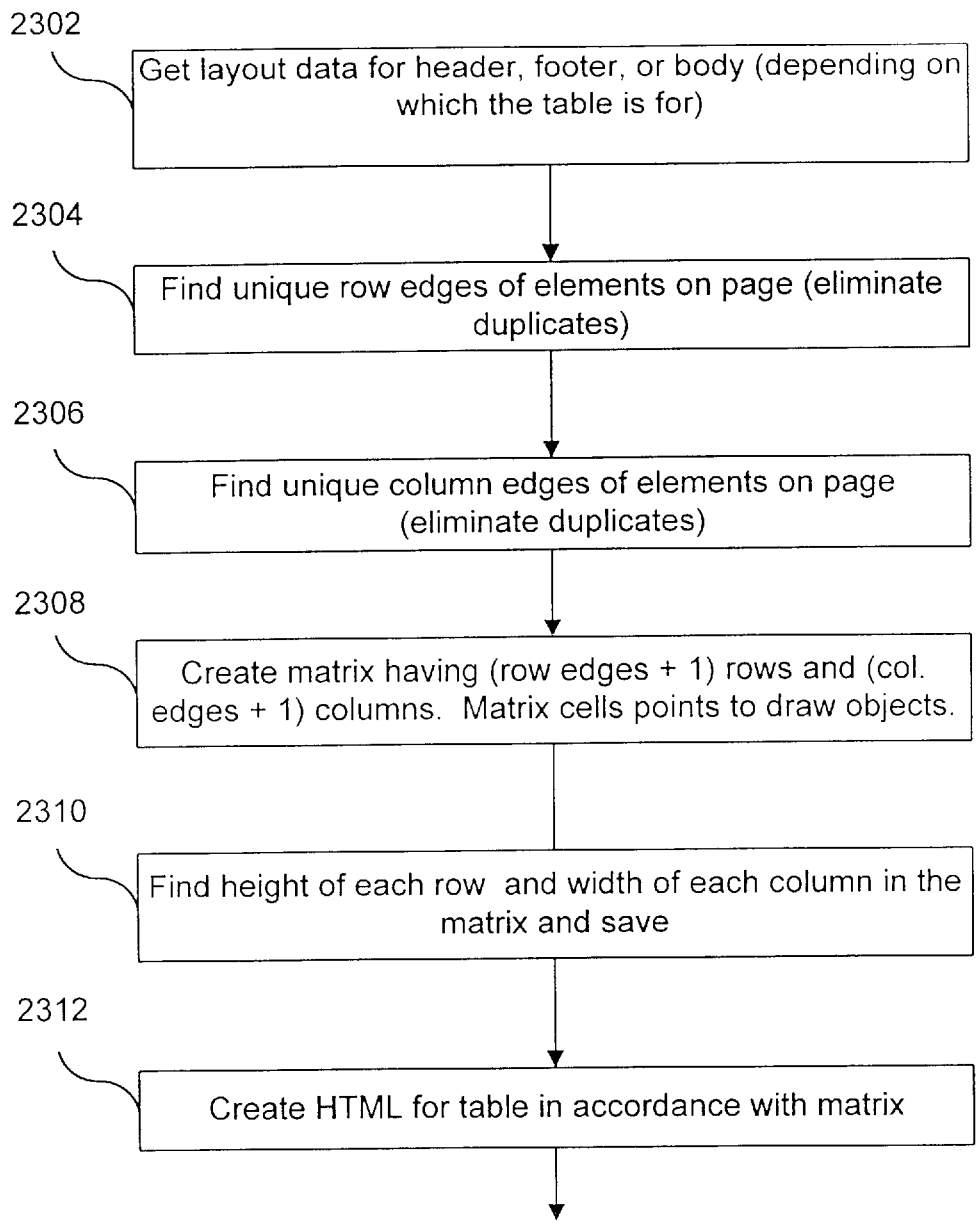
FIG. 23 is a flow chart showing further steps performed by the page editor software to generate an HTML table for layout elements of a page, such as a header, body, and footer.
Figure 24:
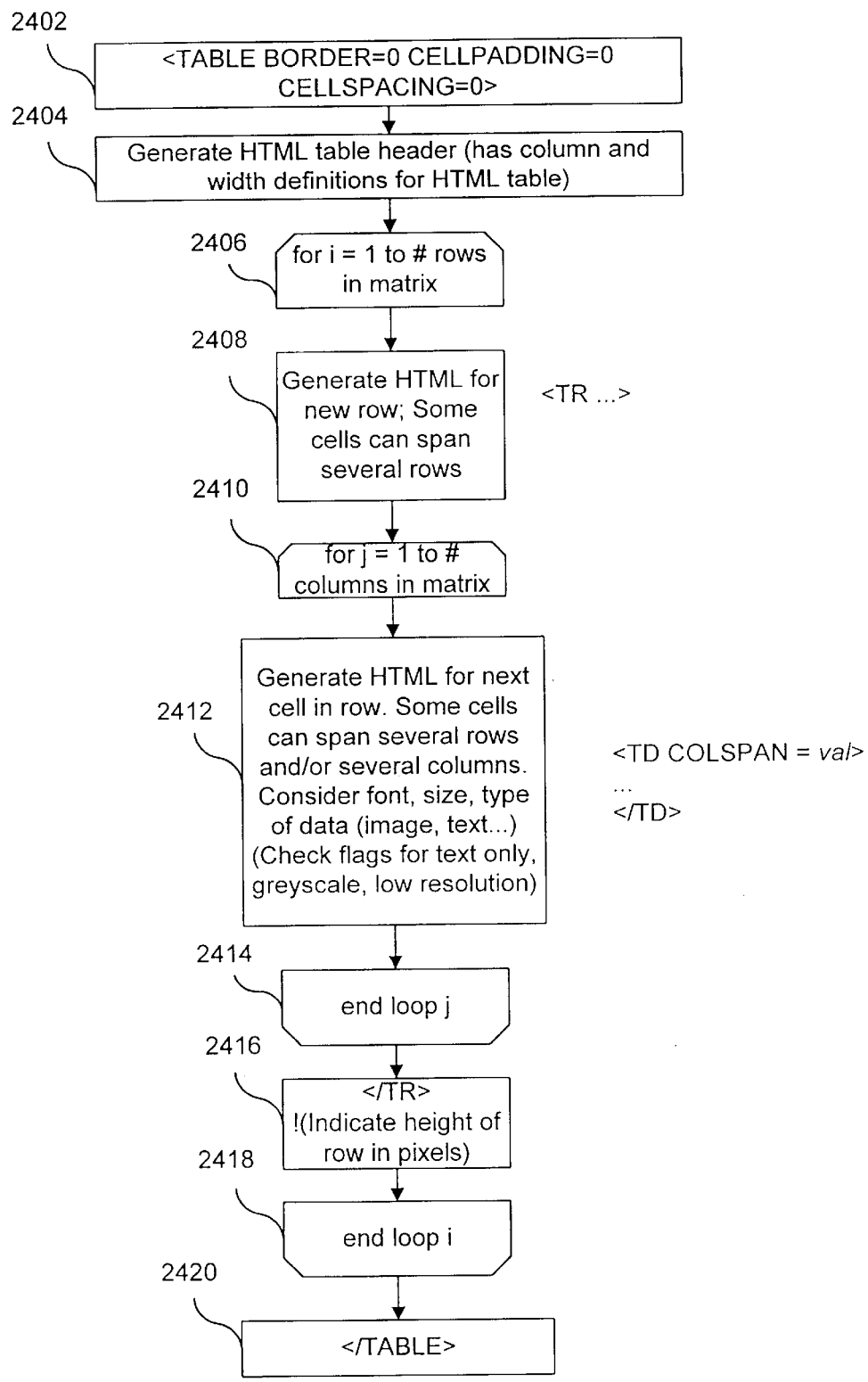
FIG. 24 is a flow chart showing steps performed by the page editor software to generate an HTML table.

FIG. 20 is a flow chart showing steps performed by the structure editor software to publish a normal page. FIG. 21 is a flow chart showing steps performed by the structure editor software to publish a stacked page. The steps of FIGS. 20 and 21 are similar, except that the steps of FIG. 21 generates multiple HTML pages for the stacked page. Step 2002 creates initial HTML for the page as shown in FIG. 22. This step creates the beginning of an HTML page. Steps 2004–2008 create HTML tables for each of the header, body, and footer as shown in FIGS. 23 and 24. Step 2010 creates final HTML for the end of the page as shown in FIG. 25. The preferred embodiment generates Netscape HTML version 3.X.

FIG. 21 shows the creation of a plurality of HTML pages for a stacked page. Each HTML contains, for example, data for one record of a database associated with the stacked page. Each of the plurality of HTML pages has a common format including the same fields of the database and the same layout of the fields. Each page of the plurality of pages has the same format, but different data.

Step 2214 of FIG. 22 shows that the HTML for a page includes a tag specifying the colors that a browser will use to display regular, visited, and active links. Other embodiments specify other HTML tags that specify other attributes common to the page.

FIG. 23 is a flow chart showing steps to build an HTML table. In the described embodiment, an HTML table is generated for the header, body, and footer of each page. Steps 2302–2308 generate a matrix in memory 104 as discussed below in connection with FIGS. 26–29. Step 2312 creates the HTML table in accordance with the matrix as shown in FIG. 24.

FIG. 24 shows steps that create an HTML table. Step 2402 writes a table tag including a border of zero width and cellpadding and cellspacing of zero. Step 2404 generates a table header including column and width definitions for the HTML table. Steps 2406–2418 go through each row and column of the matrix to generate a plurality of cells in the HTML table. Some of the cells in the HTML table can be several columns wide and/or several rows high. Step 2420 generates an end of table tag.

Figure 26:
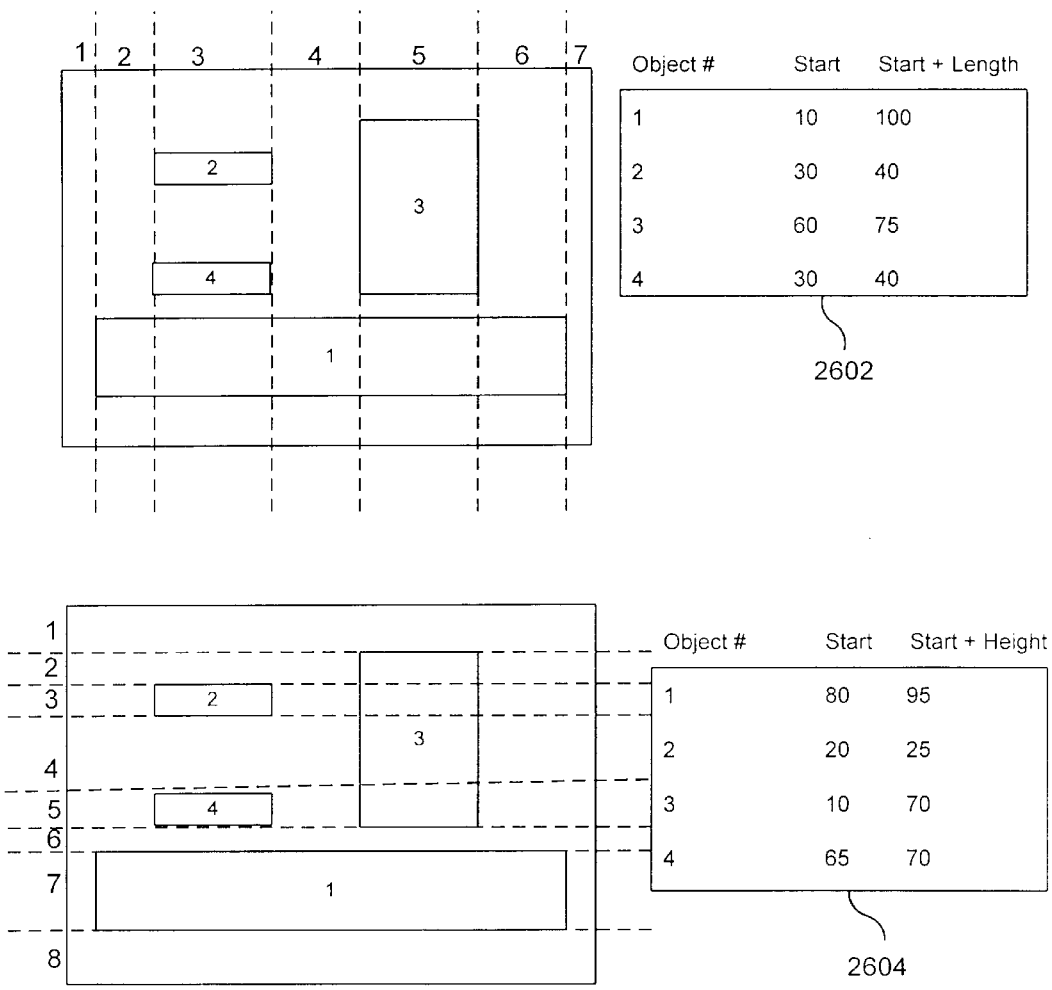
FIG. 26 is an example of first steps involved in determining an HTML table size.

FIG. 26 is an example of first steps involved in determining an HTML table size for a layout element of a header, body, or footer. In the example, the layout element has four display elements. Each display element corresponds to one draw object of the page. As discussed above, each draw object has an X position (a start row) and a length. Each draw object also has a Y position (a start column) and a height. For each object, a first column edge is the X start position and a second column edge is the X start position plus the length. In addition, for each object, a first row edge is the Y start position and a second row edge is the Y start position plus the height. Processor 102 finds the row edges and columns edges for a current page, yielding data 2602 and 2604.

Figure 27:
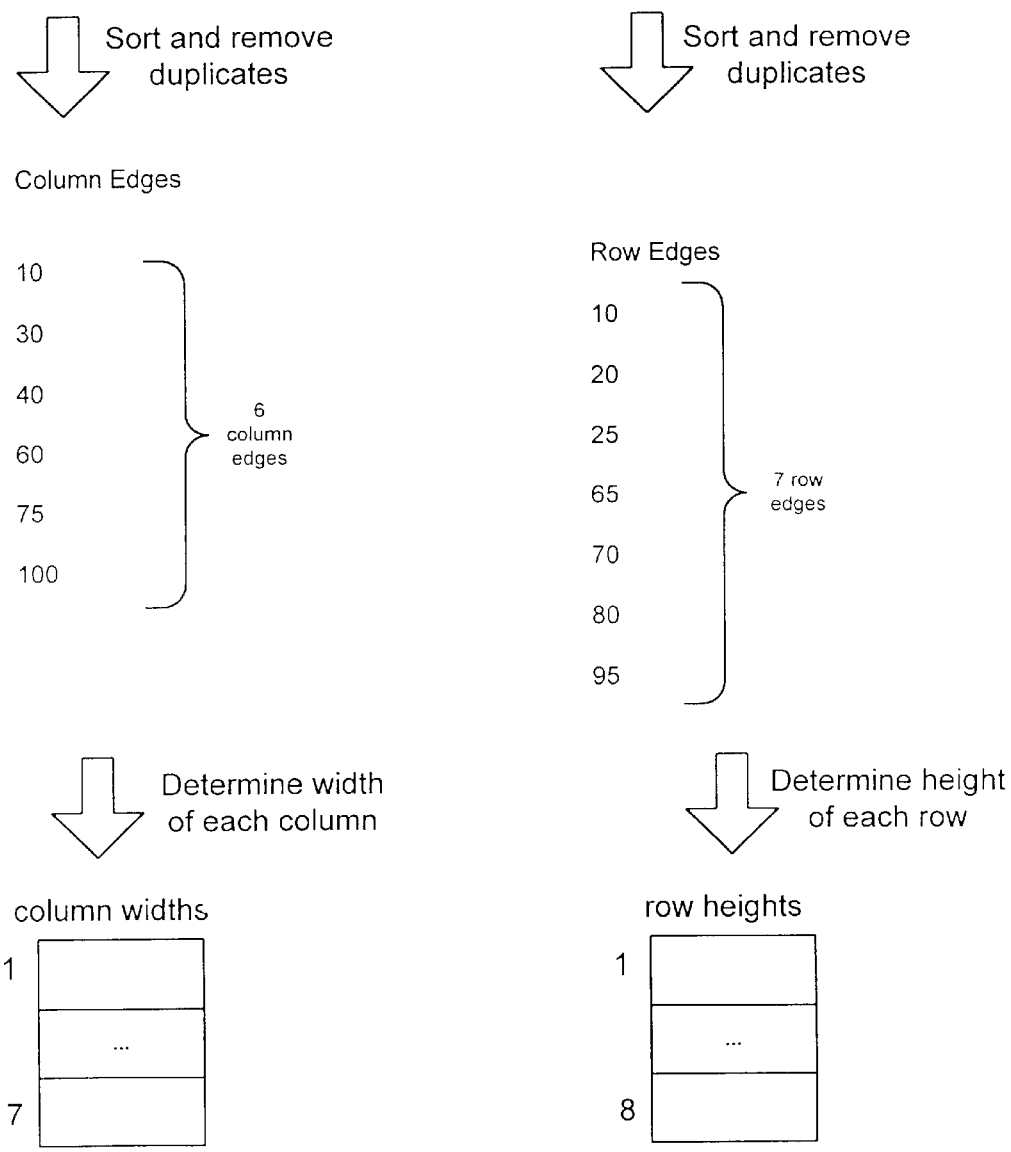
FIG. 27 is an example of second steps involved in determining an HTML table size.

FIG. 27 is an example of second steps involved in determining an HTML table size for a layout element. Once the column and row edges of the draw objects are determined, the edges are sorted, duplicate edges are removed from the sorted list, yielding unique row edges and unique column edges (steps 2304 and 2306 of FIG. 23). The unique rows edges and column edges are then counted. In the example, the objects have six column edges and seven row edges. Once the unique row edges and column edges are determined, the column widths and row heights for each column and row are determined.

Figure 28:
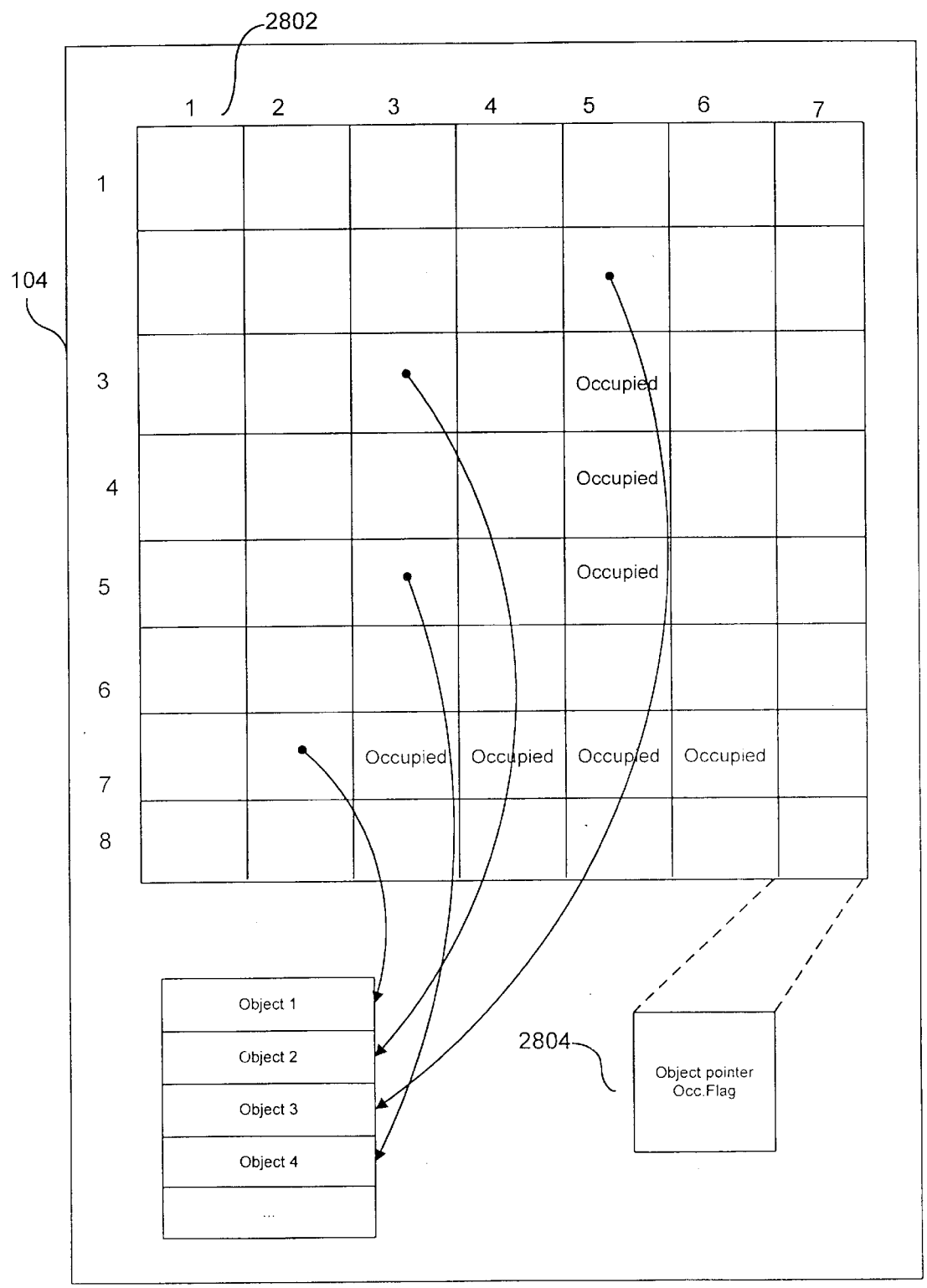
FIG. 28 is an example of a matrix generated by the steps of FIGS. 26 and 27.

FIG. 28 is an example of a matrix 2802 generated in accordance with the edges and draw objects. Matrix 2802 has a number of rows equal to the number of row edges plus one. The matrix has a number of columns equal to the number of column edges plus one. Thus, in the example, the matrix has seven columns and eight rows. Each element 2804 of the matrix has a pointer field and an occupied flag. The element of row 7, column 2 of the matrix points to object number 1 and is marked as occupied. The next four elements in row 2 are also marked as occupied. The element of row 3, column 3 points to object number 2 and is marked as occupied. The element of row 2, column 5 points to object number 3 and is marked as occupied. The next four elements in column 5 are also marked as occupied. The element of row 5, column 3 points to object number 4 and is marked as occupied.

FIG. 29 is a block diagram of how the matrix 2802 is used to generate an HTML table. The HTML table is used by a browser to display a portion of a page on display device 160 (such as a header, body, or a footer. (An alternate embodiment of the present invention creates a single table for each page of the site). Each element of the matrix is used to generate a cell in an HTML table (although some cells occupy more than one row or more than one column). For example, the matrix element in row 1, column 1 causes an empty table cell to be generated. Each row in the HTML table has a height in pixels that is equal to the height for that matrix row. Each cell in the HTML table has a width that is equal to the width of the matrix for that column.

As is known to persons of ordinary skill in the art, the cells in the table can be of varying sizes (i.e., can use the HTML tags "ROWSPAN" and COLSPAN"). The matrix element in row 2, column 5 causes generates of a cell that spans four rows (ROWSPAN=4). The matrix element in row 7, column 2 causes generation of a cell that spans five column (COLSPAN=5).

Figure 30:
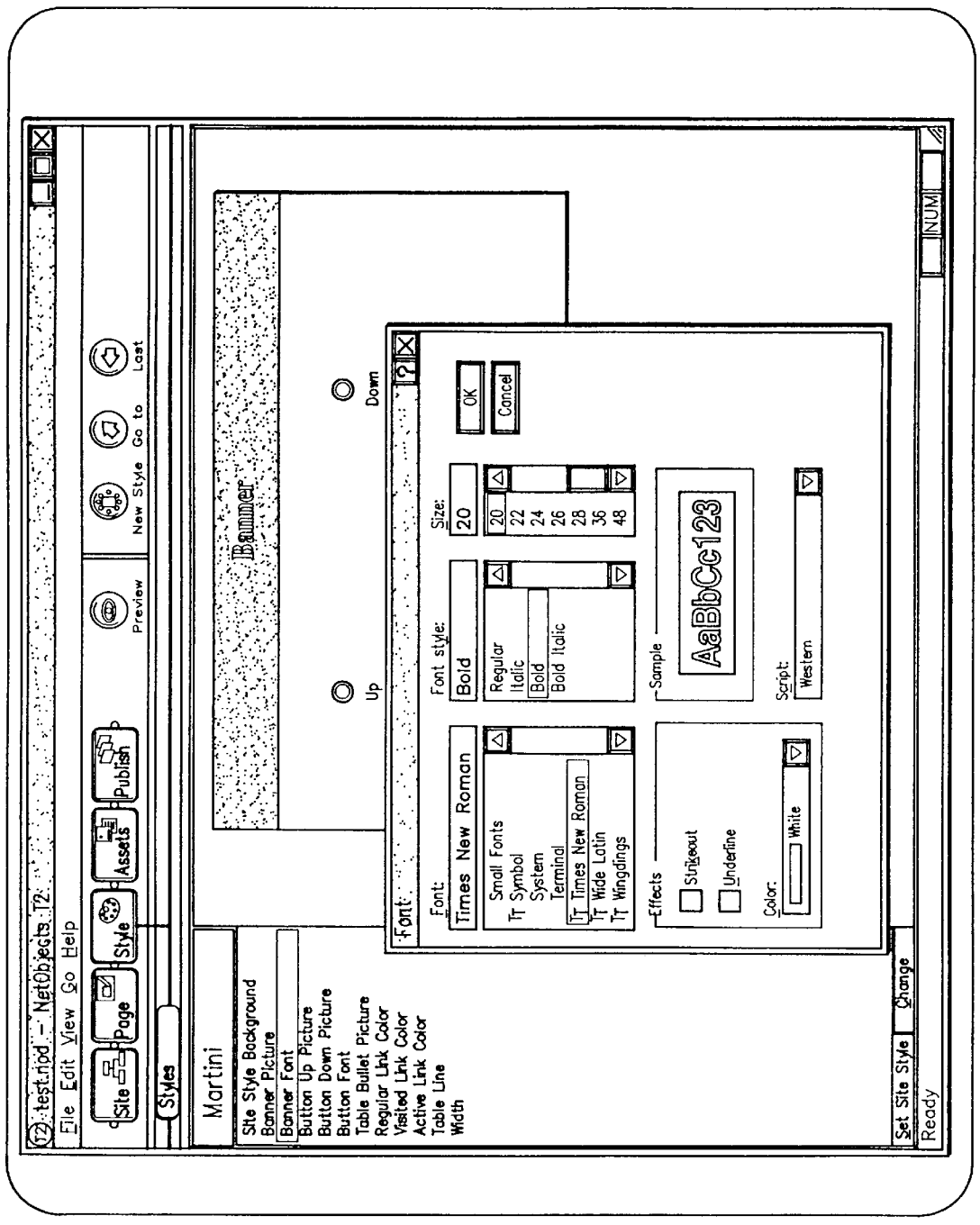
FIG. 30 shows an example of a Style display.

FIG. 30 shows an example of a Style display. The display of FIG. 30 is shown when the user selects Style button 306. The Style button display allows the user to select an overall default appearance of all pages in the site. The user can override the style for a given page by defining a different style for the page (not shown). In the described embodiment, the values shown in FIG. 30 are stored in locations of memory 104. The automatic generation of banners, navigation buttons, and text buttons is performed in accordance with user-specified style values.

FIG. 31 shows an example of an Assets Display. The Assets display shows the files, links, and objects in the data processing system. For example, the assets shown in FIG. 31 are the draw objects for the "Products" page of FIG. 5.

Figure 32:
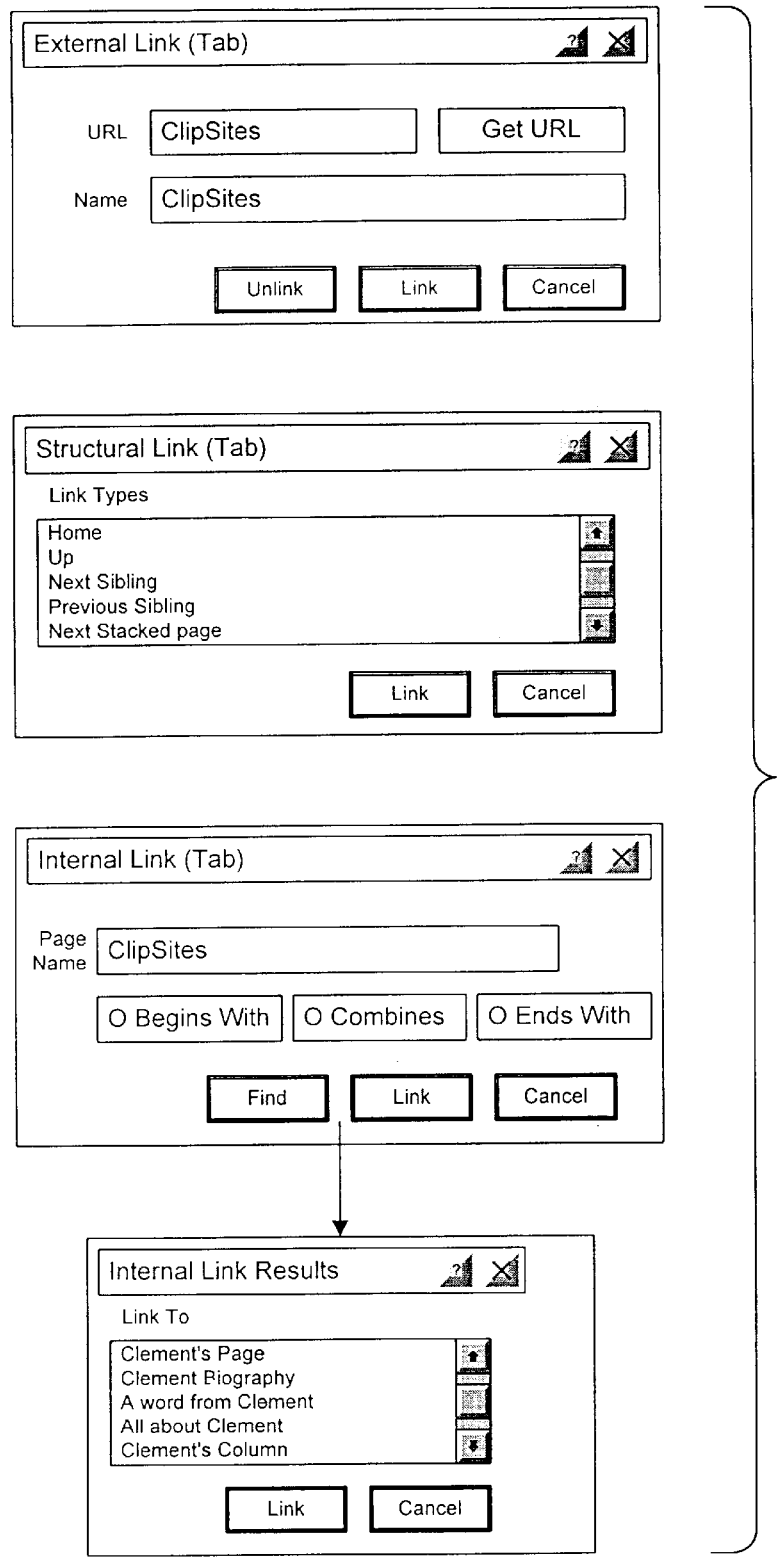
FIG. 32 shows an example of a plurality of link dialog boxes, showing a structural link, an internal link, and an external link.

FIG. 32 shows an example of a plurality of link dialog boxes, showing a structural link, an internal link, and an external link.

Figure 33:
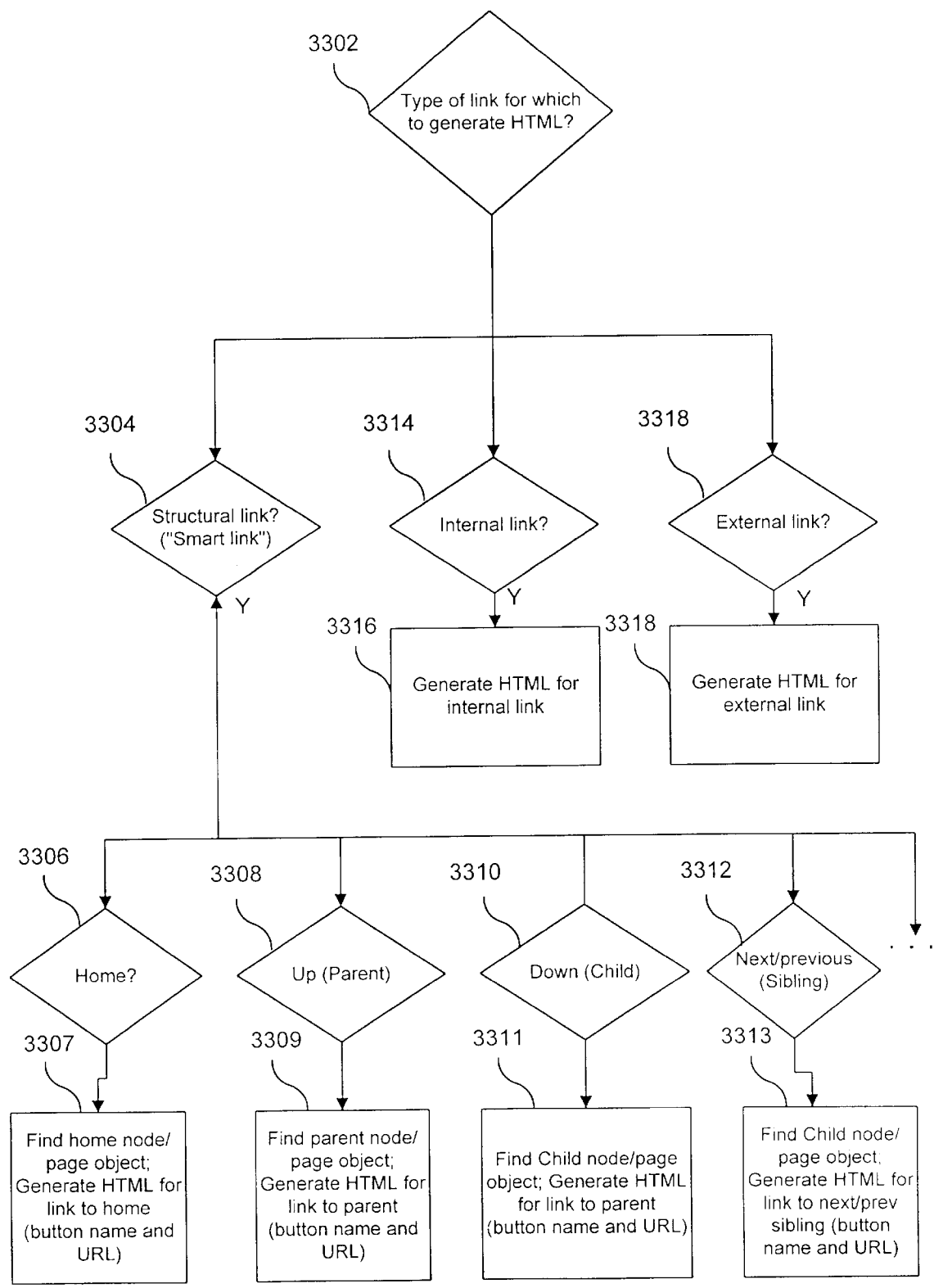
FIG. 33 is a flow chart showing updating of structural links for a page.

FIG. 33 is a flow chart showing identification of structural links for a page. The links preferably are identified when the page is displayed, previewed or published. Internal and external links are "absolute" links. Structural links are identified only as "next sibling link," "next child link", etc. For each link, the node-that-is-linked-to is identified (updated) by looking at the page hierarchy specified by the page layout tree. After the node is identified, the processor finds the URL, name, etc. of the node and generates the display or HTML for the structural link.

In summary, the described embodiment of the present invention allows a user to define a layout of a Web page. A draw-based editor in accordance with the present invention automatically creates draw objects for each page that reflects the user-defined layout. When the user "publishes" a page, the described embodiment generates HTML code for the page. A page can also be a "stacked page." A single stacked page causes generation of a plurality of HTML pages. The page defaults to a user-specified "style," which can be changed by the user.

Other embodiments will be apparent to those skilled in the art from consideration of the specification and practice of the invention disclosed herein. It is intended that the specification and examples be considered as exemplary only, with a true scope of the invention being indicated by the following claims and equivalents.

NetObjects
pictobj.h
    definition of piture object
*/ ifndef __PICTOBJ_H
define __PICTOBJ_H include "drawobj.h"
include "resource.h"
include "DOFile.h"
include "dlgbase.h"

class CModelessInsp;
class CHotSpot;
class CPictureGeneral;
class CDrawRect;

// flags for picture class
define DRAW_NATURAL      1    //object not stretched
define DRAW_STRETCHED    2    //object stretched to fit
define DRAW_TILED        4    //objecxt tiled
define DRAW_HOTSPOTON    16   // object has hot spots turned on
define DRAW_H_ALIGN_LEFT 32        // alignment
define DRAW_H_ALIGN_CENTER 64      // alignment
define DRAW_H_ALIGN_RIGHT   128    // alignment
define DRAW_V_ALIGN_TOP 256        // alignment
define DRAW_V_ALIGN_CENTER   512   // alignment
define DRAW_V_ALIGN_BOTTOM  1024   // alignment
define DRAW_GIF_SOURCE      2048
define DRAW_JPEG_SOURCE 4096
define DRAW_UNKNOWN_SOURCE 8192
define DRAW_GENERATEALWAYS 16384   // always rename and generate
this gif
define DRAW_DATAOBJECT      32768      // this is a data object // 'list' class for hot spots (requires afxtempl.h)
typedef CTypedPtrList<CObList, CHotSpot*> CHotSpotList;

class CDrawPicture : public CDrawRect
{
protected:

DECLARE_SERIAL(CDrawPicture);
    BOOL LoadBitmap();
    CDrawPicture();
public:

CDrawPicture(const CRect& position);
    ~CDrawPicture();

```
    virtual void Serialize(CArchive &ar);
    //virtual void Serialize(CArchive& ar);
    virtual void    Draw(CDC* pDC,CLayoutView* pView,BOOL
bXorOutline = FALSE, CRect *pDrawRect = NULL);
                void TileBackGround(CDC* pDC,CLayoutView* pView,
CRect *pRect);

virtual BOOL    SetBitmap(const CPDString& aFileType =
cFILE_IMAGE_TYPE);  //does the file dialog etc.

BOOL            Changed(void);
    void            SetStretch(UINT);
    UINT            GetStretch();
    virtual CRect   GetImagePosition(CRect *position = NULL);

virtual CRect   GetImageSize();
    void            SizeToImage(CLayoutView *p);
    int             GetImageHandle(void) {return
m_ImageHandle;}};
    long            ConvertImage(CPDString *theFileName,
CPDString * theFilePath);

BOOL            SetBitmap(const char *pStr, const CPDString&
aFileType = cFILE_IMAGE_TYPE);
    virtual int     GetSourceType(void);
    virtual void    OnOpen(CLayoutView* pView);

CHotSpotList*   GetHotSpots() { return &m_objects; }
    virtual CDrawObj *RemoveChild(CDrawObj *obj);
    virtual void    AddChild(CDrawObj *obj);
    CHotSpot*       HotSpotAt(const CPoint& point,CLayoutView *
pView);
    CHotSpot*       HotSpotAt(const CRect& rect,CLayoutView *
pView);
    void            DeleteHotSpots(void);
    void            MakeChildrenFit(CRect *newPosition = NULL);
    virtual void    EndMove(CLayoutView* pView = NULL);
    virtual void    MoveChildren(CRect *lastPoistion = NULL,
CRect *newPosition = NULL); // offsets all childern difference of
last to new position
    void            MoveChildren(CPoint point);   // offsets all
children using point coords
    virtual         CDrawObj* FindChild(int id);
    virtual BOOL    mAutoGenerated();
    virtual int     HitTest(CPoint point, CLayoutView* pView,
BOOL bSelected);

void            SetHotSpotsOn(BOOL);
    BOOL            GetHotSpotsOn(void);

void            SetDataObjectOn(void) {m_PictureFlags |=
DRAW_DATAOBJECT; }
```

```
    virtual CDrawObj* Intersects(const CRect& rect,CLayoutView
*pView);

virtual void    AddPropPage(CObList&);

virtual  void AddProperties(CMenu *pPopup);

virtual BOOL    IsParent(void) {return TRUE;};
    virtual CDrawObj*   GetSelectedChild(void);
    virtual void    SetSelectedChild(CDrawObj *pObj, BOOL
set=TRUE);

virtual void    SaveUndo(CArchive&
ar,PROPERTY_TYPE,CLayoutView *pView);
    virtual void    LoadUndo(CArchive&
ar,PROPERTY_TYPE,CLayoutView *pView);
    virtual void    SetAssetInfo(PROPERTY_TYPE type = DRAWOBJ);
    virtual void    SetObjectData(void);

virtual   CDrawObj* Clone(CLayoutData *pLayoutData);

virtual  void SetInitialValue(CLayoutView*);
    virtual  BOOL DrawImageToMemory(CDC *);
    CString         m_csName;

int             m_PictureFlags;

CHotSpotList   m_objects;

void SetGenerateAlways(BOOL b = TRUE);

void        SetVAlignFlag(int);
    void        SetHAlignFlag(int);
    BOOL        HasPicture() {return m_pDIB != NULL;}
    void mGenerateHTML(CPDBuffer* theBuffer);

protected:

int         m_ImageHandle;
    char *         m_pDIB;
    BITMAPINFO *   m_biInfo;
    int            m_biWidth;
    int            m_biHeight;
    char *         m_biBits;

private:
    static   CPictureGeneral          *m_pPictureProp;

protected:

//{{AFX_MSG(CDrawPicture)
    afx_msg void OnPictureProperty();
    afx_msg void OnEditClear();
//}}AFX_MSG
```

```
    DECLARE_MESSAGE_MAP()
};

// PictureAlignment dialog class PictureAlignment : public CT2Dialog
{
// Construction
public:
    PictureAlignment(CWnd* pParent = NULL);   // standard constructor CWnd *parentWnd;
    BOOL m_Cancel;
    UINT v;
    UINT h;
    DrawShape user;

void SetUser(DrawShape d) { user = d;}

// Dialog Data
    //{{AFX_DATA(PictureAlignment)
    enum { IDD = IDD_PICTURE_ALIGNMENT };
            // NOTE: the ClassWizard will add data members here
    //}}AFX_DATA // Overrides
    // ClassWizard generated virtual function overrides
    //{{AFX_VIRTUAL(PictureAlignment)
    protected:
    virtual void DoDataExchange(CDataExchange* pDX);    // DDX/DDV support
    //}}AFX_VIRTUAL // Implementation
protected:

// Generated message map functions
    //{{AFX_MSG(PictureAlignment)
    virtual void OnOK();
    //}}AFX_MSG
    DECLARE_MESSAGE_MAP()
};

#endif // _PICTOBJ_H//////////////////////////////////////////////////
//////////////////////////
```

A4

RICHTEXT.H

```c
// CDrawText - Text Object ifndef _CRICHTEXT_H__
define _CRICHTEXT_H__  //1 include "drawobj.h"

// General stuff
////////////////////////////////////////////////////////////////
////////////

// Tokens that we store in the token steam
// After a token there is potential more bytes and other tokens
// If this is the case then it is noted in the comments after the token
// All token take up 1 byte, Each item noted in [] take one byte // Note that all that contain data have a end token to enable backwards searching
typedef enum {
    T_TEXT = 0,         // Dummy token just use to communicate that its a text token
    T_NULL,             // Place holder to break up findtoken // Text formatting tokens turn on/off
    T_BOLDON,           // Bold
    T_BOLDOFF,
    T_ITALICON,         // Italics
    T_ITALICOFF,
    T_UNDERLINEON,      // underline
    T_UNDERLINEOFF,
    T_STRIKEOUTON,      // strikeout
    T_STRIKEOUTOFF,
    T_BLINKON,          // Blinking
    T_BLINKOFF,
    T_FIXEDON,          // Fixed pitch font
    T_FIXEDOFF,
    T_DUMMY1,           // Raw html code. Used to insert HTML code directly into the token stream // Text formatting with extra data
    T_FACE,             // Font face stored as T_FACE <name> T_FACE
    T_SIZE,             // Size of font; stored as T_SIZE [size] T_SIZE
    T_COLOR,            // Change to COLORREF color; stored as T_COLOR <COLORREF> T_COLOR
    T_HEADING,          // Heading marker; stored as T_HEADING [heading id] T_HEADING - should follow <P>
    T_PARAFMT,          // Formatting belonging to T_PARAGRAPH - stored as T_PARAFMT <ParaFormat> T_PARAFMT T_SYMBOL,           // Stores a symbol <T_SYMBOL> symbol value (int) <T_SYMBOL>
```

```
        T_HTMLTAG,              // A HTML tag stored

// String flow control
        T_END,                  // End of text object
        T_NEWLINE,              // New line - still inside the paragraph
        T_PARAGRAPH,            // New paragraph
        T_SOFTNEWLINE,          // Soft end of line - autowrap symbol // Support for html links
        T_LINKNAME,             // Link name stored as T_LINKNAME <display
text T_LINKNAME2
        T_LINKNAME2,
        T_LINKURL,              // Link URL stored as T_LINKURL <url>
T_LINKURL2
        T_LINKURL2
} TokenTypes;

// Notes:
// T_COLOR:
//      The COLORREF is stored as 4 bytes. The maximum byte
that is normally 0x00 will be
//      0x00 when the color is reset back to the default color
defined for the view, In this case
//      the rest of the color is unused. When a color ride is
in effect the byte is 0x00.\
// T_PARAGRAPH: The line number is stored in the paragraph as
<P><#><P>
// T_SOFTNEWLINE: Only used for return in FindToken // Link should be stored as
// <T_LINK1> tokens <T_LINK2> URLStruct <T_LINK3> define OVERRIDE_OF( CR) *( ( (char*) &(CR) )+3 )

define MAX_INDENT  31

// Alignment settings as they apply to one paragraph
typedef enum {
    AlignLeft = 0,
    AlignCenter,
    AlignRight
};

// Bullit types
typedef enum {
    Bull_None = 0,
    Bull_Bullit,
    Bull_Square,
    Bull_Disc,
    Bull_ABC,
    Bull_abc,
    Bull_III,
    Bull_iii,
    Bull_123,
```

A6

```
      Bull_UnUsed,    // Used when promoting and demoting
paragraphs
};

// Pitchtype, used to select between the proportional and fixed
type font
typedef enum {
      Proportional,
      Fixed,
} PITCHTYPE;

// T_PARAFMT <ParagraphFormat> T_PARAFMT, size = 4 bytes
struct ParaFormat {
      unsigned short aAlign  : 2;
      unsigned short iIndent : 5;    // [ 0 .. 31 ] levels
      unsigned short iBullit : 4;
      unsigned short iOrder  : 10;         // Order item number
[0..1024[
      unsigned short bStart  : 1;          // Special start value
for ordered lists
};

// Usage of the Font list
#define FONTINDEX_AUTOMATIC       0              // position of
the Automatic font
#define FONTINDEX_MAX             127

// The complete set of font settings as will be treated for text
object.
// These settings are at any given location applied to the
current setting
// in the global font setting.
struct FontAttrib {
      BYTE      rgbRed;              // 1 b
      BYTE      rgbGreen;            // 2 b
      BYTE      rgbBlue;             // 3b
      BOOL      bColorOverride : 1;  // Is the color currently
overridden
      short         iSize : 7;              // 4 b
      BOOL      bBold : 1;
      PITCHTYPE ptPitch : 3;
      BOOL      bItalic : 1;
      BOOL      bUnderline : 1;
      BOOL      bStrikeout : 1;
      BOOL      bBlink : 1;              // 5 b
      BOOL      bURL : 1;                // Are we inside an URL
display string
      unsigned short iFontIndex : 7;    // 6 b
      ParaFormat     pf;                // 10 b
};

// URL control structure
//////////////////////////////////////////////////////
// The URLStruct is stored between the LINK and URL
```

A7

```
struct URLStruct
{
    int   iJavaEventId;
};

class ExtFontAttrib{
    // Current attribute;
public:
    // Utility information
    CString         sHeading;
    int             iStyleIdx;
    URLStruct urlInfo;

FontAttrib      fAttrib;

// Functions
    int operator== (ExtFontAttrib &fs);
    ExtFontAttrib &operator= (ExtFontAttrib &fs);
};

// Search commands to the FindText function
#define FIND_HOME        1
#define FIND_END         2
#define FIND_PREVCHAR    3
#define FIND_NEXTCHAR    4
#define FIND_PREVWORD    5
#define FIND_NEXTWORD    6
#define FIND_PREVPARA    7
#define FIND_NEXTPARA    8
#define FIND_PREVLINE    9
define FIND_NEXTLINE    10 class CLayoutView;

define TALIGN_LEFT      0x01
#define TALIGN_CENTER    0x02
define TALIGN_RIGHT     0x04 struct FindReplaceData {
    int iIndex;
    CFindReplaceDialog *pFRDlg;
    int iFound1;
    int iFound2;
    int caret0, caret1;
    BOOL bRewrapped;
};

// CDrawText
//////////////////////////////////////////////////////////////////////
///////////
struct CaretStruct
{
    BOOL    getIndex; // is index valid, if not then pos is
valid - calc index in UpdateCaret
```

A 8

```
    int       index;      // index into m_text;
    BOOL      valid;      // if index set - status if its OK
    CPoint    pos;        // mouse pos, not maintained if valid is TRUE
    int       height;     // height of character at caret position - if
    CPoint    mousePos;
    BOOL      xset;
};

struct LineInfoStruct
{
public:
    int       width;      // width of text excl. the space needed for indent or bullit
    int       height;
    int       base;
    CPoint    ul;         // Top left corner of the text box, if bullit then its before the text box
    int       idxLine;    // Index into the text stream of line. either point to <P> <BR> or to char that is first on softbreak line
    FontAttrib fa;        // FontAttrib for the start of the line after all heading and aling have been applied
    int       iStyleIdx;  // Index of the style used
    int       fFlags;     // Flags for the line
};

// Line flags
define LINE_PARAGRAPH    0x0001      // Line is start of new paragraph // Different hardcoded sizes that HTML assumes
define INDENT_SIZE       40    //700    // Total indent size define BULLIT_SIZE       30    //300    // Space for bullit define BULLIT_SPACE      6     //50     // Space after bullit and before text

// Minimum Wrap width accepted
#define MIN_WIDTH         10

// Edit mode flags
#define   EDIT_READONLY   0x00000001   // Field is read-only - user may not change ny content - inspector is disabled
#define EDIT_ASCIIFIELD   0x00000002   // Field may only contain ascii string
define EDIT_SINGLELINE   0x00000004   // User must not be able to insert line break or paragraph // Undo information
```

A9

```
enum UndoOp {
    OpInsert,       // Insert bytes into buffer
    OpDelete,       // Delete bytes from buffer
    OpCarets,       // Position carets
    OpAssign,       // assign single byte in buffer
    OpSetT_NULL,    // assign range to T_NULL
    OpMoveBytes,    // move range inside buffer
    OpAssignBytes,  // assign range of bytes in buffer
    OpRewrapAll,    // whole object should be rewrapped
};

struct UndoRecord {
    char nOpType;
    union {

// Used when inserting (OpInsert) or deleting (OpDelete) bytes in the stream
        // and when setting bytes to T_NULL (OpSetT_NULL)
        // and when assigning a range of bytes (OpAssignBytes).

// and used for OpMoveBytes
        // When OpDelete it is followed by bytes deleted
        struct {
            unsigned short iNoBytes;
            unsigned short iIndex;
        } insdel;

// Used when position the carets
        struct {
            unsigned short index0;
            unsigned short index1;
        } caret;

// Used when []= assigning a single byte
        struct {
            unsigned short iIndex;
            char cOldByte;
        } assign;

} data;
};

#define UNDOBUFFER_INCREMENT    256         // increase buffer increment
define UNDOBUFFER_MINSIZE                  UNDOBUFFER_INCREMENT define MAX_FONT_LENGTH                     256         // Max size for a font face name define PRIVATE_KEYSTATE        8 define MAX_TEXT                (65536 * 4)
define MAX_TEXT_EDIT           (MAX_TEXT - 1000)
```

A10

```
#define WRAP_FIRSTLINE          0
#define WRAP_LASTLINE           MAX_TEXT
define WRAP_UNDEFINED          -1 extern BOOL IsChar( char c);
extern BOOL IsToken( char c);
extern BOOL WordDelimiter( char c);
extern BOOL HardLineDelimiter( char c);
extern BOOL LineDelimiter( char c);
extern BOOL ParaDelimiter( char c);
extern BOOL ParaFormatting( char c);
extern BOOL IsFormatToken( char c);
extern BOOL IsNonNormalizeToken( char c);
extern BOOL IsOrdered( int iType);
extern BOOL IsUnordered( int iType);
extern int TokenSize( int token, BOOL bForward);
extern int iT2clipbordFormat;
extern int iRTFclipboardFormat;

extern int m[];
extern int d[];

class CTextStyle;

// Class CDrawText
////////////////////////////////////////////////////////////////

//class CTextHTMLGenerator;

class CDrawText : public CDrawRect
{
        friend class CTextHTMLGenerator;

public:
        char        *m_text;
        int          m_nText;
        BOOL         bSelectAnchor;           // Are we currently
selecting using achor point
        static   CStringArray *m_FontFaceArray;    // Font face
list private:
        int          m_needsWrap;
        CPoint       m_LeftMargin;
        CPoint       m_RightMargin;
        int          m_clickCount;            //dont start edit mode
until second click CFont        *m_oldCFont;
        CFont        m_CFont;                 //Active font, setup
during calls to gettextsegment
        int          m_iWrapIdx1;
        int          m_iWrapIdx2;
```

A11

```
    int  m_maxText;                      ///maximum allocated text int  m_insertIndex;

int      m_haveCaretAndHeight;
    int      m_iCaretWidth;

CRgn     *m_pRgnCaret;        //marked block

BOOL     m_setMouseXPos;

// For mouse selection
static CaretStruct  *m_pDblClick_Carets;     // contains dbl
marked selection while mouse is still down
static CaretStruct  *m_pTriClick_Carets;     // contains tri
marked selection while mouse is still down
static CaretStruct  *m_pClick_Carets;   // contains mouse marked
selection while mouse is still down
static BOOL m_bMDragOverride;            // Override that we must
NOT do word extension in single click draw select LineInfoStruct * m_lineInfo;  // display lines
    int  m_nLines;                // used lines in above
    int  m_maxLines;              // max no lines int  m_hMarg;
    int  m_vMarg;

static  CTextStyle    *m_pTextProp;       //property
sheet belonging to object
        static BOOL bReturnFirstPara;         //return a <P>
at start of data FindReplaceData
              *m_FindReplace;

BOOL    m_Transparent;        // Is the control
transparent
        BOOL    m_LockedSize;         // Is the text size
locked
        CSize   m_sizeLockSize;               // The locked size
        UINT    m_EditMode;                   // Edit mode flags COLORREF m_BackGroundColor;   // Background color when not
transparent char *m_pUndo;        // Undo record buffer
        int  m_nUndoLen;                      // length of under buffer int  m_iUndo;                 // Next location in undo
buffer
        BOOL bRecordUndo;             // wheater to record or not in
::Insert and ::Delete
```

A12

```
        CaretStruct    m_caret[2];         //cursor/block location,
if postions are the same, no marking ExtFontAttrib
                       m_FontSet;          // Settings set
while gettextsegment traverses text
        ExtFontAttrib
                       m_OldFontSet;       // Compare copy for
SelectFont int  m_TrueHeight;                 //true height of text,
different than size when m_Locked is TRUE private:
        static COLORREF    m_TextColor;
        static COLORREF    m_TextLinkColor;

protected:
        DECLARE_SERIAL(CDrawText);
        CDrawText();

public:
        CDrawText(const CRect& position);
        ~CDrawText();
        virtual void Serialize(CArchive &ar);

virtual void AddProperties(CMenu *pPopup);
        virtual void Draw(CDC *pDC,CLayoutView* pView,BOOL
bXorOutline = FALSE, CRect *pDrawRect = NULL);
        virtual void MoveTo(const CRect& positon, CLayoutView* pView
= NULL,BOOL fAutosize = TRUE,BOOL fOutline = TRUE);

//property sheet support
        virtual void AddPropPage(CObList&);
        virtual void Select(CPoint p1, CPoint p2);
        virtual void KeyDown(UINT nChar, UINT nRepCnt, UINT nFlags);

virtual void CharDown(UINT nChar, UINT nRepCnt, UINT
nFlags);
        virtual void SysKeyUp(UINT nChar, UINT nRepCnt, UINT
nFlags);

virtual void StartMove( void);
        virtual void EndMove( CLayoutView *pView);

virtual void OnLButtonDown(CLayoutView* pView, UINT nFlags,
const CPoint& point);
        virtual void OnLButtonUp(CLayoutView* pView, UINT nFlags,
const CPoint& point);
        virtual void OnMouseMove(CLayoutView* pView, UINT nFlags,
const CPoint& point);
        virtual void OnLButtonDblClk(CLayoutView* pView, UINT
nFlags, const CPoint& point);
```

A13

```
    virtual void SaveUndo(CArchive& ar,PROPERTY_TYPE,CLayoutView
*pView);
    virtual void LoadUndo(CArchive& ar,PROPERTY_TYPE,CLayoutView
*pView);

virtual void mSynchronizeAssetNumbers();

BOOL virtual FindReplace( frOperations frOp, void *pData);

void Activate( TrackerState tsNewState = tsNormal);
    void Deactivate( TrackerState tsNewState = tsNormal);

virtual void SetFocus( void);
    virtual void KillFocus( void);

void GetText(char ** data, int * nData);
    void SetText(char * data, int nData);

void SetAsciiText(char *pString, BOOL bKeepFormat);
    char *GetAsciiText( void);

void mGenerateHTML(CPDBuffer* theBuffer);

void GetFont(ExtFontAttrib &fs, int iCaretIdx = -2);
    void SetFont(TokenTypes t_type);
    void SetFontAlignment( int iAlign);
    void SetFontBullit( int iBullit);
    void SetFontSize( int iSize);
    void SetFontColor( COLORREF *pColor);
    void SetFontFace( char *pFontFace);
    void ChangeIndent( int iChange);
    void SetSizeList( CComboBox *pComboBox, ExtFontAttrib& fs);

void SetBulletList( CComboBox *pComboBox, ExtFontAttrib&
fs);
    int FindFontIndex( char *pFontFace);
static void InitFontFaceArray( void);
static void SetFontFaceList( CComboBox *pComboBox);

void SetStyle( CString *psStyle);
    void ApplyURL(CString& sDisp, CString& sURL, char lToken,
char rToken,int iJavaEventId = 0);
    void SetURL( CString& sDisp, CString& sURL, BOOL bAddSpaces
= FALSE, int iJavaEventId = 0);
    BOOL GetURL( CString& sDisp, CString& sURL, int& link1, int&
link2, int& url1, int& url2, int& iJava);
    void UpdateURL( CString& sURL, int i1, int i2);
    void Unlink( int i1, int i2, int l1, int l2);
    BOOL GetSelectedText( CString& sText, int& i1, int& i2);

// Java event access functions
    int GetJavaEvent( void);
    BOOL SetJavaEvent( int iJavaEventId);
```

A14

```
    // External access methods
    COLORREF GetBackColor( void);
    void SetBackColor( COLORREF c);
    BOOL GetTransparent( void);
    void SetTransparent( BOOL t);
    BOOL GetLockedSize( void);
    void SetLockedSize( BOOL ls);
    BOOL IsStyleUsed( CString *psStyleName);
    void ResizeToOneLine( CLayoutView *pView, int iIndex = 0);
    void ResizeObject( CLayoutView *pView, int iX, int iY);
    void GetWordCounts( int *pLine, int *pPara, int *pWord, int
*pChars);
    UINT GetEditMode( void) {return m_EditMode;};
    void SetEditMode( UINT fFlags) {m_EditMode = fFlags;};

static void GetMinRect(CRect&);
    int GetTrueHeight();

private:
    void CalcFontSizes( PITCHTYPE pt, int *pFontSizes);
    virtual BOOL HasFont() {return TRUE;}
    BOOL CreateFont( CFont& font, ExtFontAttrib& fs);
    void InitSelectFont( CDC *pDC);
    BOOL SelectFont(ExtFontAttrib& fs, CDC *pDC);
    void AsciiSelectAll( void);

void MouseSelectWord(CLayoutView* pView, UINT nFlags, const
CPoint& point);
    void MouseSelectParagraph(CLayoutView* pView, UINT nFlags,
const CPoint& point);
    void UpdateCarets( CLayoutView *pView);
    BOOL IsEmpty();

char NextChar(int& iStart);
    char PrevChar(int& iStart);
    BOOL FindStream( int& index, int where);
    void GetFontAtIndex(ExtFontAttrib &fs, int index);
    int GetParaFormat( int iLine);
    int FindFirstLineAtLevel( int iLine, int iLevel);
    void RewrapLevelAtLine( int iLine, int iLevel);
    void ApplyBulletToParagraphLevel( int iLine, int
iBulletType);
    void ApplyParaFormat( int iKind, int iValue);
    void ApplyIndentToParagraph( int iLine, int iChange);
    int ApplyStyleToPara( CString *psStyle, int iPara, BOOL
bRemoveFormatting);
    void ApplyStyle( CString *psStyle, BOOL bRemoveFormatting);

void SetSimpleType( char *token1, char *token2, int
iTokenSize1, int iTokenSize2, BOOL bSymetric = TRUE);
    void LineInfoUpdate( int iLocation, int nData);
    void Insert(int iIndex, const char * data, int nData);
    void Insert(int iIndex, char token);
    void Delete(int nData);
```

```
      void DelText(int index1, int index2, BOOL bPreserveTokens =
TRUE);
      void EnsureURLforDelete( int& idx1, int& idx2);
      BOOL DeleteSelection( void);
      int ExtractAsciiToBuffer( char *pText, int iIndex1, int
iIndex2, int iLen);
public:
      void Delete( int index, int count);
private:
      BOOL SkipJunk( int& index, BOOL bForward);

void UpdateCaret(char token, int iC, int nL, int iStart, int
nChars, CPoint gpos, CDC *pDC);
      void UpdateSelectRegion( CLayoutView* pView);
      void RemoveSelectRegion( CLayoutView* pView);
      void FreeSelectRegion( void);
      void InvertSelectRegion( CDC *pDC);

CRgn *GetSelectRegion( void);

void ScrollCaretIntoView( CLayoutView* pView, int iCaret);
      void UpdateWndCaret( CLayoutView* pView);
      void FreeWndCaret( CLayoutView* pView);

void UpdateMarking( CLayoutView *pView);
      void UpdateTextObject( CLayoutView *pView = NULL);

int FindMatchToken( char token, int& iSize, int iStart, int
iEnd);
      int CompressTokens( int idx1, int idx2);
      int NormalizeStream( int idx1, int idx2, int *piNewEnd);
      void Normalize( int idx1, int idx2);
      void Normalize( void);

void InitFontSet( ExtFontAttrib& fs);
      void InitFontSettings( void);
      void InitFindToken( BOOL bReturnFirstParagraph = FALSE);
      int FindToken( int& iStart, int *iText = NULL, int *iTextLen
= NULL, int iLineBreak = 0);
      BOOL FindText(int where);
      void Realloc(int reqSize);

// Wrap functions
      void AllWrapped( void);
      void RewrapParagraph( int iParaIdx);
      void Rewrap( int idx1, int idx2);
      void RewrapLines( int iLine1, int iLine2);
      void RewrapAll( void);
      void Wrap( CLayoutView *pView, CDC *pDCin = NULL);
      void SkipLineDelimiter( int& idx);

void SkipRTF();
      void SelectText( CPoint p1, CPoint p2 );
      void PositionIndex( int& index);
```

*A16*

```
        void PositionCaret( int idx);
        void PositionCarets( void);

int DocToClientToDoc( CDC *pDC, int iY);
        void DisplayBackground(CLayoutView* pView, CDC *pDC, CRect
*pDrawRect);
        void Display(CLayoutView* pView, CDC *pDC, CRect
*pDrawRect);
        void DisplayText(CDC *pDC, BOOL extentOnly, BOOL drawItAll);

void CommonInitialization();
        int EnsureCorrectForCopy( int& idx1, int& idx2);
        void EnsureCorrectStartMarking( int& si, int& ei);
        int GetSelection( int& si, int& ei);
        int InsertColorSize( FontAttrib& fa);
        int InsertSettings( FontAttrib& fa);
        char *MakeOnSettings( FontAttrib &fa, int *pLen, BOOL
bOnlyColorSize = FALSE);
        int CompressTNULLs( char *pTokens, int len, int idx1, int
idx2, BOOL bUpdateCaret);
        void CompressTNULLs( void);
        void ClearRegion( int& idx1, int& idx2);
        void EnsureURLforCopy( int& idx1, int& idx2);
        void RemoveURLs( char *pToken, int len);
        void InvalidateLines( int iFirstLine, int iLastLine);
        void InvalidateLine( int iLine);
        int GetLineFromIndex( int index);
        void InvalidateRange( int idx1, int idx2);
        void InvalidateSelection( void);
        void InvalObjAndParent( CLayoutView *pView, BOOL bErase =
TRUE);

// Undo buffer functions
        void InitUndo( void);
        void AllocUndo( int iNeeded);
        void RecordUndo( UndoOp opCode, int iInt1, int iInt2, void
*pBytes = NULL);
        void FreeUndo( void);
        void EmptyUndo( void);
        void MarkUndo( void);
        void Undo( void);
        void RecordCarets( void);
        void RecordRewrapAll( void);
        void AssignTokenUndoable( int iIndex, char cNewValue);
        void AssignTokensUndoable( int iIndex, int iNoBytes, char
*pData);
        void SetT_NULLundoable( int iIndex, int iNoBytes);
        void MoveTokensUndoable( int iDest, int iSrc, int iSize);
        void OnPreUndo(void *pObj);

private:
        void MoveDelete( int iKind);
```

```
    BOOL FindMatch( BOOL bCaseSensitive, int iStart, int iLen,
LPCSTR pTarget, int &iNext);
    BOOL Find( void);
    BOOL Replace( void);
    BOOL nextFindReplace(CLayoutView *pView, frOperations frOp,
int& iReplace);

protected:
    //{{AFX_MSG(CDrawText)
    afx_msg void OnTextProperty();
    afx_msg void OnEditCut();
    afx_msg void OnEditCopy();
    afx_msg void OnEditPaste();
    afx_msg void OnEditSelectAll();
    afx_msg void OnEditClear();
    afx_msg void OnToolsPromote();
    afx_msg void OnToolsDemote();
    afx_msg void OnToolsWordCount();
    afx_msg void OnToolsInsertSymbol();
    afx_msg void OnToolsListStart();
    afx_msg void OnUpdateToolsListStart(CCmdUI* pCmdUI);
    afx_msg void OnUpdateEditCut(CCmdUI* pCmdUI);
    afx_msg void OnUpdateEditCopy(CCmdUI* pCmdUI);
    afx_msg void OnUpdateEditPaste(CCmdUI* pCmdUI);
    afx_msg void OnUpdateEditSelectAll(CCmdUI* pCmdUI);
    afx_msg void OnUpdateEditClear(CCmdUI* pCmdUI);
    afx_msg void OnStyleChanged(void *pObj);
    afx_msg void OnRecalc(void *pObj);
    afx_msg void OnInitialUpdate(void *pObj);
    //}}AFX_MSG
    DECLARE_MESSAGE_MAP()
};

//#define COLOR_LINK      RGB(0,0,255)
//#define COLOR_RAWHTML   RGB(255, 0, 0)
#endif
```

What is claimed is:

1. A method of allowing a user to define a World Wide Web page comprising the steps, performed by a data processing system, of:

displaying a plurality of page display elements on a display device, the display elements forming a page layout on the display device;

receiving an indication that the user wants to add a new display element to a page at a first position on the page;

adding a new draw data structure in a memory of the data processing system for the new display element to a plurality of other draw data structures, the draw data structures corresponding to the plurality of page display elements, where the new draw data structure includes data representing the first position; and generating in response to an indication to create the Web page, at least one HTML table that substantially reflects a layout of the entire displayed page on a pixel by pixel basis in accordance with the draw data structures.

2. An apparatus allowing a user to define a World Wide Web page, comprising:

a portion configured to receive an indication that the user wants to add a new display element to a page at a first position on the page as displayed on a display device;

a portion configured to add the display element at the first position on the page as displayed on the display device and a portion configured to generate in response to an indication to create the Web page, at least one HTML table that substantially reflects a layout of the displayed page on a pixel by pixel basis where the displayed page includes the display element.

3. A computer program product, including:

a computer usable medium having computer readable code embodied therein for allowing a user to define a World Wide Web page, the computer program product comprising:

computer readable program code devices configured to cause a computer to effect displaying a plurality of page display elements on a display device, the display elements forming a page layout on the display device;

computer readable program code devices configured to cause a computer to effect receiving an indication that the user wants to add a new display element to a page at a first position on the page;

computer readable program code devices configured to cause a computer to effect adding a new draw data structure in a memory for the new display element to a plurality of other draw data structures, the draw data structures corresponding to the plurality of page display elements, where the new draw data structure includes data representing the first position; and computer readable program code devices configured to cause a computer to effect generating in response to an indication to create the Web page, at least one HTML table that substantially reflects a layout of the entire displayed page on a pixel by pixel basis in accordance with the draw data structures.

4. A method of allowing a user to define a World Wide Web page comprising the steps, performed by a data processing system, of:

displaying a plurality of page display elements on a display device, the display elements forming a page layout on the display device;

receiving an indication that the user wants to move one of the plurality of page display elements to a new position on the page;

moving the one of the plurality of page display elements to the new position on the page; and generating in response to an indication to create the Web page, at least one HTML table that substantially reflects a layout of the displayed page on a pixel by pixel basis in accordance with the new position of the one of the page display elements.

5. A method of allowing a user to define a World Wide Web page comprising the steps, performed by a data processing system, of:

receiving an indication that the user wants to add a display element to the page at a first position on the page as displayed on a display device;

adding the display element at the first position on the page as displayed on the display device; and generating in response to an indication to create the Web page, at least one HTML table that substantially reflects a layout of the displayed page on a pixel by pixel basis where the displayed page includes the display element.

6. The method of claim 5, where the page display elements displayed on the display device are created via a tools menu displayed on the display screen.

7. The method of claim 5, where the page display elements displayed on the display device include at least one of the group drawn images, audio, and video display elements.

8. The method of claim 5, where the page display elements displayed on the display device represents a plug-in.

9. The method of claim 5, where the page display elements displayed on the display device include at least one of the group: form, datalist, and datafield display elements.

10. The method of claim 5, further comprising the step of creating a page layout on the display device and a corresponding plurality of draw objects in the memory, where the page layout includes a header, a body, and a footer.

11. The method of claim 10, where the header includes a banner and a plurality of navigator buttons.

12. The method of claim 10, where the footer includes a plurality of text buttons.

13. The method of claim 5, wherein the generating step is performed in response to the user activating a PREVIEW button on the display.

14. The method of claim 5, wherein the generating step is performed in response to the user activating a PUBLISH button on the display.

15. The method of claim 5, further comprising the step of creating a page layout on the display device and a corresponding plurality of draw objects in the memory, where the page layout includes at least one of a header and a footer, the size of which can be adjusted by the user.

16. The method of claim 5, wherein the step of receiving an indication that the user wants to add a new display element to the page at a first position on the page includes a step of:

receiving an indication that the user has indicated a drawing tool on a tools menu on the display device.

17. The method of claim 5, wherein the generating step includes the steps of:

creating HTML for the page header;
creating HTML for the page body; and
creating HTML for the page footer.

18. The method of claim 17, further comprising the step of:

creating initial HTML for the page.

19. The method of claim 17, further comprising the step of:

creating final HTML for the page.

20. The method of claim 5, wherein the generating step includes the step of generating HTML for a normal page.

21. The method of claim 5, wherein the generating step includes the step of generating HTML for a plurality of stacked pages.

22. The method of claim 5, wherein the generating step includes the substeps of:
   finding row edges of display elements on the page;
   finding column edges of display elements on the page;
   creating a matrix in a memory of the data processing system, where the matrix cells point to the draw data structures;
   finding the height and width of each column in the matrix; and
   generating the HTML table in accordance with the height and width of each column in the matrix and the draw data structures.

23. The method of claim 5, wherein the generating step includes the steps of:
   generating a matrix representing the size and layout of the display elements; and
   generating an HTML table in accordance with the matrix.

24. The method of claim 5, further including the steps of:
   viewing the HTML via a web browser, where the page displayed by the browser corresponds to the displayed page layout on a pixel by pixel basis.

25. The method of claim 5, further including the steps of:
   receiving input by the user indicating a page style definition; and
   wherein the generating step includes the step of generating HTML in accordance with the page style input by the user.

26. The method of claim 5, further including the steps of:
   allowing the user to specify a hotspot on the display layout; and
   allowing the user to specify an address associated with the hotspot,
   wherein the generating step includes the step of generating an HTML link in accordance with a location of the hotspot on the display layout and the address.

27. The method of claim 5 further including the steps of:
   allowing the user to specify a link location on the display layout; and
   allowing the user to specify another page associated with the link;
   wherein the generating step includes the step of generating an HTML in accordance with a location of the link on the display layout and with the page specified by the user.

28. The method of claim 5, further comprising the steps of:
   allowing the user to specify a link type that is one of a structural link, an internal link, or an external link; and
   allowing the user to specify a link location,
   wherein the generating step includes the step of generating an HTML link in accordance with the link type and location.

29. The method of claim 5, further comprising the step of:
   displaying a plurality of page display elements on the display device, the display elements forming a page layout on the display device.

30. A computer program product, including:
   a computer usable medium having computer readable code embodied therein for allowing a user to define a World Wide Web page, the computer program product comprising:
      computer readable program code devices configured to cause a computer to effect receiving an indication that the user wants to add a new display element to a page at a first position on the page as displayed on a display device;
      computer readable program code devices configured to cause a computer to effect adding a display element at the first position on the page as displayed on the display device; and
      computer readable program code devices configured to cause a computer to effect generating in response to an indication to create the Web page, at least one HTML table that substantially reflects a layout of the displayed page on a pixel by pixel basis where the displayed page includes the display element.

31. A computer data signal embodied in a carrier wave and representing sequences of instructions which, when executed by a processor, cause said processor to allow a user to define a World Wide Web page, by performing the steps of:
   receiving an indication that the user wants to add a new display element to the page at a first position on the page as displayed on a display device;
   adding a display element at the first position on the page as displayed on the display device; and
   generating in response to an indication to create the Web page, at least one HTML table that substantially reflects a layout of the displayed page on a pixel by pixel basis where the displayed page includes the display element.

32. A computer data signal embodied in a carrier wave and representing sequences of instructions which, when executed by a processor, cause said processor to allow a user to define a World Wide Web page, by performing the steps of:
   displaying a plurality of page display elements on a display device, the display elements forming a page layout on the display device;
   receiving an indication that the user wants to add a new display element to the page at a first position on the page;
   adding a new draw data structure in a memory of the data processing system for the new display element to a plurality of other draw data structures, the draw data structures corresponding to the plurality of page display elements, where the new draw data structure includes data representing the first position; and
   generating in response to an indication to create the Web page, at least one HTML table that substantially reflects a layout of the entire displayed page on a pixel by pixel basis in accordance with the draw data structures.

* * * * *